(12) United States Patent
Singer

(10) Patent No.: US 11,897,491 B2
(45) Date of Patent: *Feb. 13, 2024

(54) WINDSHIELD CLEAN SYSTEM

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,144

(22) Filed: Oct. 12, 2022

(65) Prior Publication Data

US 2023/0064533 A1 Mar. 2, 2023

Related U.S. Application Data

(63) Continuation of application No. 17/664,627, filed on May 23, 2022, now Pat. No. 11,498,579, which is a
(Continued)

(51) Int. Cl.
*B60W 50/08* (2020.01)
*G06F 3/0488* (2022.01)
(Continued)

(52) U.S. Cl.
CPC ........... *B60W 50/085* (2013.01); *B60K 37/02* (2013.01); *B60K 37/06* (2013.01); *B60W 30/162* (2013.01);
(Continued)

(58) Field of Classification Search
CPC ................. B60S 1/3404; B60S 1/3409; B60S 2001/3801; B60S 2001/3834
See application file for complete search history.

(56) References Cited

U.S. PATENT DOCUMENTS

| | | |
|---|---|---|
| 1,859,641 A | 5/1932 | Gordon |
| 2,615,190 A | 10/1952 | Shaw |

(Continued)

FOREIGN PATENT DOCUMENTS

| | | |
|---|---|---|
| DE | 102005021475 A1 | 11/2006 |
| DE | 102008052442 A1 | 6/2009 |

(Continued)

OTHER PUBLICATIONS

Katie Allen, European Search Report, dated Oct. 26, 2017, pp. 1-2.
(Continued)

*Primary Examiner* — Andrew A Horton
(74) *Attorney, Agent, or Firm* — KOS IP Law LLP

(57) ABSTRACT

A cleaning device for a surface, such as a windshield of a vehicle, includes an active positioning system and a cleaning head. The active positioning system is configured to deploy from a storage position hidden from view within a covered storage space and to position the cleaning head upon the windshield. The active positioning system includes a first extension member and a second extension member that move relative to one another to position the cleaning head, and also move the cleaning head across the windshield along a path. The cleaning head can have a brush portion configured to agitate debris from the window, and a drying portion configured to dry the window after cleaning. The cleaning device can be controlled via a touch-screen display in the vehicle, enabling a user to direct that specific portions of the windshield be cleaned as desired.

17 Claims, 57 Drawing Sheets

Related U.S. Application Data continuation-in-part of application No. 16/702,135, filed on Dec. 3, 2019, now Pat. No. 11,472,426, which is a continuation of application No. 16/394,416, filed on Apr. 25, 2019, now Pat. No. 10,538,221, which is a continuation-in-part of application No. 16/009,891, filed on Jun. 15, 2018, now Pat. No. 10,293,790, which is a continuation-in-part of application No. 15/921,551, filed on Mar. 14, 2018, now Pat. No. 10,029,653, which is a continuation-in-part of application No. 15/782,766, filed on Oct. 12, 2017, now Pat. No. 9,963,118, which is a continuation-in-part of application No. 15/433,843, filed on Feb. 15, 2017, now Pat. No. 9,815,435, which is a continuation of application No. 15/199,659, filed on Jun. 30, 2016, now Pat. No. 9,707,935.

(60) Provisional application No. 63/363,238, filed on Apr. 19, 2022.

(51) Int. Cl.

| | | |
|---|---|---|
| *B60K 37/06* | (2006.01) | |
| *G06F 3/04817* | (2022.01) | |
| *B60K 37/02* | (2006.01) | |
| *B60W 30/16* | (2020.01) | |
| *B60S 1/34* | (2006.01) | |
| *B60K 5/00* | (2006.01) | |
| *B62D 63/04* | (2006.01) | |
| *B60S 1/52* | (2006.01) | |
| *B60S 1/38* | (2006.01) | |
| *B60S 1/48* | (2006.01) | |

(52) U.S. Cl.
CPC ........ *G06F 3/0488* (2013.01); *G06F 3/04817* (2013.01); *B60K 5/00* (2013.01); *B60K 2370/115* (2019.05); *B60K 2370/1438* (2019.05); *B60K 2370/15* (2019.05); *B60K 2370/172* (2019.05); *B60S 1/3404* (2013.01); *B60S 1/3409* (2013.01); *B60S 1/3415* (2013.01); *B60S 1/481* (2013.01); *B60S 1/522* (2013.01); *B60S 1/528* (2013.01); *B60S 2001/3831* (2013.01); *B60S 2001/3834* (2013.01); *B60W 2540/215* (2020.02); *B62D 63/04* (2013.01)

(56) References Cited

U.S. PATENT DOCUMENTS

| | | | |
|---|---|---|---|
| 3,080,592 A | | 3/1963 | Hassage |
| 3,790,083 A | | 2/1974 | Redifer |
| 4,274,175 A | | 6/1981 | Nishikawa |
| 4,611,364 A | | 9/1986 | Kurt |
| 4,945,601 A | | 8/1990 | Bilodeau |
| 5,157,312 A | | 10/1992 | Wallrafen |
| 5,323,508 A | | 6/1994 | Sheldrake |
| 5,502,865 A | * | 4/1996 | Zhou ............... B60S 1/3409 15/250.16 |
| 6,283,656 B1 | | 9/2001 | Jiang |
| 6,799,349 B2 | | 10/2004 | Stouder, II |
| 7,503,091 B2 | | 3/2009 | White, Jr. |
| 8,032,976 B2 | | 10/2011 | Nelson |
| 8,381,348 B2 | | 2/2013 | Egner-Walter |
| 8,745,814 B2 | | 6/2014 | Nelson |
| 9,707,935 B1 | | 7/2017 | Singer |
| 9,815,435 B1 | | 11/2017 | Singer |
| 9,963,118 B2 | | 5/2018 | Singer |
| 10,029,653 B1 | | 7/2018 | Singer |
| 10,293,790 B2 | | 5/2019 | Singer |
| 10,538,221 B2 | | 1/2020 | Singer |
| 11,498,579 B2 | * | 11/2022 | Singer ............... B60K 37/02 |
| 2006/0059648 A1 | | 3/2006 | Meredith |
| 2008/0034531 A1 | | 2/2008 | Beaver |
| 2009/0100627 A1 | | 4/2009 | Renke |
| 2013/0180544 A1 | | 7/2013 | Nelson |
| 2015/0066293 A1 | | 3/2015 | Davies |
| 2016/0355161 A1 | | 12/2016 | Paro |

FOREIGN PATENT DOCUMENTS

| | | |
|---|---|---|
| EP | 1457398 A2 | 9/2004 |
| EP | 2639121 A2 | 9/2013 |
| JP | S58177753 A | 10/1983 |

OTHER PUBLICATIONS

European Search Opinion, pp. 1-5.
EP2639121A2 (machine translation), 2013.

\* cited by examiner

WINDSHIELD CLEAN SYSTEM

CROSS-REFERENCE TO RELATED APPLICATIONS

This application is a continuation in part application of U.S. Ser. No. 17/664,627, filed on May 23, 2022, which claims the benefits of U.S. Ser. No. 63/363,238, filed on Apr. 19, 2022 and is a continuation in part application of U.S. Ser. No. 16/702,135, filed on Dec. 3, 2019, which is a continuation application of U.S. patent application Ser. No. 16/394,416, filed on Apr. 25, 2019, now U.S. Pat. No. 10,538,221, which is a continuation in part of U.S. patent application Ser. No. 16/009,891, filed on Jun. 15, 2018, now U.S. Pat. No. 10,293,790, which is a continuation in part of U.S. patent application Ser. No. 15/921,551, filed on Mar. 14, 2018, now U.S. Pat. No. 10,029,653, which is a continuation in part of U.S. patent application Ser. No. 15/782,766, filed on Oct. 12, 2017, now U.S. Pat. No. 9,963,118, which is a continuation in part of U.S. patent application Ser. No. 15/433,843, filed on Feb. 15, 2017, now U.S. Pat. No. 9,815,435, which is a continuation application of U.S. patent application Ser. No. 15/199,659, filed on Jun. 30, 2016, now U.S. Pat. No. 9,707,935, the entire contents of which are all expressly incorporated herein by reference.

STATEMENT RE: FEDERALLY SPONSORED RESEARCH/DEVELOPMENT

Not Applicable

BACKGROUND

The various embodiments and features described herein relate to a windshield clean system of an automobile which includes at least passenger vehicles, trucks, busses, recreational vehicles and motor homes. It also includes a method and an apparatus that is affixed to a motor vehicle for washing the front windshield of a large motor vehicle such as a bus or recreational vehicle (RV).

Vehicles with large windshields, such as most new electric automobiles, busses and RV's have windshield wipers to clear enough of the windshield for drivers to operate the vehicles. But such large windshields have substantial areas not cleared by conventional windshield wipers that rotate about fixed pivots. Because passengers look out the front windshield, any dirt on the windshield that obscures viewing is undesirable. There is thus a need for an improved method and apparatus to clean more of the area of large windshields than occurs with conventional rotating windshield wipers.

Because large windshields on such vehicles as most new electric automobiles, busses and RV's are more vertical than other motor vehicles, the insects and debris that hit the windshield impact with greater force and that can sometimes make the residual debris stick to the windshield with greater force than if the windshield were inclined. Also, if the residual debris dries the debris may be difficult to remove using the windshield wipers and washer fluid provided with conventional motor vehicles. Moreover, the windshield wipers provide a wiping action by a rubber blade which is not an efficient cleaning device for hardened-on debris. Further, any debris located outside the area reached by the windshield wipers will remain and obstruct viewing through the windshield. There is thus a need for an improved method and apparatus to clean large windshields.

BRIEF SUMMARY

Multiple embodiments of a windshield clean system for a surface with further embodiments of cleaning systems also disclosed.

In accordance with one embodiment, a method of cleaning a window of an automobile is provided. The method includes opening a cover to expose a storage cavity defined in or on the automobile and deploying a cleaning device from the storage cavity. The cleaning device can comprise an active positioning system supporting a cleaning head. The active positioning system can comprise a first extension member supported by a base, a second extension member supported by and movable relative to the first extension member, and a head joint supported by the second extension member and supporting the cleaning head. The method further includes moving the first extension member and second extension member relative to one another so as to place the cleaning head against a surface of a window at a start position, activating a motorized brush of the cleaning head to agitate against the surface of the window, moving the first extension member and second extension member relative to one another so as to move the motorized brush from the start position over the surface of the window along a first path while the motorized brush is activated, moving the first extension member and second extension member relative to one another so as to move the cleaning head back to the start position, and moving the cleaning head relative to the second extension member so as to place a wiper blade of the cleaning head against the surface of the window at the start position, and further includes moving the first extension member and second extension member relative to one another so as to move the wiper blade from the start position over the surface of the window along the first path while moving the cleaning head relative to the second extension member so as to maintain the wiper blade at a desired orientation relative to the first path.

The desired orientation of the wiper blade can be generally perpendicular to the first path.

The second extension member can articulate relative to the first extension member, and can additionally comprise rotating the first extension member about its axis so as to press the cleaning head against the window.

The second extension member can be configured to telescope relative to the first extension member so as to adjust an overall length of the active positioning system. The base can be configured to rotate about an axis generally perpendicular to an axis of the first extension member.

At least one of the first extension member and second extension member can comprise telescoping portions, and the method can further include moving the telescoping portions to adjust a length of the corresponding one of the first extension member and second extension member.

The method can also include moving the base linearly along an elongated track while moving the first extension member relative to the second extension member. In some variations the track can remain within the storage cavity when the first extension member, second extension member, and cleaning head are deployed out of the storage cavity. Also, opposing ends of the track can be mounted on structural members of the automobile. The track can extend along substantially an entire width of the window, or can extend only about halfway or less of a width of the window.

In further variations, the storage cavity can be enclosed within a casing defined by opposing end walls, a top wall, a bottom wall, a back wall and the cover, and opposing ends of the track can be mounted to the opposing end walls. The casing can be removably attached to the automobile.

The method can additionally comprise moving the first extension member, second extension member, base and head joint relative to one another so as to return the cleaning device to be fully contained within the storage cavity, and closing the cover. In some variations, the storage cavity can be defined below the hood of the automobile, and the cover can sit flush with the hood when the cover is closed. The cover hinge can be disposed on a side of the cover opposite the windshield, and opening the cover can comprise rotating the cover about the cover hinge no more than about 75 degrees.

The window can be a windshield of the automobile. The method can include a camera within the automobile capturing an image of the windshield showing debris on the windshield, displaying the image on a touch-screen display within the automobile cabin, a computer mapping locations on the touch-screen display to locations on a windshield of the automobile, receiving a selected location input via the touch-screen display and correlating the selected location input to a selected windshield location. The method can further include defining the start point spaced from the selected windshield location but with the selected windshield location disposed within the first path.

An automobile having a windshield cleaning system is disclosed. The automobile may comprise a plurality of wheels; an engine connected to the plurality of wheels for propelling the automobile forward; a steering wheel connected to at least one of the at least two wheels for guiding a direction of the automobile; a windshield for protecting a driver of the automobile from projectiles; and the windshield cleaning system.

In another embodiment, the windshield cleaning system has a cleaning head that can reach the entire surface area of the surface, such as a windshield, to clean the entire surface or may be operated to spot clean a localized area of the surface, as needed. The cleaning head of the cleaning system may be operated with two extension members rotatable about articulating joints or a gantry system wherein a horizontal member rides within tracks up and down the windshield and the cleaning head moves left and right on the horizontal member.

Such a windshield cleaning system may be positioned outside of the automobile below the windshield. The windshield cleaning system may have a cleaning head for washing dirt off of the windshield. The head may be connected to the automobile with first and second extension members connected to each other with an articulating joint so that the head may be positioned at a location within a primary field of view of the windshield. The first extension member may be connected to the head. The second extension member may be pivotally connected to the first extension member. The second extension member may be pivotally connected to the automobile.

The head of the windshield cleaning system may have a brush.

The head of the windshield cleaning system may have a vibration unit for vibrating the head while cleaning dirt off-of the windshield.

The head or the first extension member of the windshield cleaning system may have a spray nozzle for spraying cleaning fluid on the windshield.

The windshield cleaning system of the automobile may further have a computer mounted to the automobile for controlling the head.

The windshield cleaning system of the automobile may further have a motor for controlling the first and second extension members and the position of the head on the windshield.

The windshield cleaning system of the automobile may further comprise a tube for routing cleaning fluid toward the cleaning head and being fluidically connected to a spray nozzle disposed on or adjacent to the cleaning head.

The automobile may further comprise a touch screen displaying a visual depiction of the windshield and the touch screen being connected to a computer which controls positioning of the head.

In another aspect, a method of cleaning a dirty spot on a surface, such as a windshield of an automobile, is disclosed. The method may comprise the steps of receiving a location to be cleaned from a touch screen; activating a motor to traverse a cleaning head to a corresponding location on the surface and traverse back and forth over the corresponding location on the surface; and activating a pump to spray cleaning fluid out of a spray nozzle onto the corresponding location on the surface;

The method may further comprise the step of activating a vibration unit attached to the cleaning head.

The method may further comprise the step of rotating brushes of the cleaning head to clean the corresponding location on the windshield of the automobile.

A cleaning device is provided for a motor vehicle with tracks above and below the vehicle's windshield. A brush, wiper blade and spray bar extend across the windshield at a starting side of the windshield. The spray bar provides washer fluid to the brush as it rotates against the windshield. The spray bar, brush and wiper bar move along the tracks across the windshield to an opposing, return side of the windshield where the wiper blade first contacts the windshield and the brush stops rotating and moves away from the windshield. The spray bar rotates next to the wiper blade to blow air against the windshield. The wiper blade scrapes water while air blows water off the windshield as they move back to the starting side of the windshield where they move into a frame along the starting side of the windshield and are covered when not in use.

A cleaning system is provided that is retained in a frame that encircles the outer periphery of a motor vehicle's windshield and that houses and guides a cleaning mechanism as it moves across the windshield from side to side so as to clean a larger portion of the windshield than rotating wipers. The frame has a generally horizontal top and bottom, joined by generally vertical start and return sides, with a staring door and return door on the respective start and return sides. The cleaning system has a rotatable brush, a wiper blade and a spray bar (with spray nozzles along its length) are contained in the starting side frame so those parts can extend between the top and bottom of the windshield as they move from a starting side of the windshield to the opposing, return side of the windshield. The brush, wiper blade and spray bar may be concealed in the starting side frame by the starting door when not in use. A lower track within the bottom frame extends along the bottom of the windshield with an upper track, within the top frame, extending along the top portion of the windshield. The tracks are generally horizontal but may bow or curve with the curvature of the windshield. The brush and wiper blade extend between upper and lower carriers that are connected to and move along the upper and lower tracks, respectively, with the carriers preferably covered by the starting door when the system is not in use.

A first drive mechanism moves the brush, wiper blade and spray bar on the tracks across the windshield and back, from the starting side to the return side and back to the starting side. A second drive mechanism rotates the brush as it moves across the windshield from the starting side to the return side to clean debris from the windshield, with the brush preferably not rotating as it moves from the return side to the starting side. The spray bar has a first fluid channel in fluid communication with a pump and a washer fluid reservoir and has a second fluid channel in fluid communication with an air reservoir and an air compressor. When the storage door opens, the spray bar rotates to a position near the brush and windshield and between the brush and the return side, with the pump actuated to spray water through the first fluid channel and first spray nozzles onto the windshield as the brush is rotated and moved from the storage side to the return side.

As the spray bar reaches the return side and the return door a rotating mechanism rotates the spray bar about half a rotation so it is adjacent the windshield near the wiper blade and between the wiper blade and the starting side. During that rotation the flow of washer fluid through the first channel and first spray nozzles stops, and flow of air through the second flow channel and second spray nozzles begins, with the spray bar spraying air against the washed surface adjacent the wiper blade and preferably forming one or two blades of air directing the wash fluid toward the top and/or bottom of the windshield. As the spray bar rotates from the return side to the starting side of the brush and the flow of washer fluid stops, the rotation of the brush continues so that centrifugal force throws water off the brush. Also, as the spray bar rotates from the return side to the starting side of the brush, a rotating mechanism rotates the brush out of contact with the windshield and rotates the wiper blade into contact with the windshield.

As the first drive mechanism moves the cleaning mechanism from the return side to the starting side, the air from the second channel of the spray bar blows water and debris off the windshield and the wiper blade acts like a squeegee to wipe water from the windshield. When the spray bar reaches the starting side and the starting frame, it rotates to a generally vertical storage position as the wiper blade and brush enter the left side of the frame and the flow of air through the second channel is shut off. When the brush is within the starting side frame, the starting side door and return side doors close.

In more detail a cleaning apparatus is provided for a motor vehicle windshield having a starting side and opposing return side, a top and bottom side. The cleaning apparatus may include a rotatable brush, a wiper blade and a spray bar each extending between the top and bottom sides of the windshield. The spray bar has first and second fluid channels each of which has respective first and second spray nozzles extending along a length of the respective first and second fluid channels. The spray bar has first and second use positions and a storage position. The first use position has the first spray nozzles adjacent the windshield and located between the brush and the return side. The second use position has the second spray nozzles adjacent the windshield and located between the wiper blade and the starting side. The apparatus may also include a fluid pump in fluid communication with the first fluid channel and a container of washer fluid to pump washer fluid through the first fluid channel and first spray nozzles at a first pressure. An air compressor may be in fluid communication with the second fluid channel and second spray nozzles and an air storage container to provide air to the second fluid channel and second spray nozzles at a second pressure. The apparatus may have a bottom track extending along the bottom of the windshield and a top track extending along a top of the windshield, with a bottom carrier moving along the bottom track and connected to the brush, wiper blade and spray bar and a top carrier moving along the top track and connected to the brush, wiper blade and spray bar. A drive mechanism may be connected to at least one of the top and bottom carriers to move the at least one of the top and bottom carriers across the windshield and back.

In further variations, the cleaning apparatus may further include a frame encircling the windshield, including such components such as a top frame containing the top track and a bottom frame containing the top track. A starting frame may be placed along the starting side of the windshield, with the starting frame extending between the top and bottom frames and containing the wiper blade, spray bar, brush and associated carrier or carriers when they not in use. A return frame may be placed opposite the starting frame and advantageously extends between the top and bottom frames at the return side of the windshield. Advantageously, a starting door releasably covers the starting frame, wiper blade, spray bar and brush and a return door releasably covers the return frame.

There is also provided a method of cleaning the outer surface of a motor vehicle windshield having a starting side and opposing return side. The method comprises the steps rotating a spray bar to a first position between a brush and the return side of the windshield and adjacent the windshield. The brush and spray bar each extend from a top to a bottom of the windshield. The spray bar has first and second fluid channels with a plurality of first spray nozzles in fluid communication with the first fluid channel and a plurality of second spray nozzles in fluid communication with the second flow channel. The method may include rotating the brush while it is in contact with the outer surface of the windshield to clean the windshield while flowing a washing fluid through the first channel and first plurality of spray nozzles at a pressure sufficient to spray the washing fluid through the plurality of first spray nozzles to the windshield at a location between the rotating brush and the return side of the windshield. The method advantageously moves that rotating brush and spray bar from the start side to the finish side of the windshield while maintaining the rotating brush in contact with the outer surface of the windshield to clean the windshield. The method may further move a wiper blade from the start side to the finish side of the windshield while the wiper blade extends between the top and bottom of the windshield but is not in contact with the windshield. The method advantageously stops the flow of washing fluid through the first channel and first plurality of spray nozzles when the spray bar is at the return side of the windshield. The method may include rotating the spray bay to a second position with the second plurality of spray nozzles adjacent the windshield and between the start side of the windshield and the wiper blade. The wiper is placed in contact with the windshield, rotation of the brush is stopped and air is flowed through the second channel and second plurality of spray nozzles at a pressure sufficient to deflect water away from the wiper blade. The method advantageously moves the wiper blade, spray bar and brush from the return side to the starting side with the wiper blade in contact with the windshield and the brush not in contact with the windshield.

In further variations, the method may include placing the covering the wiper blade, brush and spray bar in a starting side frame extending along the starting side of the windshield and placing a removable cover over that starting side frame. The flow of washing fluid may be stopped before the spray bar is rotated to the second position Likewise, the rotation of the brush may stop before the spray bar is rotated to the second position, or after. The flow of washing fluid through the first channel is advantageously at a pressure sufficient to create a spray through the first plurality of spray nozzles. The flow of air through the second channel may be provided by air from a storage container, by air from a compressor, or both. The step of moving the rotating brush and spray bar from the start side to the finish side of the windshield may comprise connecting a first end of the brush and wiper blade to a carrier block connected to a track extending along one of the top or bottom of the windshield and moving the carrier block along that track.

There is also provided an apparatus for cleaning windshields of a motor vehicle where the windshield has an opposing top and bottom joined by an opposing starting side opposite a return side. The apparatus is enclosed in a frame that is advantageously a generally rectangular frame configured to fit around the outside of the motor vehicle windshield. The frame may have opposing top and bottom frames, and a starting side frame opposite a return side frame. Each frame has opposing sides joined to a bottom. The starting side frame advantageously has a cover which may be opened and closed. The apparatus advantageously has a top track inside and connected to the top frame and extending across at least a substantial length of the top of the windshield. A top carrier is connected to and movable along that top track. Likewise, a bottom track is inside and connected to the bottom frame and extends across at least a substantial length of a bottom of the windshield. A bottom carrier is connected to and movable along that bottom track. A rotatable brush has opposing top and bottom ends with the top brush end connected to the top carrier and the bottom brush end connected to the bottom carrier. A wiper blade has opposing top and bottom ends with the top blade end connected to the top carrier and the bottom blade end connected to the bottom carrier. A spray bar has opposing top and bottom spray bar ends with the top spray bar end rotatably connected to the top carrier and the bottom spray bar end rotatably connected to the bottom carrier. The spray bar preferably has a first fluid channel in fluid communication with a first plurality of spray nozzles extending along a first side of the spray bar and a second plurality of spray nozzles in fluid communication with a second plurality of spray nozzles extending along a second side of the spray bar and orientated in a direction substantially opposite the first plurality of spray nozzles. The top and bottom carriers, rotatable brush, wiper blade and spray bar fit within the starting side frame when the starting side frame cover is closed to enclose the top and bottom carriers, rotatable brush, wiper blade and spray bar.

In further variations, the cleaning apparatus may further include a pump in fluid communication with the first fluid channel of the spray bar and a source of washer fluid. The apparatus also advantageously includes at least one of a compressor or an air storage container in fluid communication with the second fluid channel of the spray bar. The top and bottom tracks are advantageously slightly curved so the opposing ends of the top and bottom tracks are offset from a middle of the respective track to conform to a curvature of the adjacent portion of the windshield. Advantageously, the spray bar is configured to rotate between a first and second position where the first position has the first plurality of spray nozzles adjacent the windshield and located between the brush and the return side of the windshield, and where the second position has the second plurality of spray nozzles adjacent the windshield and located between the wiper blade and the starting side of the windshield.

In further variations, the cleaning apparatus could include a cleaning tool housing that is sized and disposed to house a set or subset of cleaning tools, such as a rotatable brush, wiper blade, spray bar, and splashguard, within the housing. Each of the cleaning tools preferably have a length that extends between two opposing sides of the surface, such as the top and bottom of the surface. The length of each cleaning tool preferably extends across a majority of the surface, for example 80%, 90% or even more than 99% of the surface length. An engagement drive mechanism could be configured to mechanically move the rotatable brush, wiper blade, and spray bar from a disengaged position within the housing to an engaged position outside the housing. A closing drive mechanism could be configured to mechanically open and close a door that covers a portion of a cavity of the housing. A movement drive mechanism could be configured to mechanically move the rotatable brush, wiper blade, and spray bar across the surface to clean the surface. A brushing drive mechanism could be configured to mechanically rotate the rotatable brush as the rotatable brush is moved from one side to another side of the surface. Preferably, the brushing drive mechanism mechanically rotates the rotatable brush in opposing directions.

Generally, each of the set of cleaning tools are moved from a disengaged position within the housing to an engaged position outside the housing, and are preferably moved as a single unit, to ready the cleaning tool for use. From the engaged position, the cleaning tool could then be activated to perform a cleaning step. For example the spray bar could spray a liquid at the surface to moisten the surface, the rotatable brush could rotate against the surface to scrub the surface, a tip of the wiper blade could abut the surface to dry the surface, and the spray bar could spray air at the surface to dry the surface. Generally, the spray bar first sprays a liquid, such as washer fluid, at the surface and the rotatable brush rotates against the surface as the movement drive moves the rotatable brush and spray bar across the surface to scrub the surface, and then a tip of the wiper blade touches the surface as the movement drive moves the rotatable brush and spray bar across the surface to dry the surface.

In some embodiments, scrubbing could occur in one pass along the surface, while drying occurs on an opposing pass along the surface, although multiple scrubbing passes and/or multiple drying passes could occur. Preferably, the rotatable brush is moved towards the surface and is rotated against the surface for scrubbing the surface, and is moved away from the surface and is not rotating for drying the surface. A splashguard could optionally be disposed on a side opposite the surface relative to a spraying nozzle of the spray bar, and is preferably disposed to ricochet liquid towards the surface. The spray bar could optionally be configured to spray both liquid and air at the surface to both moisten and dry the surface. In embodiments where the housing has a door, the door could be opened before the cleaning tools are moved from the disengaged position to the engaged position, and closed after the cleaning tools are moved from the engaged position to the disengaged position.

In some embodiments, each of a set of cleaning tools are coupled to discrete arms of the movement drive mechanism such that the movement drive mechanism can move the rotatable brush, wiper blade, and spray bar independently from one another, although in preferred embodiments at least one set of cleaning tools is mounted to a single cleaning tool arm to simplify the complexity of the movement drive mechanism. In some embodiments, a single housing could house a plurality of cleaning tool arms simultaneously, each of which is configured to clean discrete portions of a surface.

In some embodiments, the wiper blade is coupled to a side of the spray bar—preferably on a side of the spray bar opposing a set of spraying nozzles of the spray bar. In such embodiments, a transitioning drive mechanism could be configured to rotate the spray bar from a spraying position to a wiping position, where the spraying position disposes a nozzle of the spray bar closer to the surface than the wiper blade, and where the wiping position disposes the wiper blade closer to the surface than the nozzle of the spray bar. The transitioning drive mechanism could rotate the spray bar from one side to an opposing side of the opposable brush to transition the spray bar between the spraying position and the wiping position. Preferably, the transitioning system disposes the spray bar in the spraying position as the movement drive mechanism moves the spray bar in one direction, and disposes the spray bar in the wiping position as the movement drive mechanism moves the spray bar in an opposing direction.

The tip of the wiper blade could be configured to touch the surface of the windshield at any suitable angle, for example perpendicular to the surface, acute to the surface, or obtuse to the surface. In embodiments where the wiper blade is coupled to a side of the spray bar, the wiper blade could be configured to attach to the spray bar at a variety of angles, or a plurality of interchangeably attachable wiper blades could be provided, having different angled tips could be provided for ease of customization.

Any suitable surface is contemplated, such as a motor vehicle windshield, a building window, or a table surface. The cleaning tool housing is preferably coupled to a side of the surface to be cleaned for ease of repeated deployment. In some embodiments, the major length of the cleaning tool could be oriented along a first axis when placed in the disengaged position within the housing, and oriented along a second axis different from the first axis (e.g. at a 45-degree offset or at a substantially perpendicular offset) when placed in the engaged position outside the housing. In this manner, the housing could be placed on any side of a substantially rectangular surface.

BRIEF DESCRIPTION OF THE DRAWINGS

These and other features and advantages of the invention will become more apparent in light of the following discussion and drawings, in which like numbers refer to like parts throughout, and in which.

DETAILED DESCRIPTION

Figure 1:
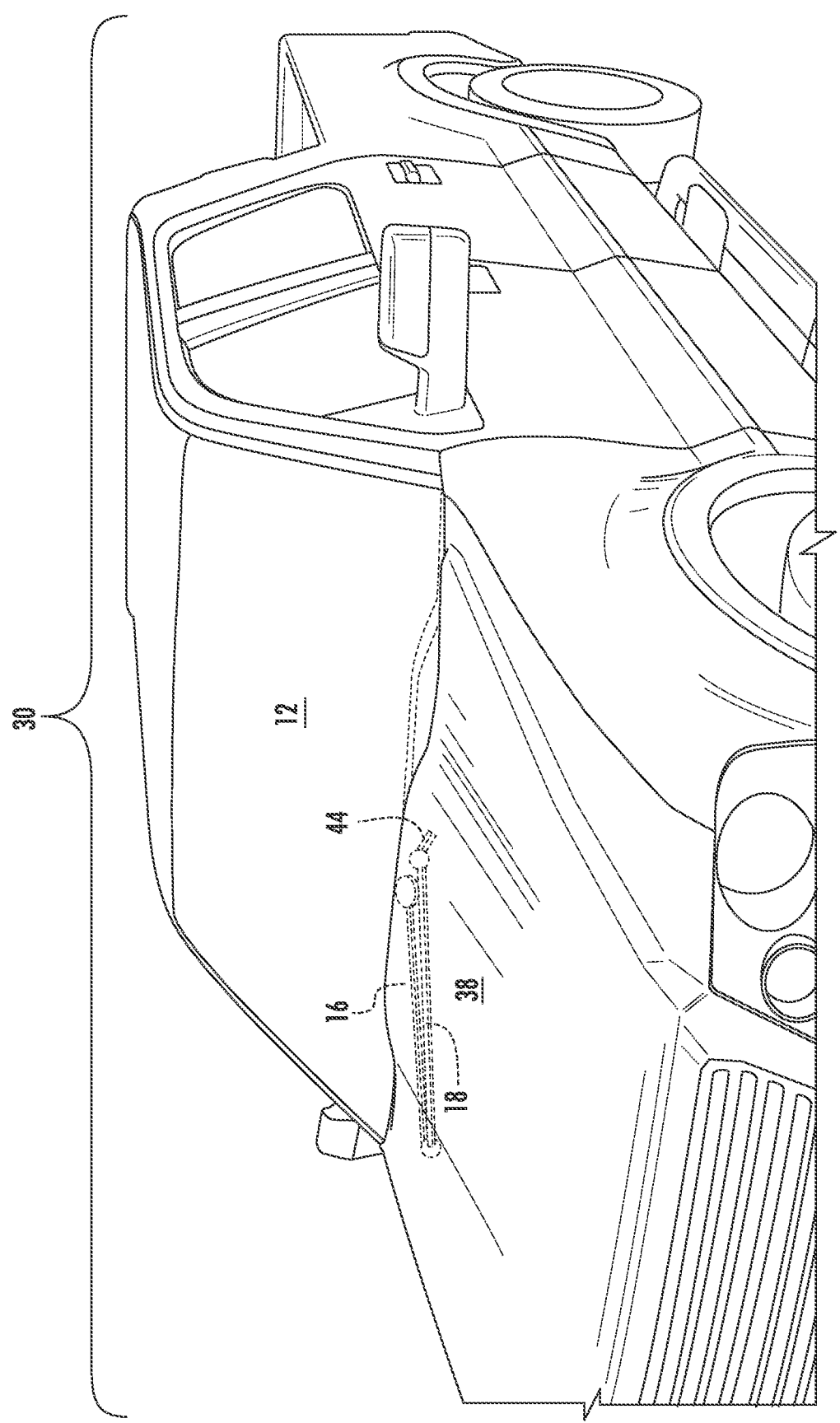
FIG. 1 is a perspective view of an automobile having a windshield cleaning system depicting a first embodiment.
Figure 2:
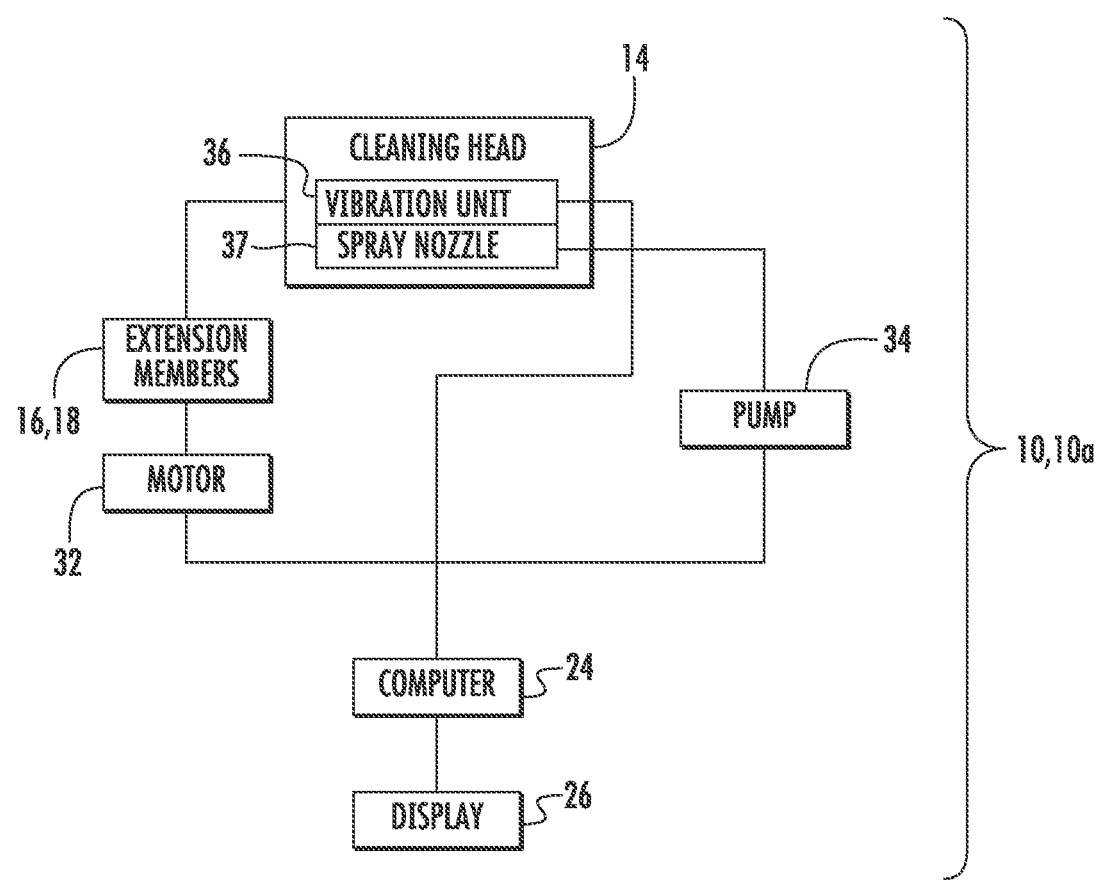
FIG. 2 is a schematic view the windshield cleaning system of the first and a second embodiment.

Referring now to the drawings, a windshield cleaning system 10 for spot cleaning a windshield 12 of an automobile 30 is shown. The windshield cleaning system 10 includes a cleaning head 14 that can be traversed to any location on the windshield 12 by way of extension members 16, 18 that are pivotally attached to each other by articulating joints 20, 22. The cleaning head 14 may be controlled by a computer 24 which receives user input by way of a display 26 located in a passenger cabin of the automobile 30. A driver may touch the display 26 about where the windshield 12 is dirty. The computer 24 receives information from the display 26 which controls a motor 32 to actuate the cleaning head 14 to the location indicated by the driver on the display. A pump 34 sprays cleaning fluid on the dirt to help break down the dirt so that the dirt can be removed from the windshield 12. The motor 32 moves the cleaning head 14 over the dirt and an optional vibration unit 36 can further be activated to help remove the dirt from the windshield 12.

Referring now to the drawings, the automobile 30 may have the windshield cleaning system 10 shown in FIGS. 1-11 or the windshield cleaning system 10a shown in FIGS.

12-13 or combinations thereof implemented in the automobile 30 as shown in the figures. The automobile 30 shown in the figures is that of a pickup truck. However, other automobiles including but not limited to sedans, sports cars, large-format trucks, etc. may incorporate the windshield cleaning systems 10, 10a described therein.

The windshield cleaning system 10 is hidden under a hood 38 of the automobile when the windshield cleaning system 10 is not in use, as shown in FIG. 1. The windshield cleaning system 10 includes the cleaning head 14, extension members 16, 18, motor 32 which drives the extension members 16, 18, the pump 34, the computer 24 and the display 26.

Figure 3:
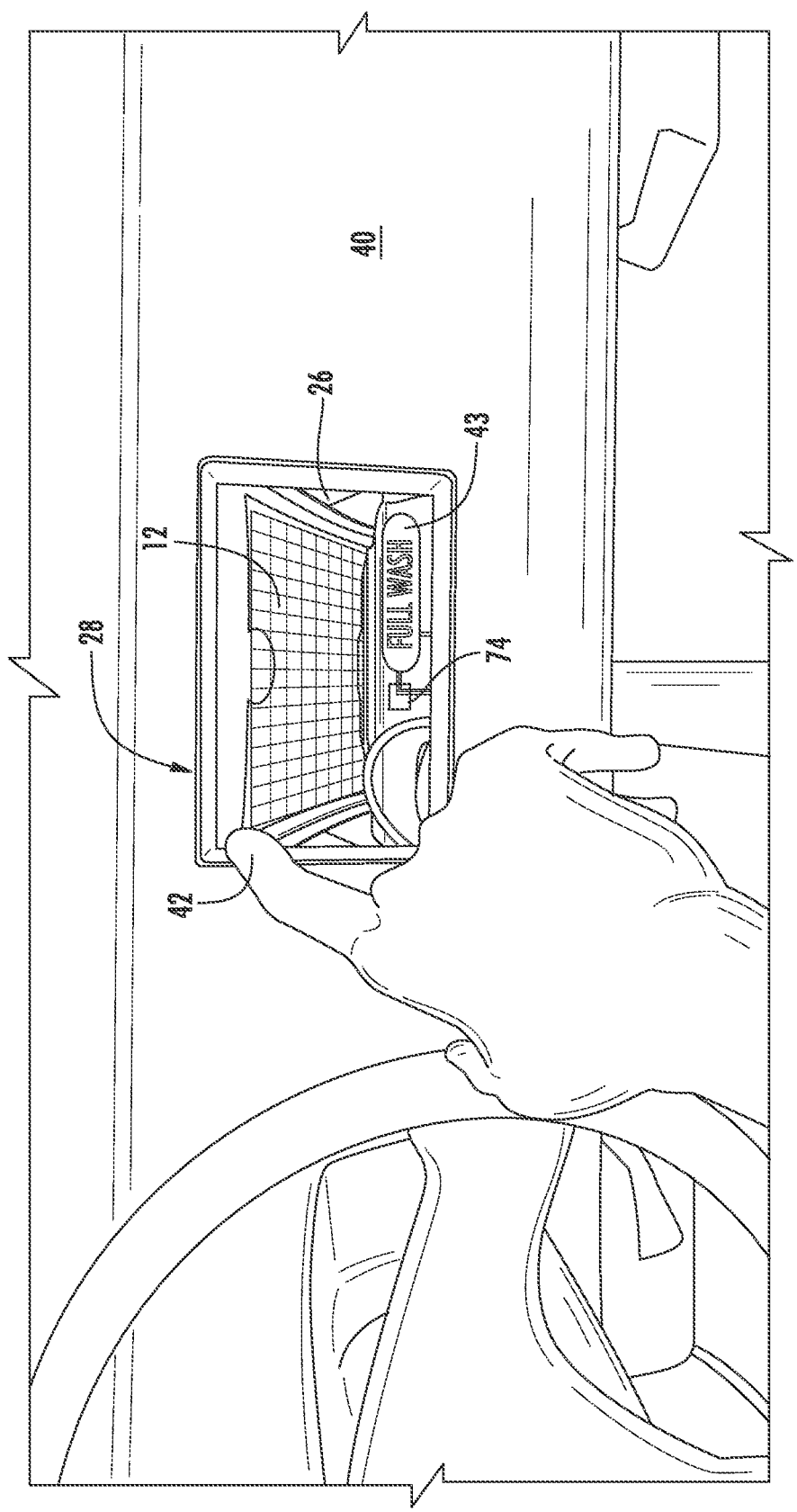
FIG. 3 is an illustration of a display of the windshield cleaning system

To deploy the window washing system 10, the user may activate the system from the display 26 shown in FIG. 3. The display 26 may be mounted to a dashboard 40 within a cabin 28 of the automobile 30. However, it is also contemplated that the display 26 may be mounted to other areas of the passenger cabin such as the center console or driver-side armrest. The display 26 may be located centrally on the dashboard 40 so that the user or driver can easily access and manipulate the display 26. The display 26 may be a touch sensitive screen as shown in FIG. 3 but may also be a mouse driven display. If the display 26 is a mouse driven display, then the automobile 30 may have a joystick located on the dashboard, center console or other area that the driver can manipulate so that a cursor on the display 26 may be traversed to a proper location. An icon displayed on the display 26, may be selected by depressing a button on the joystick or other area near the joystick. A spot on the display 26 depicting the windshield 12 may also be selected by traversing the cursor shown on the display 26 with the joystick and depressing the button. Nevertheless, the preferred embodiments show the display 26 as a touch sensitive screen. The user can touch the screen with his or her finger 42 in order to select the icon displayed on the display 26.

The display 26 illustrates the front windshield 12 of the automobile 30. Moreover, the display 26 also shows an option for a full wash 43. By depressing an area on the display 26 illustrated by the windshield 12 with the finger 42, the windshield cleaning system 10 may be deployed and clean only a spot area or localized area on the windshield 12 as indicated by the area depressed by the finger 42 of the driver or user. Alternatively, if a full wash of the windshield 12 is desired, then the user may depress the full wash icon 43 on the display 26. Depending on whether the user depresses a localized area on the display 26 depicting the windshield 12 or the full wash icon 43, the windshield cleaning system 10 may be deployed to wash the localized area or the entire viewing area of the front windshield.

Figure 4:
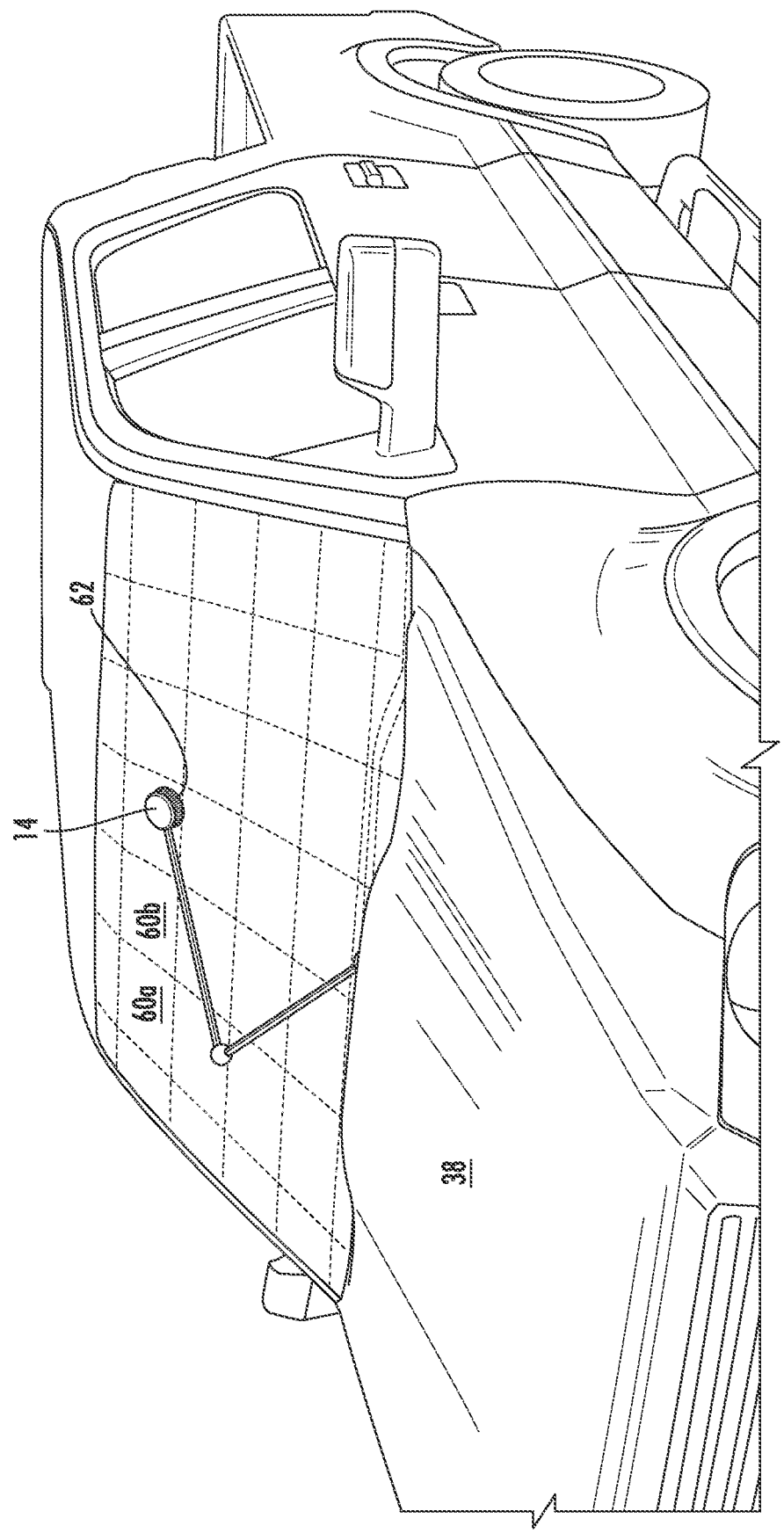
FIG. 4 is an illustration of the first embodiment of the windshield cleaning system in a deployed configuration.
Figure 5:
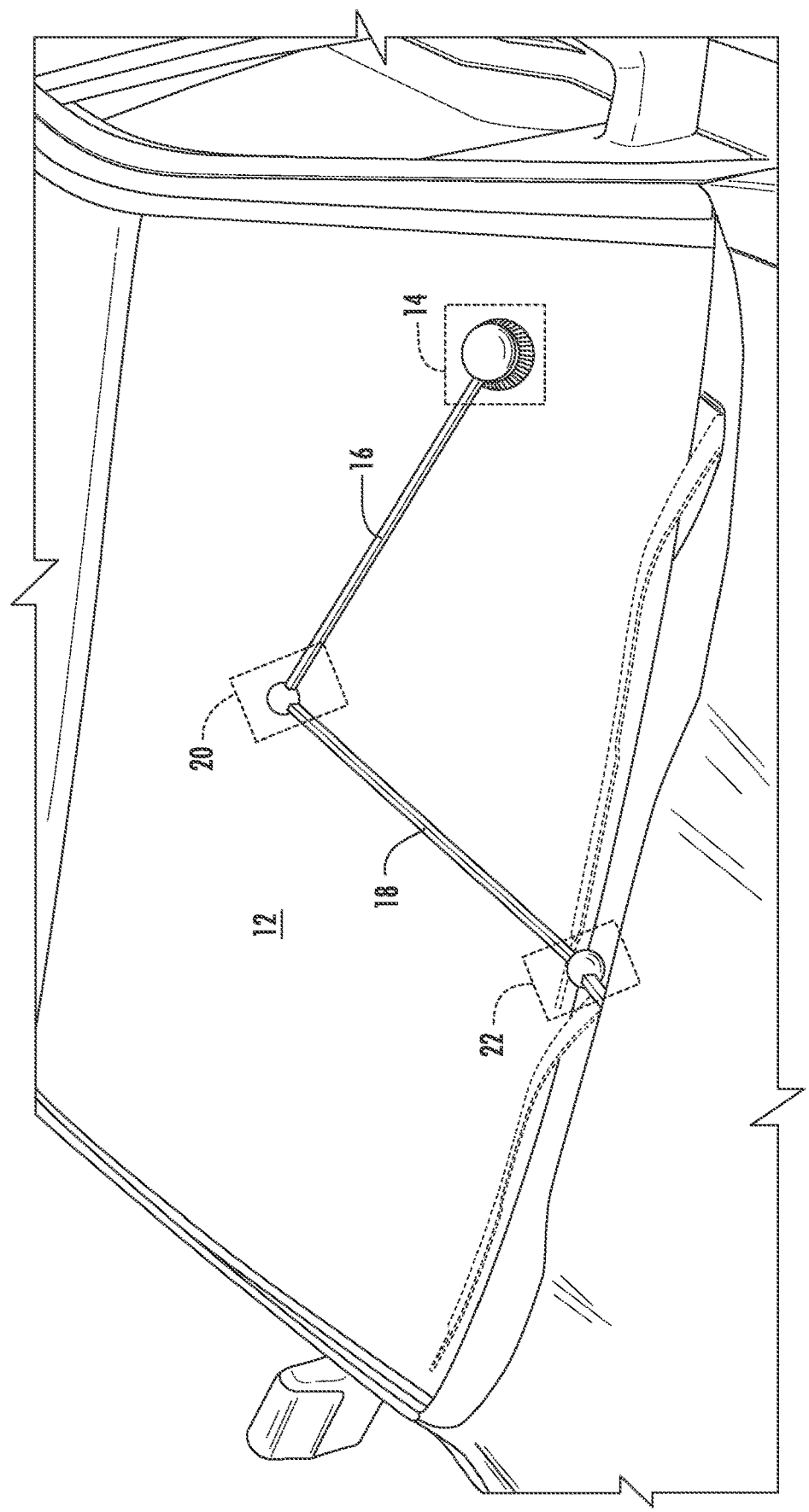
FIG. 5 is an illustration of the first embodiment of the windshield cleaning system in the deployed configuration with a cleaning head in a different position compared to that shown in FIG. 4.
Figure 6:
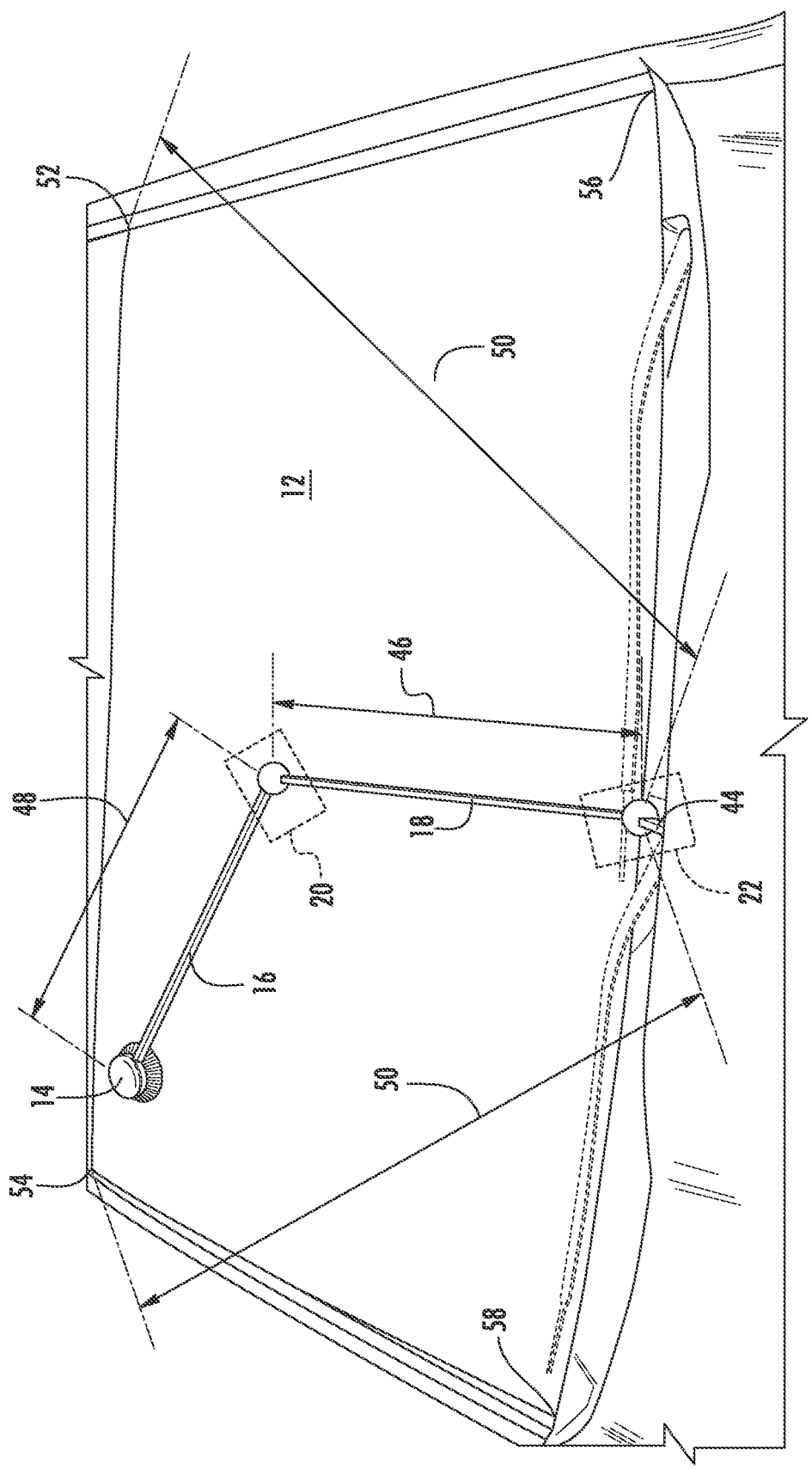
FIG. 6 is an illustration of the first embodiment of the windshield cleaning system in the deployed configuration with the cleaning head in a different position compared to that shown in FIGS. 4 and 5.
Figure 7:
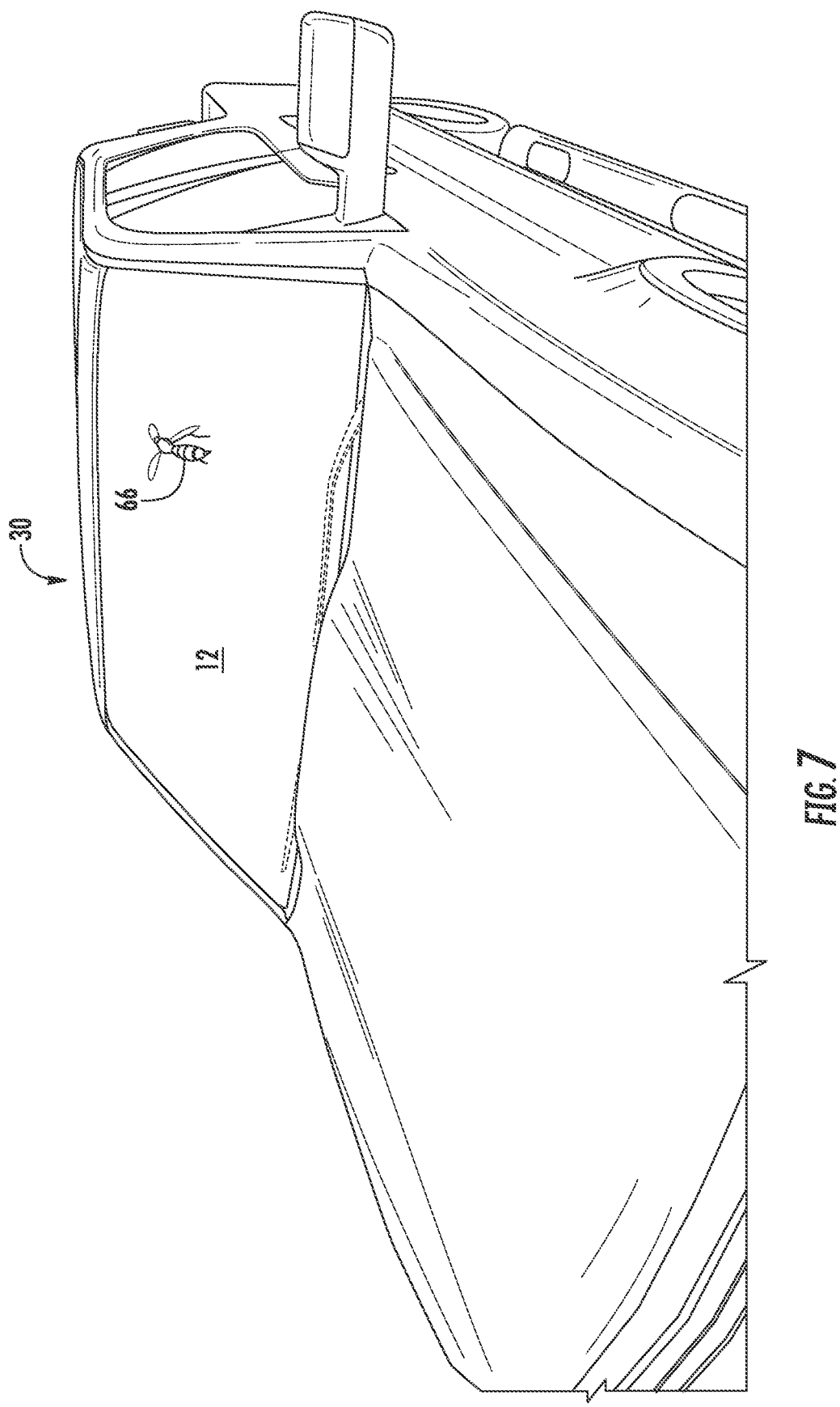
FIG. 7 illustrates a bug flying toward a windshield of an automobile.

If the driver depresses the full wash option 43 on the display 26, the windshield cleaning system 10 begins to deploy as shown in FIG. 4. The extension members 16, 18 are raised out from under the hood 38. The extension members 16, 18 are connected to each other by way of an articulating joint 20 as shown in FIG. 5. The extension member 18 is attached to the automobile 30 by way of a base member 44. The base member a can also be traversed out from under the hood 38 as shown in FIG. 1 or traversed toward the windshield 12 as shown in FIG. 5. When the windshield cleaning system 10 is tucked under the hood 38, the base member 44 is retracted under the hood 38. Also, the articulating joint 20 allows the extension members 16, 18 to be folded or made parallel with respect to each other. The extension members 16, 18 are then placed laterally and tucked under the hood 38 as shown in FIG. 1.

The articulating joints 20, 22 control movement of the extension member 18 with respect to the base member 44, and the extension member 16 with respect to the extension member 18. By having two extension members 16, 18, the entire surface area of the windshield 12 may be cleaned by the cleaning head 14. A length 46 of the extension member 18 plus a length 48 of the extension member 16 may be equal to or longer than a distance 50 from the articulating joint 22 to either of an upper driver side corner 52 or a passenger side corner 54 of the windshield 12. In this manner, when the extension members 16, 18 are linearly aligned (i.e., straight) to each other, the cleaning head 14 can reach the full extent of the windshield 12 up to the passenger side corner 54 and the driver side corner 52 of the windshield 12.

The articulating joint 22 allows the extension member 18 to rotate at least 180° (e.g. between 165° and 195°) so that the extension member 18 can extend horizontally toward a driver side lower corner 56 and a passenger side lower corner 58. The articulating joint 20 allows the extension member 16 to rotate at least 275° and up to 360° so that the extension member 16 can be positioned parallel on either side of the extension member 18. The extension member 18 may rotate with respect to the base member 44 and the extension member 16 may rotate with respect to the extension member 18 by way of chains and/or pulleys that are driven by a motor located under the hood 38. Alternatively, the articulating joints 20, 22 may have micro motors and gears that control the rotation of the respective extension members 16, 18 with respect to each other in the extension member 18 with respect to the base member 44.

When the user depresses the full wash option 44 on the display 26, the extension members 16, 18 are deployed out from under the hood 38. The extension members 16, 18 position the cleaning head 14 about an area on the windshield 12 to be cleaned. The cleaning head 14 cleans a small portion of the windshield 12 before it moves on to the next area of the windshield 12 to be washed. By way of example and not limitation, the windshield 12 may be divided into sections 60a-n. When the entire windshield 12 is to be washed, the cleaning head 14 may be traversed over one of the sections 60 such as section 60a. With the cleaning head 14 over the section 60a of the windshield 12, cleaning fluid may be squirted out of the cleaning head 14 on the windshield 12 at section 60a.

The cleaning head 14 may have a vibration unit that vibrates bristles 62 of the cleaning head 14 so that dirt and grime can be more effectively rubbed off of the windshield 12. As the bristles clean the windshield 12 at section 60a, the cleaning fluid drips down onto a lower section of the windshield 12. Even though the cleaning fluid drips down onto the lower section of the windshield 12, the cleaning head 14 will eventually clean that area too as the cleaning head 14 laterally cleans each section laterally from top to bottom.

The cleaning head 14 may also be paired with a rubber blade or wiper 64. In particular, the rubber wiper 64 is located under the extension member 16. The rubber wiper 64 has a generally pointed tip which contacts the windshield and is flexible so that the rubber wiper 64 can extend across a portion of section 60 that has been washed clean by the bristles 62 of the cleaning head 14 to wipe the section 60 dry by pushing the cleaning fluid to the side or downward. Alternatively, the cleaning head 14 can clean two or more sections first then the rubber wiper 64 can wipe dry two or more sections 60 at the same time. The cleaning head cleans the upper row of sections 60a, b, c-n first. Thereafter, the cleaning head 14 cleans the next lower row of sections 60 by following the procedures discussed above. It is also contemplated that the cleaning head 14 may clean all of the sections 60 of the windshield 12 first before the rubber wiper 64 wipes the windshield 12 dry.

Figure 8:
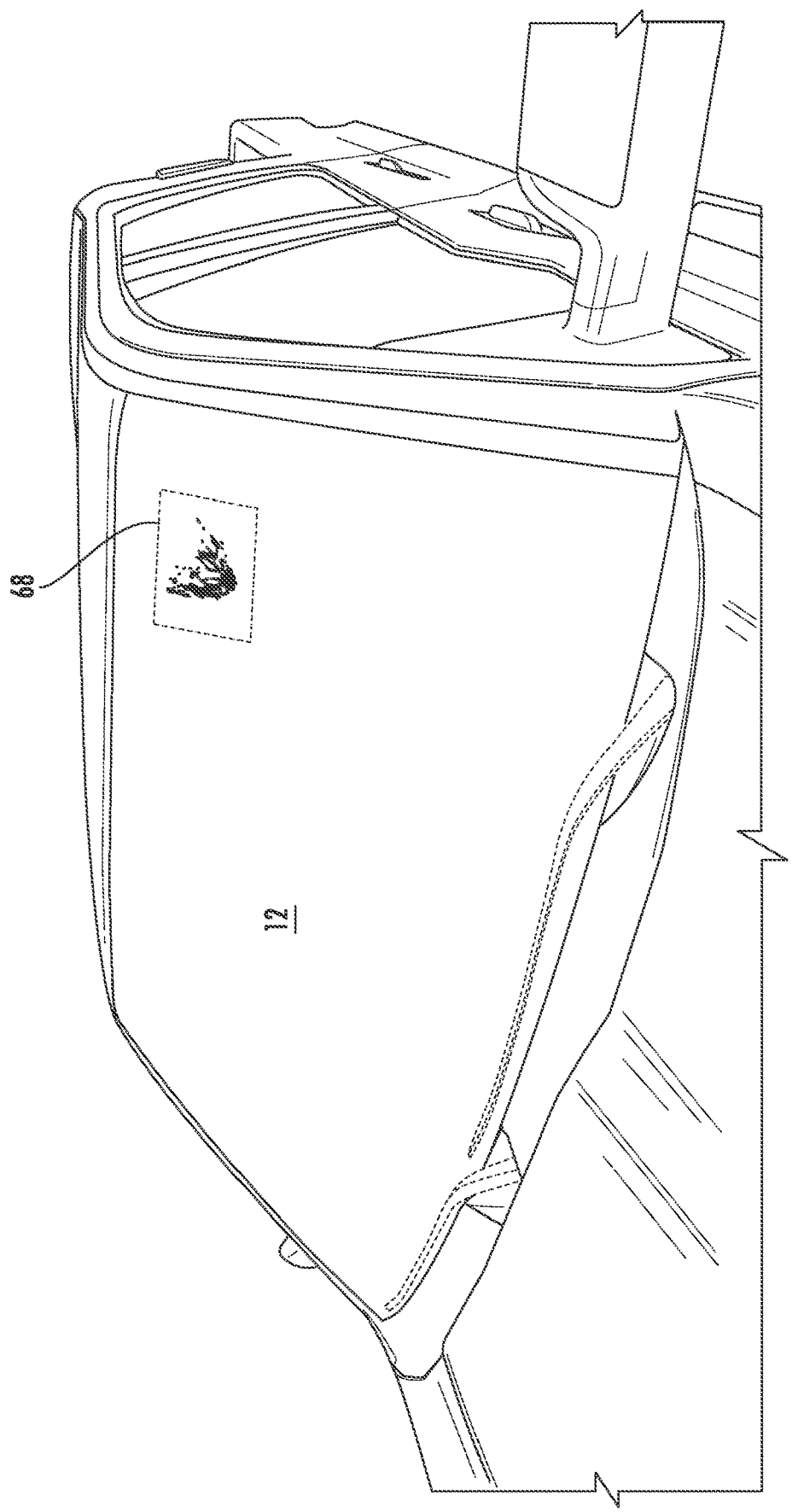
FIG. 8 illustrates the bug leaving a residue on the windshield after contacting the windshield.
Figure 9:
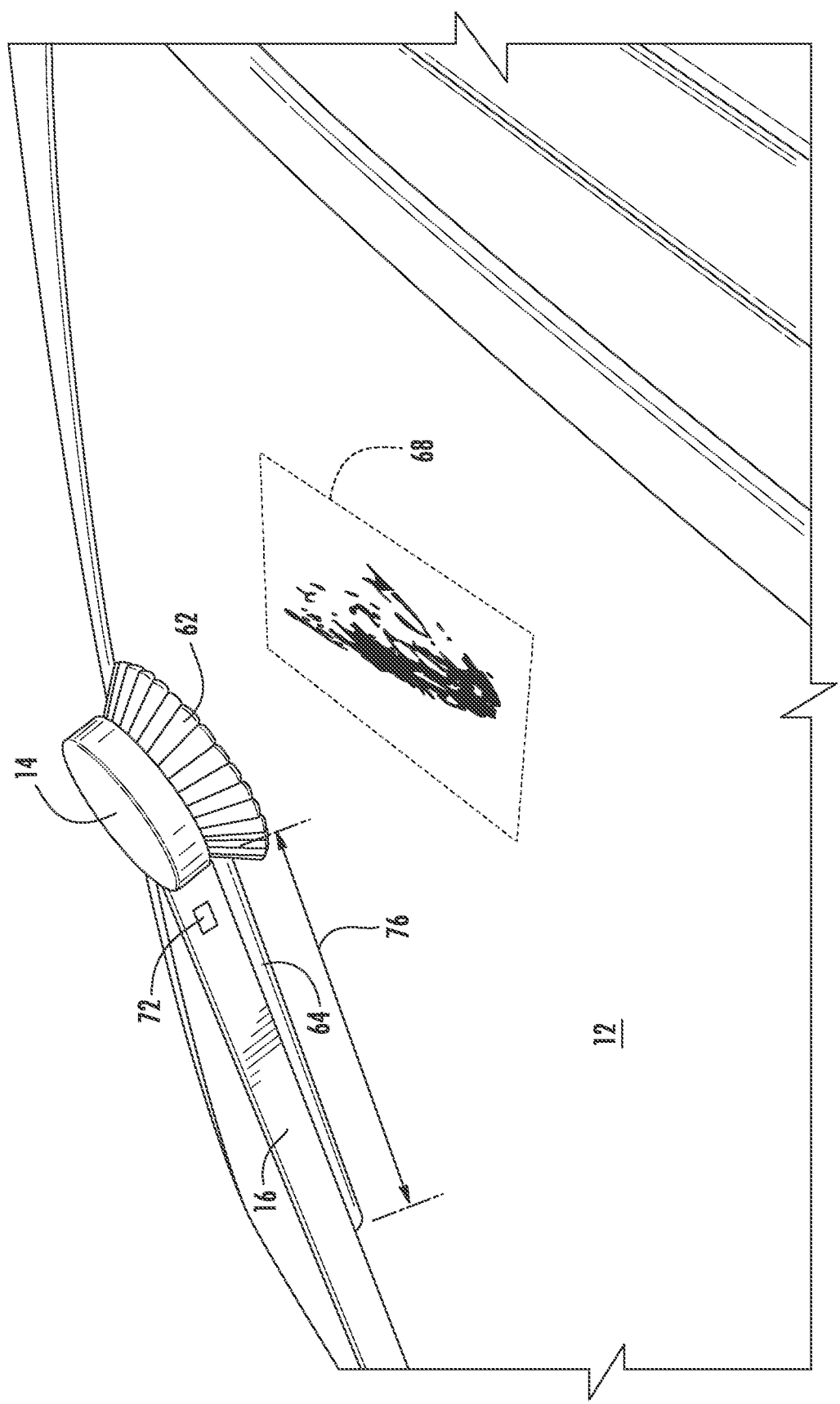
FIG. 9 illustrates the cleaning head of the first embodiment of the windshield cleaning system positioned over the residue shown in FIG. 8.
Figure 10:
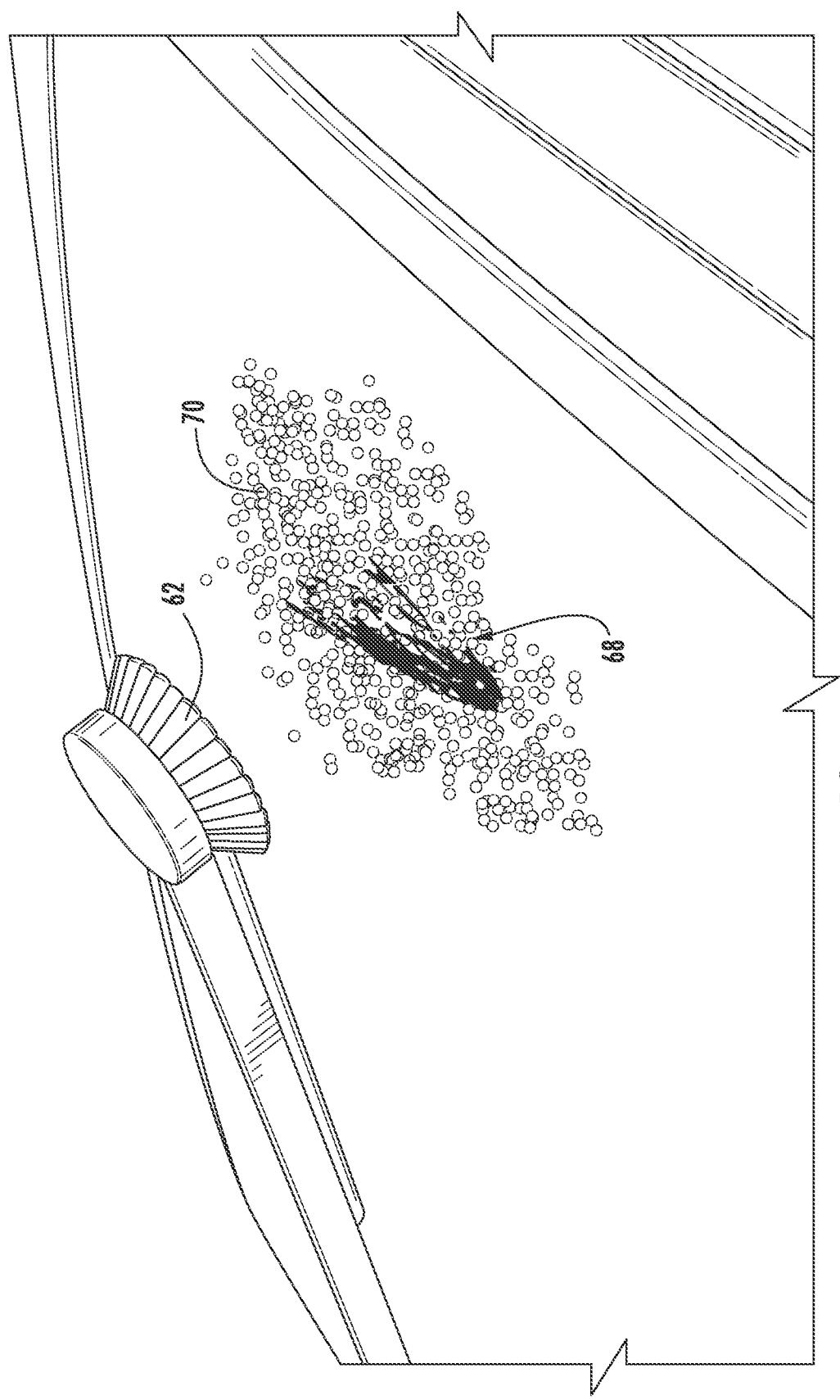
FIG. 10 illustrates cleaning fluid being sprayed on the residue via a spray nozzle mounted to the cleaning head.
Figure 11:
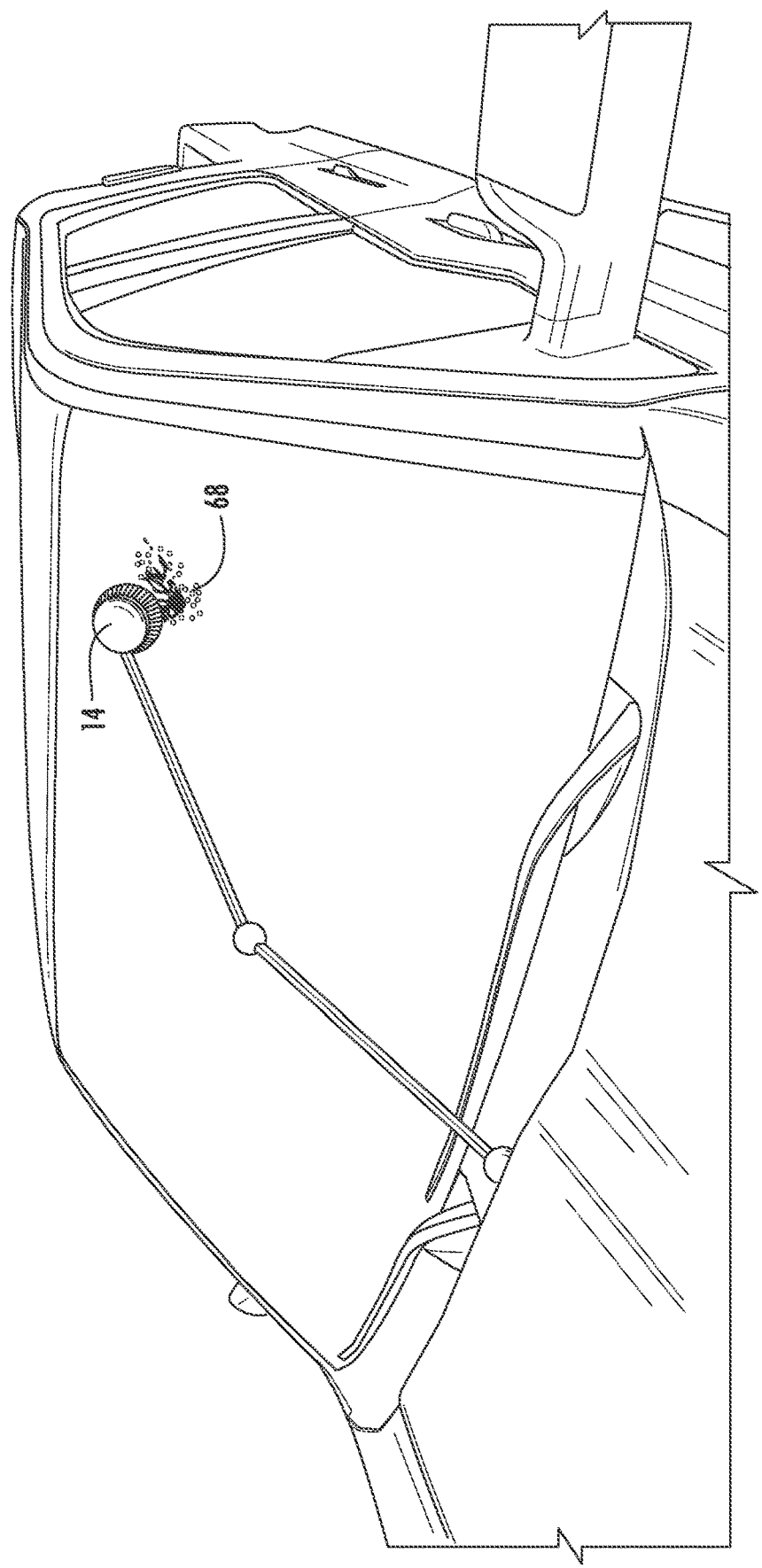
FIG. 11 illustrates the cleaning head cleaning the residue off of the windshield.

Referring now to FIGS. 7-12, the windshield cleaning system 10 may have a spot clean feature. In this regard, the system 10 may clean a spot of dirt and grime on the windshield 12. In particular, when the automobile 30 is being driven, a bug 66 may approach the windshield 12. The bug may be killed by hitting the windshield 12, as shown in FIG. 8 and die but leave a residue 68 on the windshield 12. When the driver is driving the automobile 30, the residue 68 may visually impair the driver's vision through the windshield 12 and at the very least irritate the driver since the windshield 12 is not clean. To clean the windshield, the driver may be presented with an illustration of the windshield 12 on the display 26. The driver can depress the display 26 at about the location where the residue 68 is on the windshield 12. By depressing an area on the display 26 depicting the windshield 12, this may actuate the extension members 16, 18 and the base member 44 to move into the deployed configuration. In the deployed configuration, the extension members 16, 18 and the base member 44 move out from under the hood 38 and position the cleaning head 14 at the corresponding location on the windshield 12 where the user depressed the display 26, as shown in FIG. 9. When the cleaning head 14 is disposed over the residue 68, the cleaning head, which also has a spray nozzle 37, sprays cleaning fluid 70 on the residue 68. The cleaning head 14 is shown as being lifted above the residue 68, but this is merely for the purposes of clarification. The cleaning head 14 extends immediately above the residue 68 so that the bristles 62 contact the windshield 12. The spray nozzle for the cleaning fluid is located under the cleaning head 14 or within the outer perimeter defined by the bristles 62. A tube is routed through the extension members 16, 18 to supply the cleaning fluid to the spray nozzle.

Figure 12:
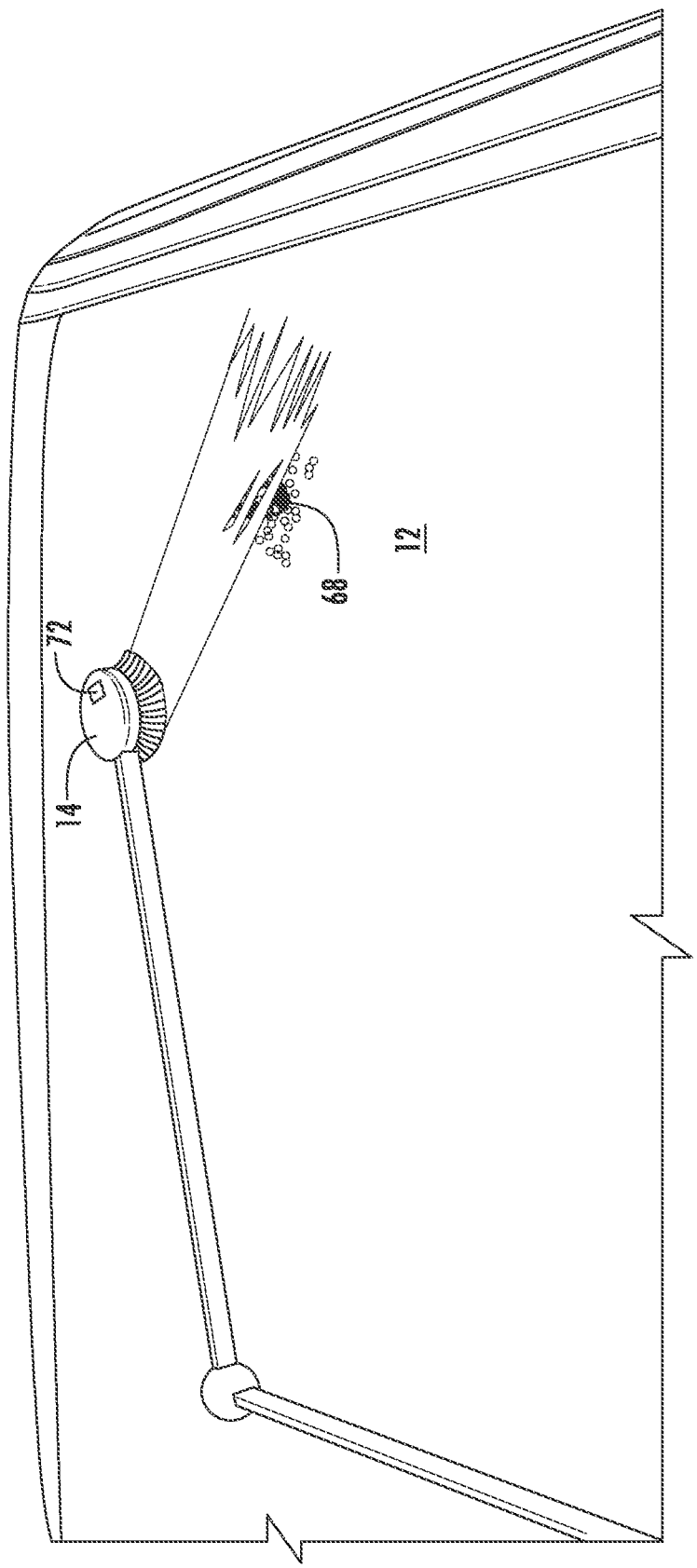
FIG. 12 illustrates the cleaning head wiping the residue off of the windshield.

With the cleaning head 14 disposed adjacent or on top of the residue 68, the cleaning head 14 can be traversed back and forth over the residue 68 with the motor 32 controlling the motions of the extension members 16, 18 or microcontroller in the articulating joints 20, 22. As the cleaning head 14 moves back-and-forth as shown in FIG. 12, the residue 68 is cleaned off of the windshield 12. The cleaning head 14 may be traversed back and forth but may also have other motions such a circular or oval in order to clean the residue 68 off of the windshield 12. To further facilitate cleaning of the residue 68 off of the windshield 12, the cleaning head 14 may also have a vibration unit 72 as shown in FIG. 12. The vibration unit 72 may always be on if the cleaning head 14 is in the deployed position. Alternatively, the vibration unit 72 may be on only if the user depresses the vibration option from the cabin and more particularly by depressing a vibration option icon 74 on the display 26.

The cleaning head 14 may have a plurality of bristles 62 that are formed in a round configuration. The bristles 62 may extend across the entire area defined by the outer perimeter of the bristles 62 as shown in the drawing. Alternatively, a central portion of the bristles 62 may be less dense or empty so that a spray head can protrude and spray cleaning fluid on to the windshield 12. Although the bristles 62 are shown in a round configuration, other shapes and configurations are also contemplated. By way of example and not limitation, the bristles 62 may be formed into a triangular or rectangular or square configuration. The bristles may be fabricated from a soft yet rigid material so that the distal ends of the bristles 62 may apply friction to the residue 68 to rub the residue 68 off of the windshield 12. The bristles may additionally be softer than the windshield 12 so that repeated cleaning of the windshield 12 by the cleaning head 14 does not scratch the windshield 12. By way of example and not limitation, the bristles 62 may be fabricated from a polyethylene material.

The bristles 62 are shown as being stationary or fixed to the cleaning head 14. However, it is also contemplated that the bristles 62 may rotate in a clockwise direction, counterclockwise direction or alternate between clockwise and counterclockwise directions. A motor may be mounted within the cleaning head 14 to accomplish the rotational movement of the bristles 62. Electrical wiring may be routed to the cleaning head 14 through the extension members 16, 18 to the computer 24.

The vibration unit 72 may be mounted within the cleaning head 14 but may also be mounted near the cleaning head 14 on the extension member 16. Regardless of where the vibration unit 72 is located, the vibration unit 72 is operative to vibrate the bristles 62 to increase the cleaning action of the bristles 62 on the residue 68. The vibration unit 72, as discussed above, may have multiple modes of operation. In a first mode of operation, the vibration unit 72 may be activated and turned on only when the windshield wiper system 10 is in the deployed configuration, namely, when the cleaning head 14 is extended out from under the hood 38 and over the windshield 12. In a second mode of operation, the vibration unit 72 may be activated and turned on only after a spray nozzle located on the cleaning head 14 squirts cleaning fluid on to the windshield 12. In a third mode of operation, the vibration unit 72 may be activated and turned on only upon depression of the vibration icon 74 on the display 26. In this matter, the driver or user can dictate when the vibration unit 72 is turned on and activated.

The rubber wiper 64 may be disposed immediately under the extension member 16, as shown in FIG. 9. The rubber wiper 64 may extend downward from the extension member 16 and be positioned so that a central plane that bisects the rubber wiper 64 is generally perpendicular to the windshield wiper 12. The rubber wiper 64 may be generally flexible so that as the rubber wiper 64 squeegees the residue 68 and the cleaning fluid off of the windshield 12, the rubber wiper 64 may bend in an opposite direction compared to the direction of travel of the rubber wiper 64. A length 76 of the rubber wiper 64 may be about 4 to 6 inches and up to 18 inches long. The rubber wiper 64 is operative to wipe the residue 68 and the cleaning fluid off of the windshield 12 by causing the rubber wiper 64 to be traversed over the windshield 12 in a sweeping motion similar to a squeegee.

Figure 13:
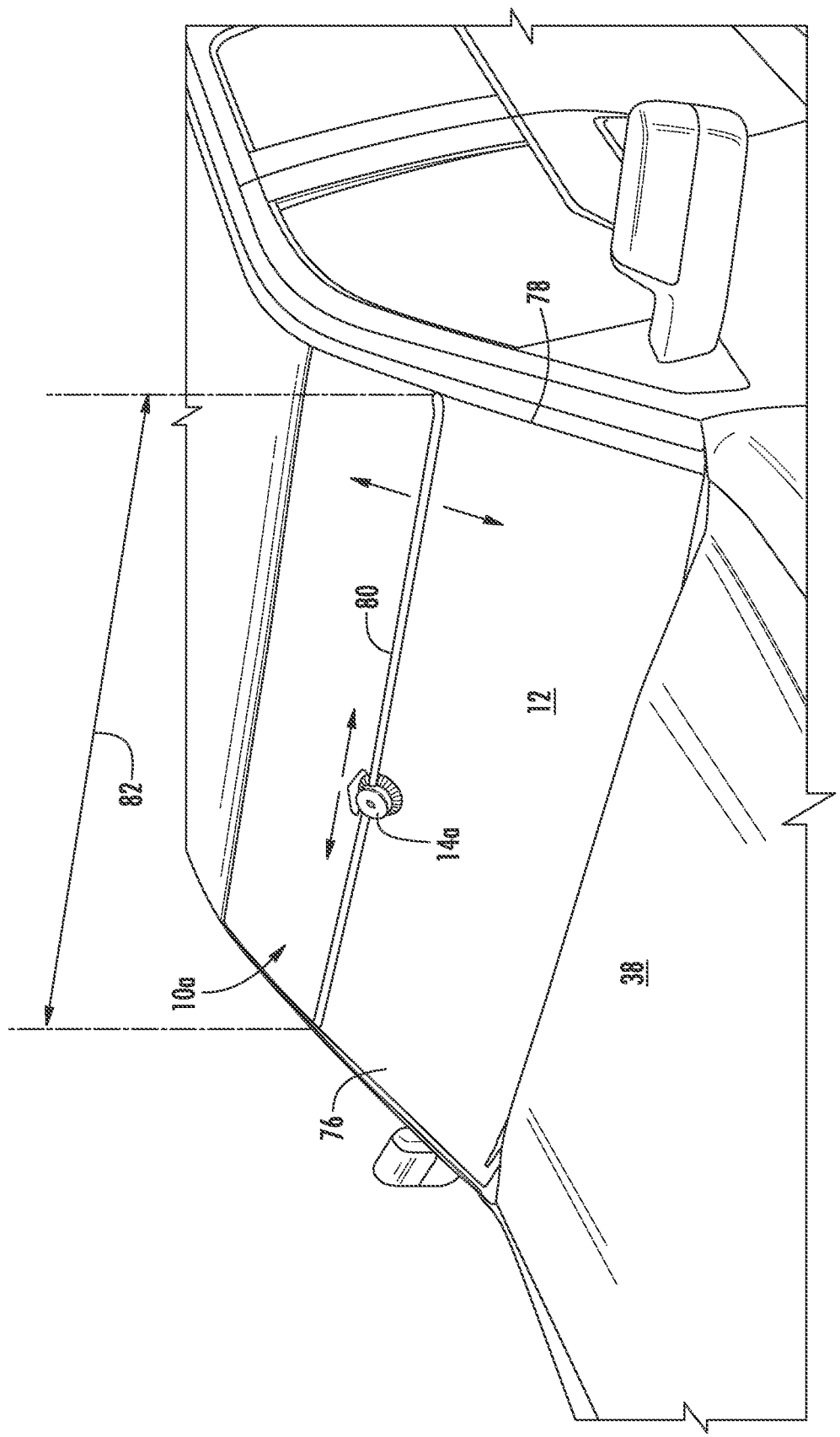
FIG. 13 illustrates the second embodiment of the windshield cleaning system.
Figure 14:
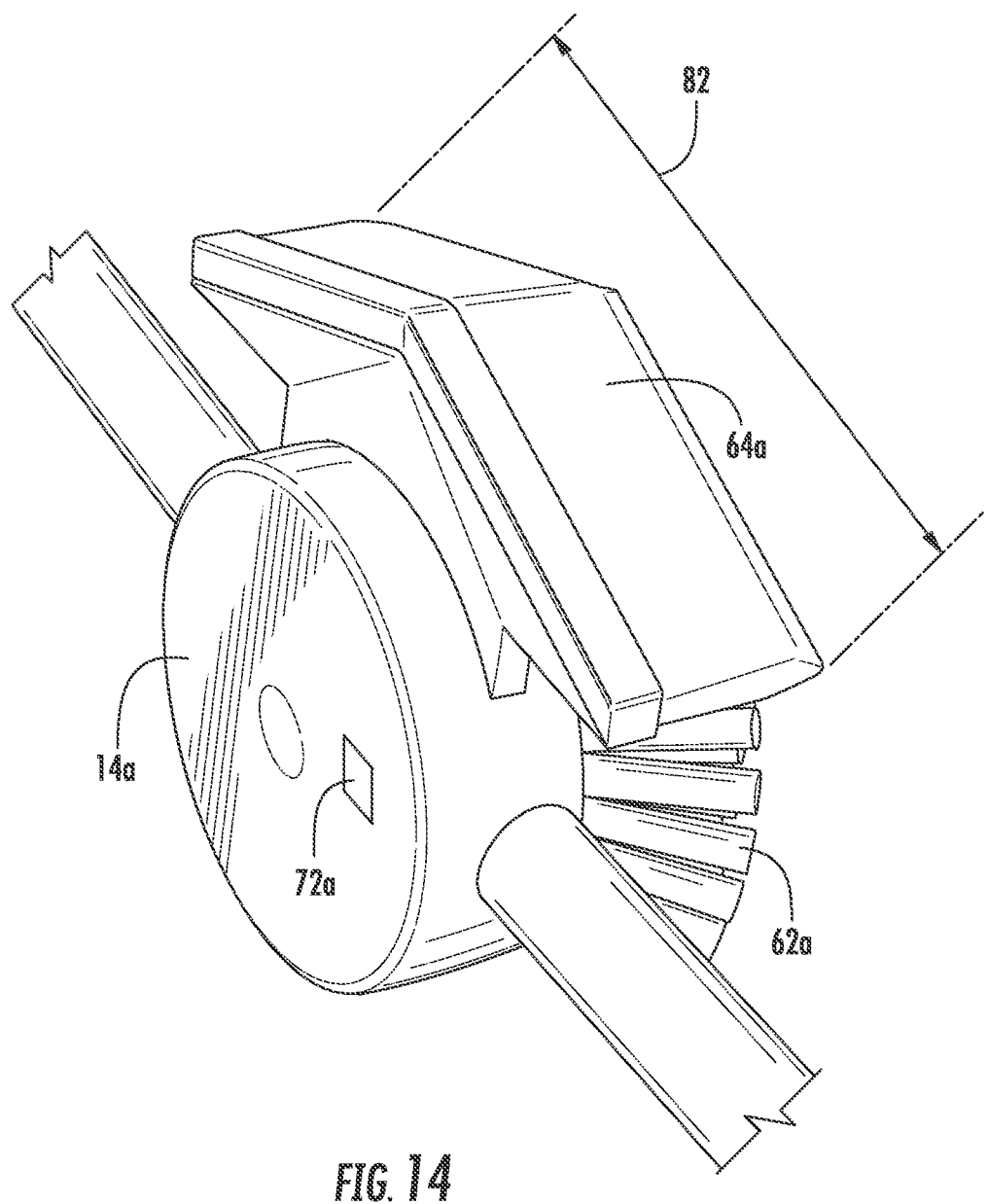
FIG. 14 illustrates the cleaning head of the second embodiment of the windshield touch and clean system as shown in FIG. 13.

Referring now to FIGS. 13 and 14, a second embodiment of the windshield cleaning system 10a is shown. Instead of the cleaning head 14a being controlled by two extension members 16, 18, the cleaning head 14a is controlled by an X-Y gantry system. The left and right sides of the windshield 12 may have left and right tracks. These tracks 76, 78 receive a horizontal member 80, and more particularly, opposed end portions of the horizontal member 80. The tracks are operative to lift the horizontal member 80 up and down the tracks 76, 78 on the windshield 12. By way of example and not limitation, the left and right tracks 76, 78 may be retrofitted with a linear micro motor that lifts the horizontal member 80 up and down the tracks 76, 80. When the windshield wiper system 10a is traversed to a stored position, the tracks extend downward below the hood 38 so that the horizontal member 80 and the cleaning head 14a can be tucked under the hood and out of sight.

If the left and right tracks 76, 78 are parallel to each other, then the horizontal member may have a fixed width 82.

However, if the left and right tracks 76, 78 are skewed with respect to each other. For example, the upper side of the tracks 76, 78 are closer to each other or have a smaller width 82 compared to a lower side of the tracks 76, 78. In this case, the horizontal member 80 may have an adjustable width 82. The adjustment in the width 82 of the horizontal member 80 may come in the form of a telescoping rod on the passenger side of the horizontal member 80. It is also contemplated that the telescoping feature of the horizontal member 80 may be formed on the driver side of the horizontal member 80. The cleaning head 14a may be traversed left and right along the horizontal member 80 so that the cleaning head 14a can reach the entire surface area of the windshield 12 for cleaning.

The windshield cleaning system 10a may operate in the same fashion as that of the windshield cleaning system 10 except that the cleaning head 14a is traversed over the windshield 10 with the gantry system instead of two extension members 16, 18 connected with articulating joints 20, 22. Moreover, the rubber wiper 64a has an arrow configuration compared to the straight linear configuration shown in respect to the windshield cleaning system 10. The rubber wiper 64a is also disposed above the bristles 62a of the cleaning head 14a. Preferably a width 82 of the rubber wiper 64a is about as wide as a diameter of the bristles 62a. Also, the width 82 may be about 4 to 12 inches wide.

The horizontal member 80 may be a bar with telescoping portions on either the passenger side with the driver side when the tracks 76, 78 are skewed with respect to each other. If the tracks and 76, 78 are parallel with respect to each other, then the horizontal member 80 may be a fixed length. However, it is also contemplated that the horizontal member 80 may be a belt driven structure. The belt driven structure comprises of a circular belt that runs on pulleys. The pulleys may be located adjacent the tracks 76, 78 and be operative to be traversed up and down the tracks 76, 78. The cleaning head 14a is fixedly attached to the belt. In order to traverse the cleaning head 14a in the left and right directions, the pulleys are rotated to move the belt, and thus the cleaning head 14a in the left and right directions.

Figure 15:
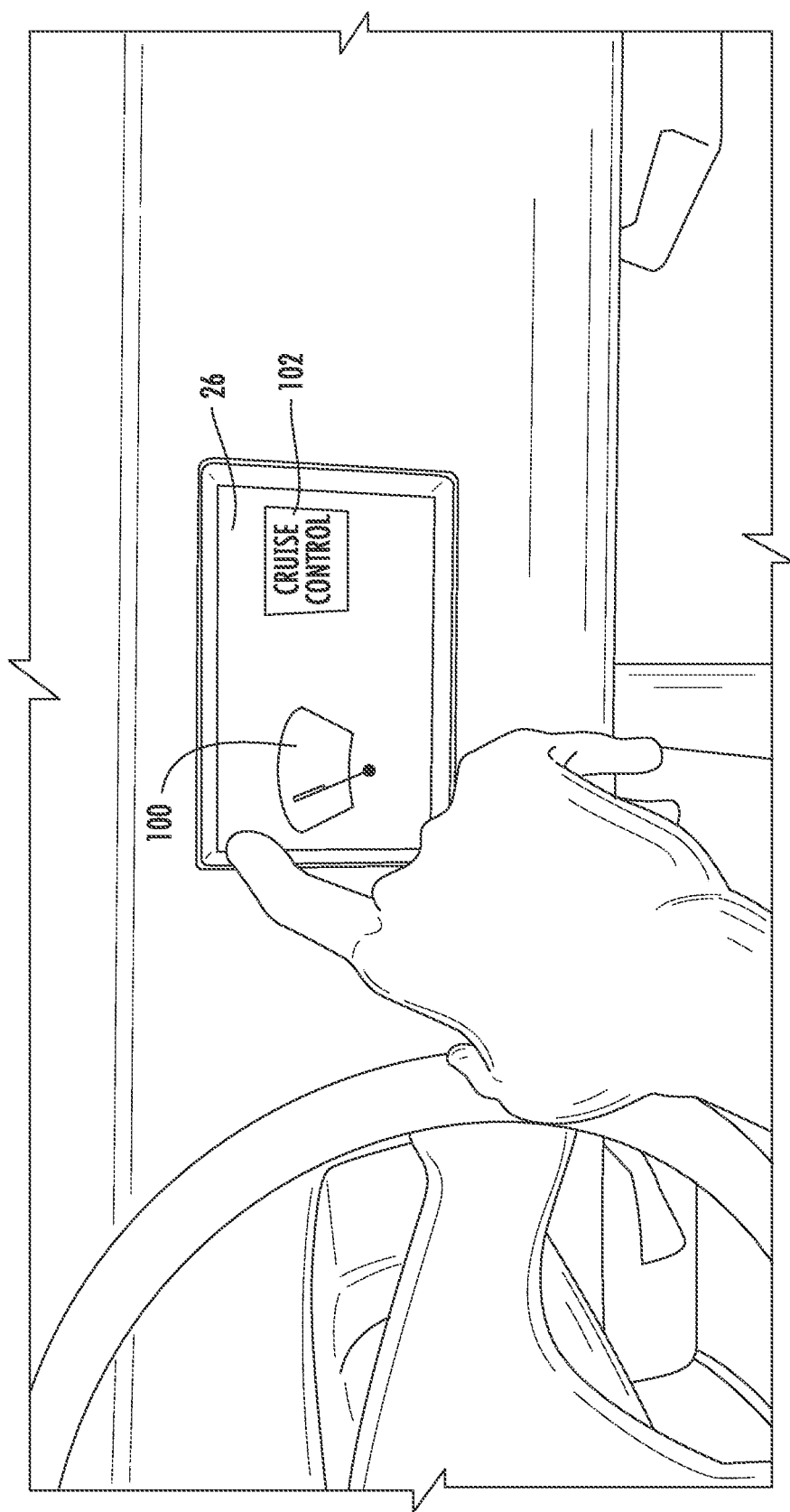
FIG. 15 is an illustration of the display with icons for the windshield cleaning system.
Figure 16:
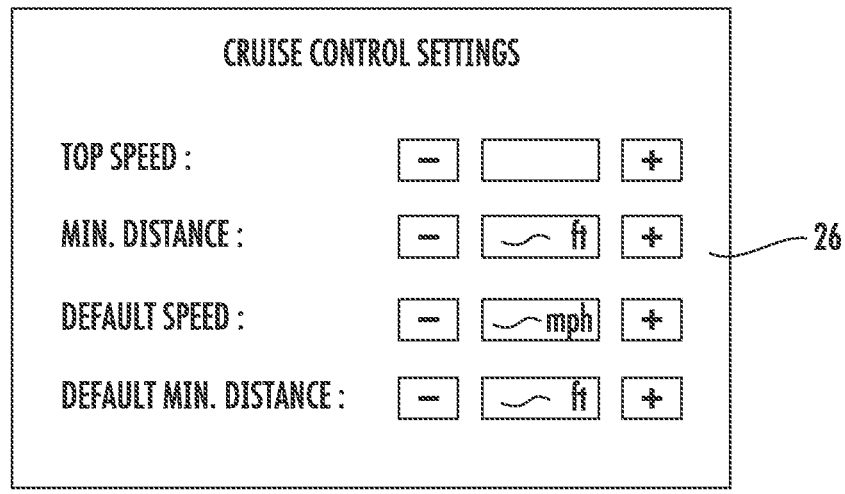
FIG. 16 is an illustration of the display with controls for a cruise control feature.
Figure 17:
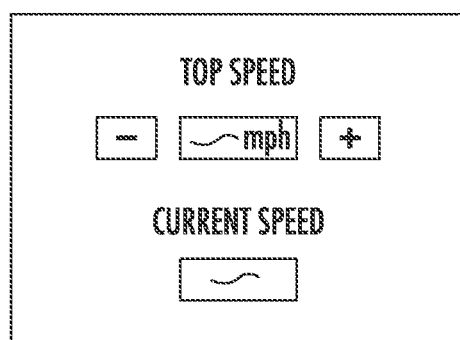
FIG. 17 is an illustration of the display with additional controls for the cruise control feature.
Figure 18:
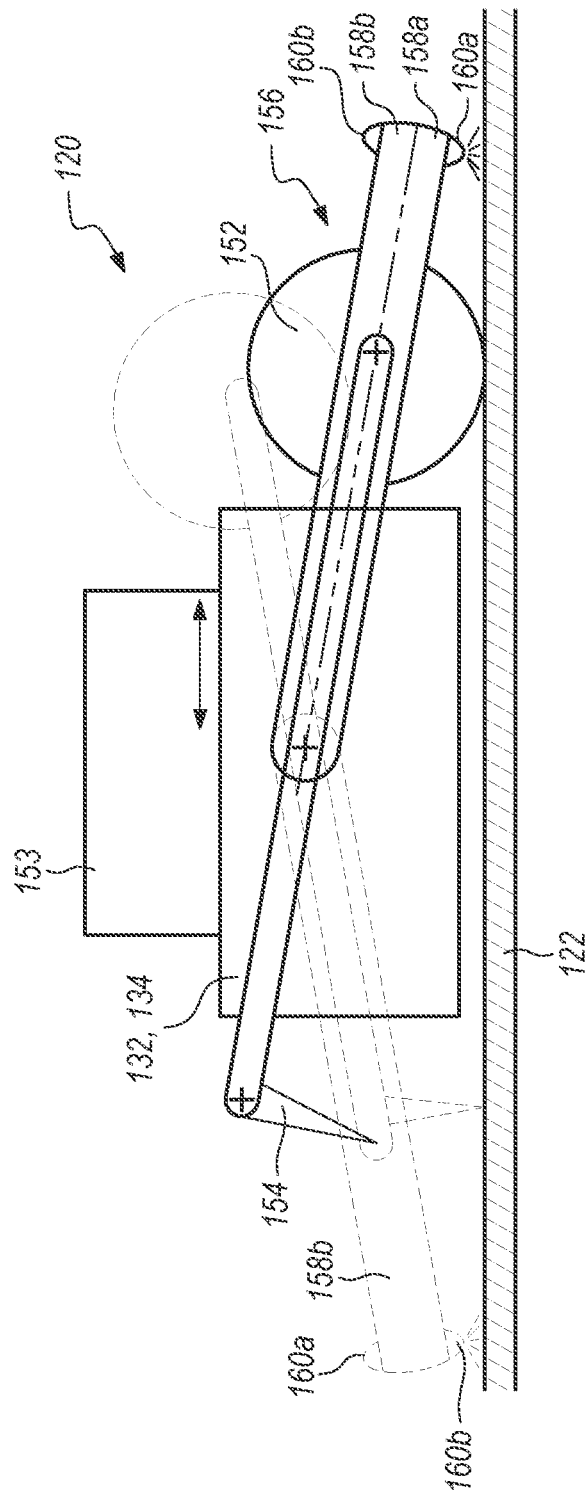
FIG. 18 is a schematic view of a carrier, brush and spray bar of a cleaning apparatus placed on a windshield with a washing position shown in solid lines and a drying position sown in broken lines.
Figure 19A:
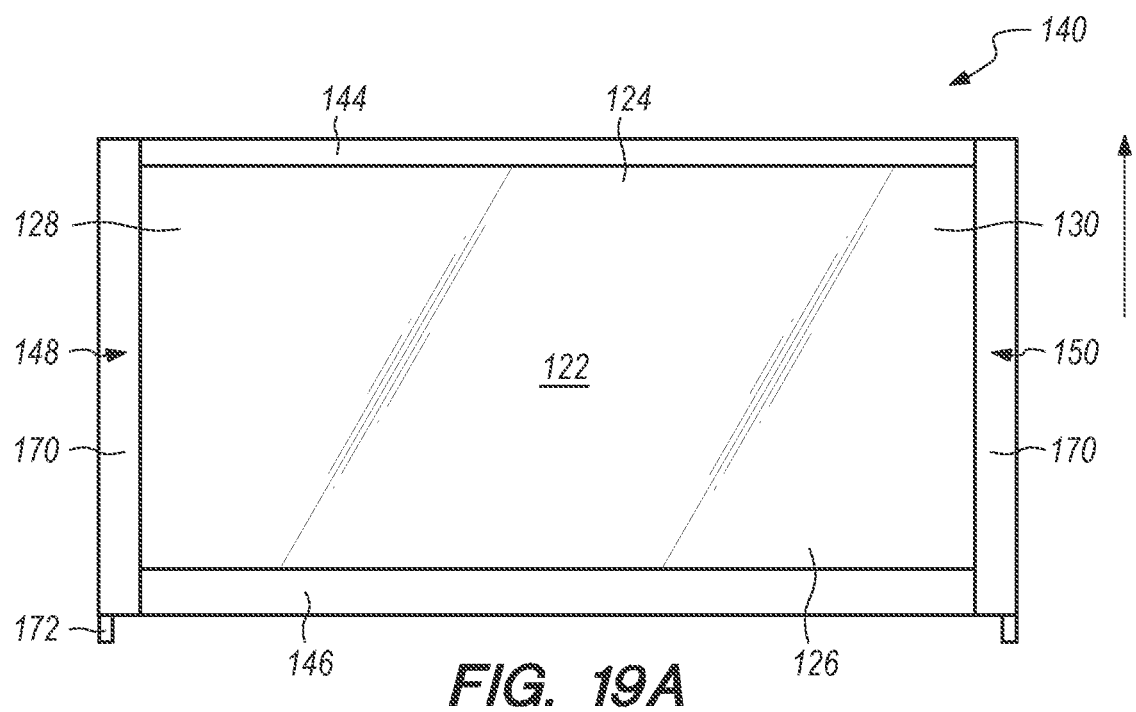
FIG. 19A is a top view of a frame enclosing an improved cleaning apparatus.
Figure 19B:
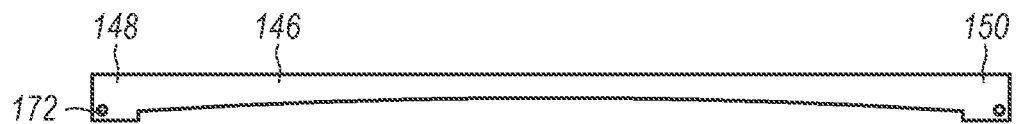
FIG. 19B is a bottom view of the frame of FIG. 19A.
Figure 19C:
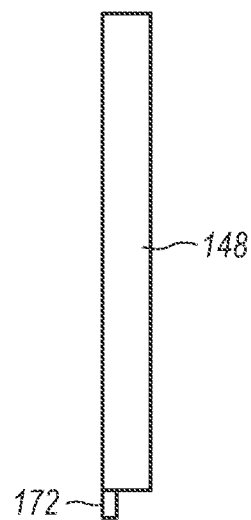
FIG. 19C is a left-side view of the frame of FIG. 19A.
Figure 20:
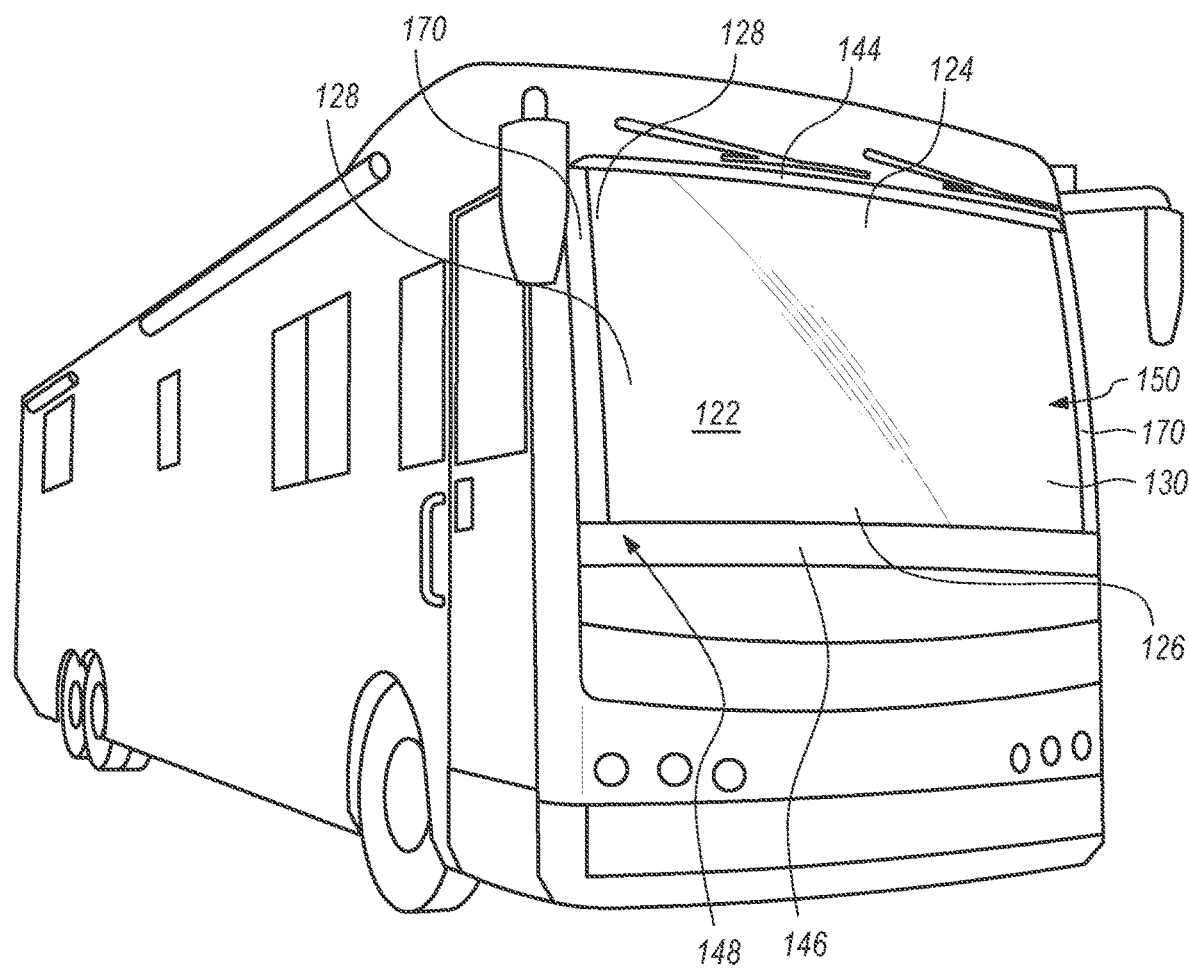
FIG. 20 is a left-side perspective view of a motor vehicle having the frame of FIG. 19A encircling the vehicle's windshield.
Figure 21:
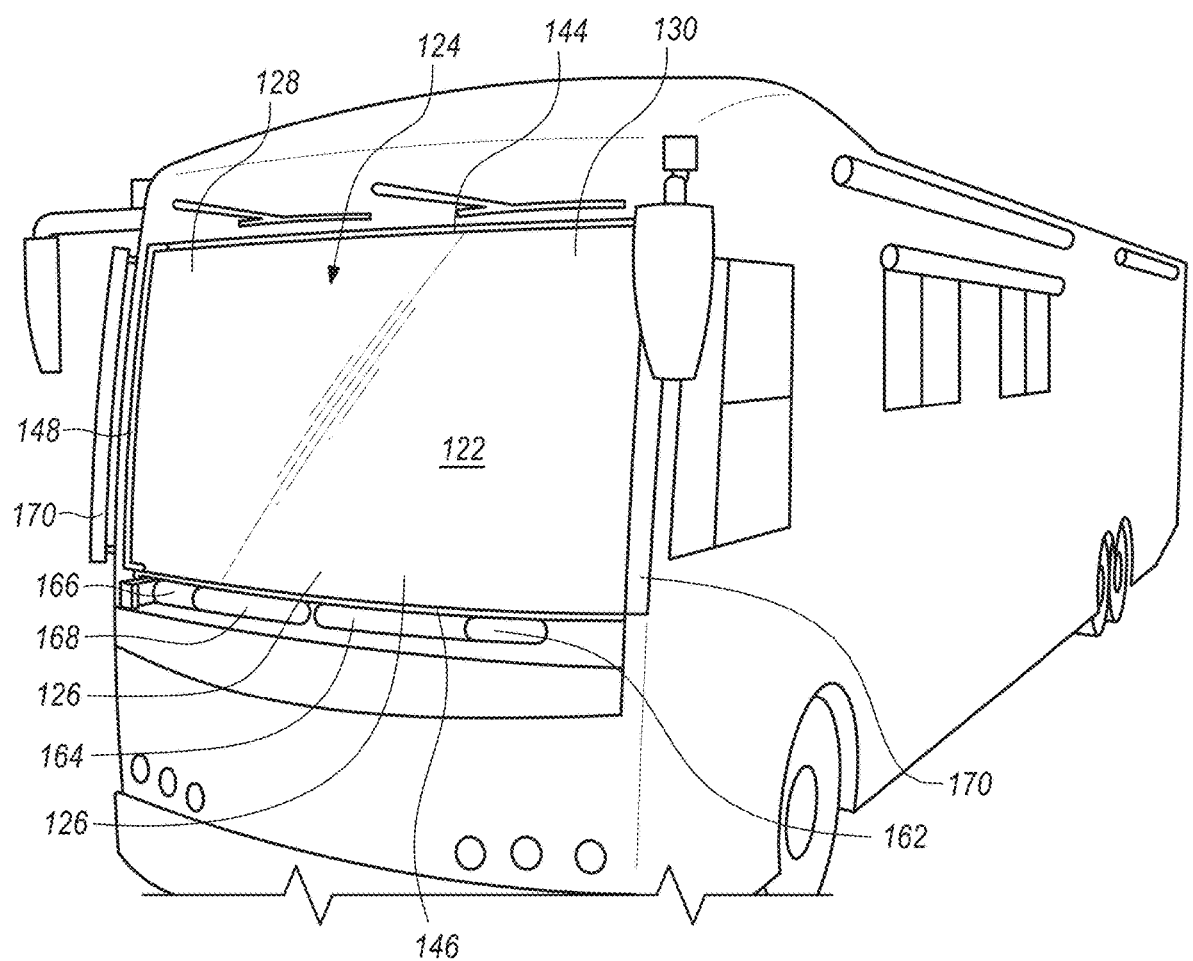
FIG. 21 is right-side perspective view of the windshield of FIG. 20 with covers on the side frames in an open position.
Figure 22:
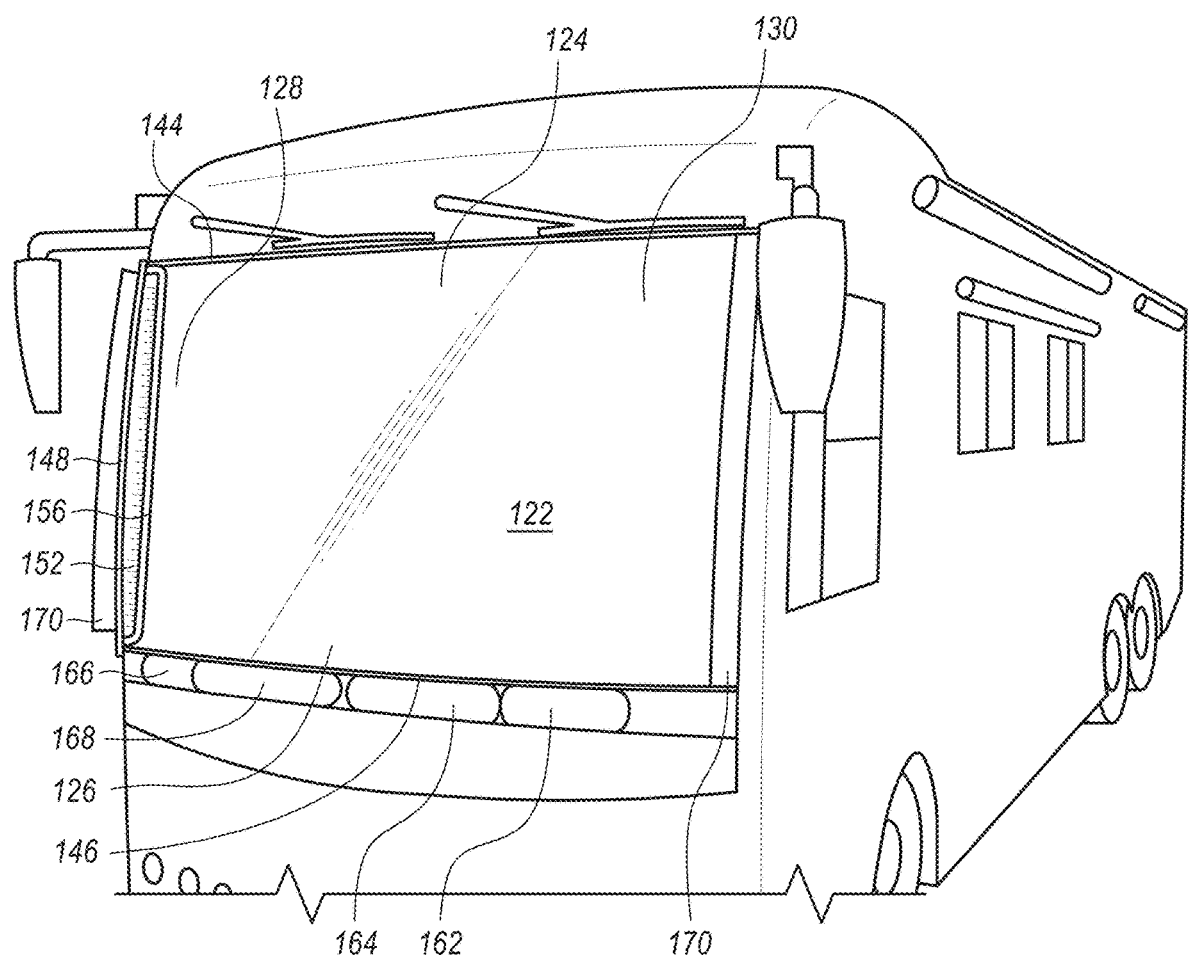
FIG. 22 is a right-side perspective view of windshield of FIG. 21 with the top and bottom frame covers removed, the wiper blade not contacting the windshield, a rotatable brush contacting the windshield, a spray bar adjacent the brush and ready to start cleaning the windshield.
Figure 23:
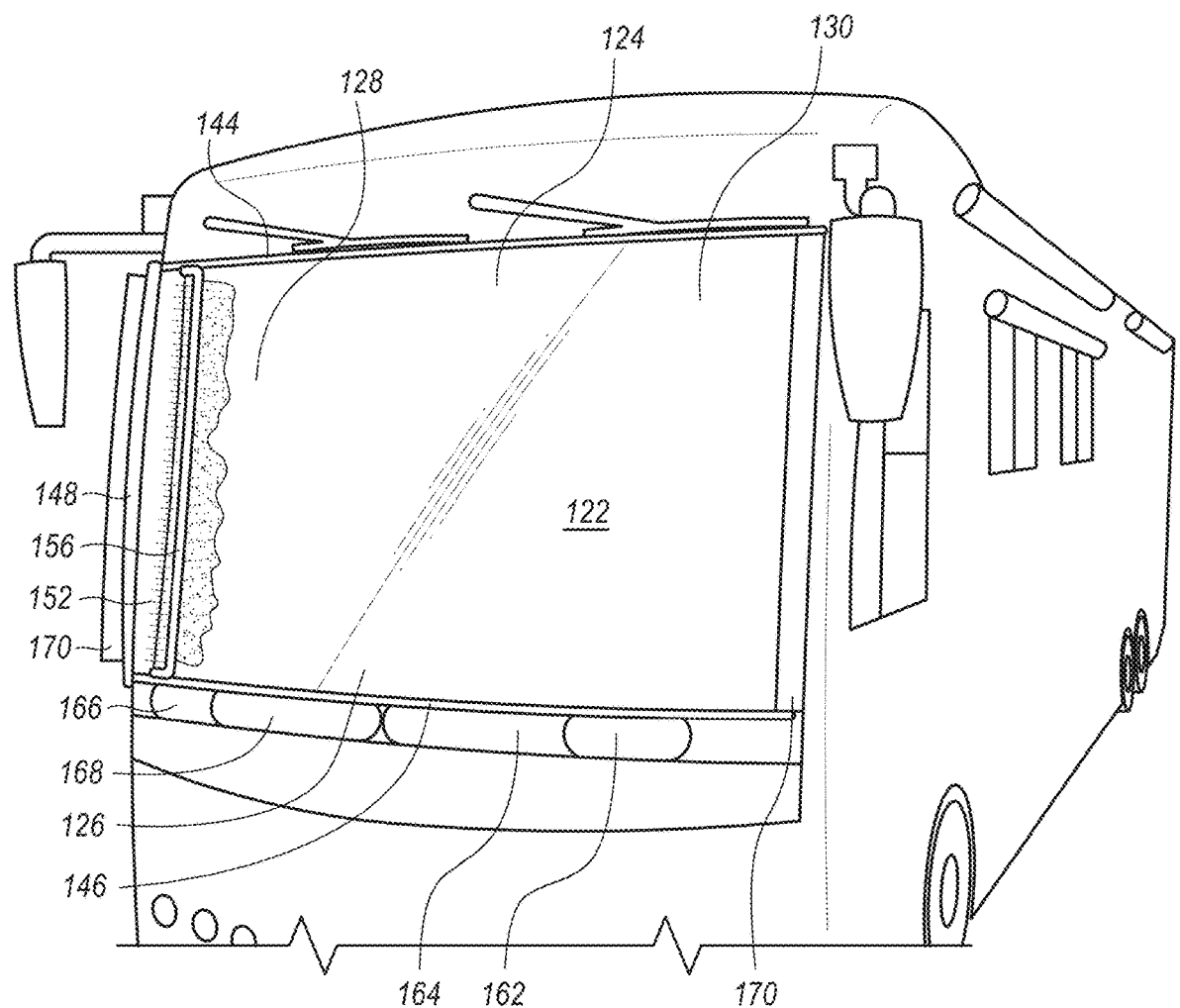
FIG. 23 is a right-side perspective view of windshield of FIG. 21 with the top and bottom frame covers removed, the wiper blade not contacting the windshield, a rotating brush and a spray bar spraying water by the brush as the cleaning apparatus moves away from the starting side of the frame and windshield toward a return side of the frame and windshield.
Figure 24:
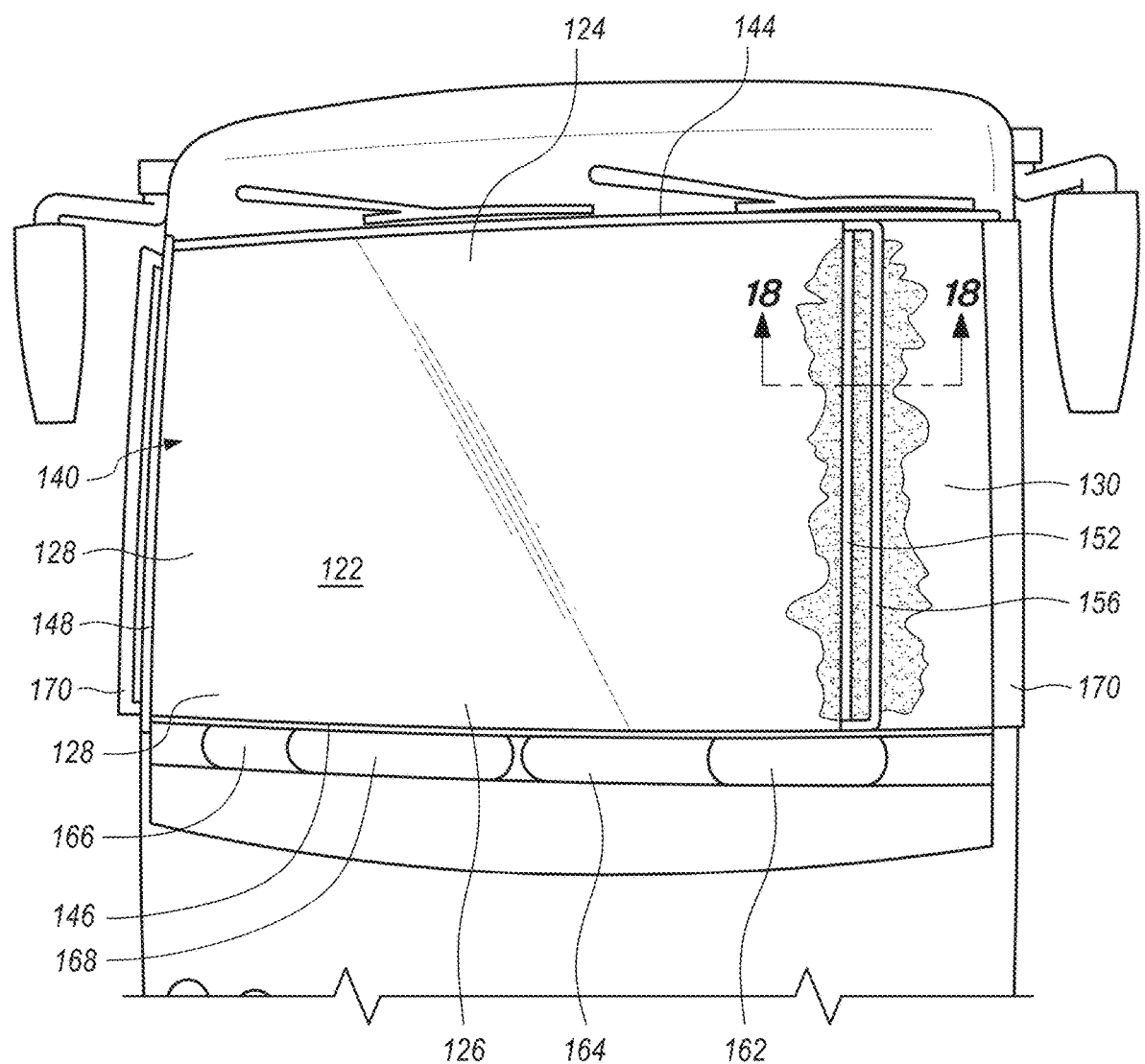
FIG. 24 is a right-side perspective view of windshield of FIG. 23 with the top and bottom frame covers removed, the rotating brush and spray bar approaching the return side of the frame and windshield.
Figure 25:
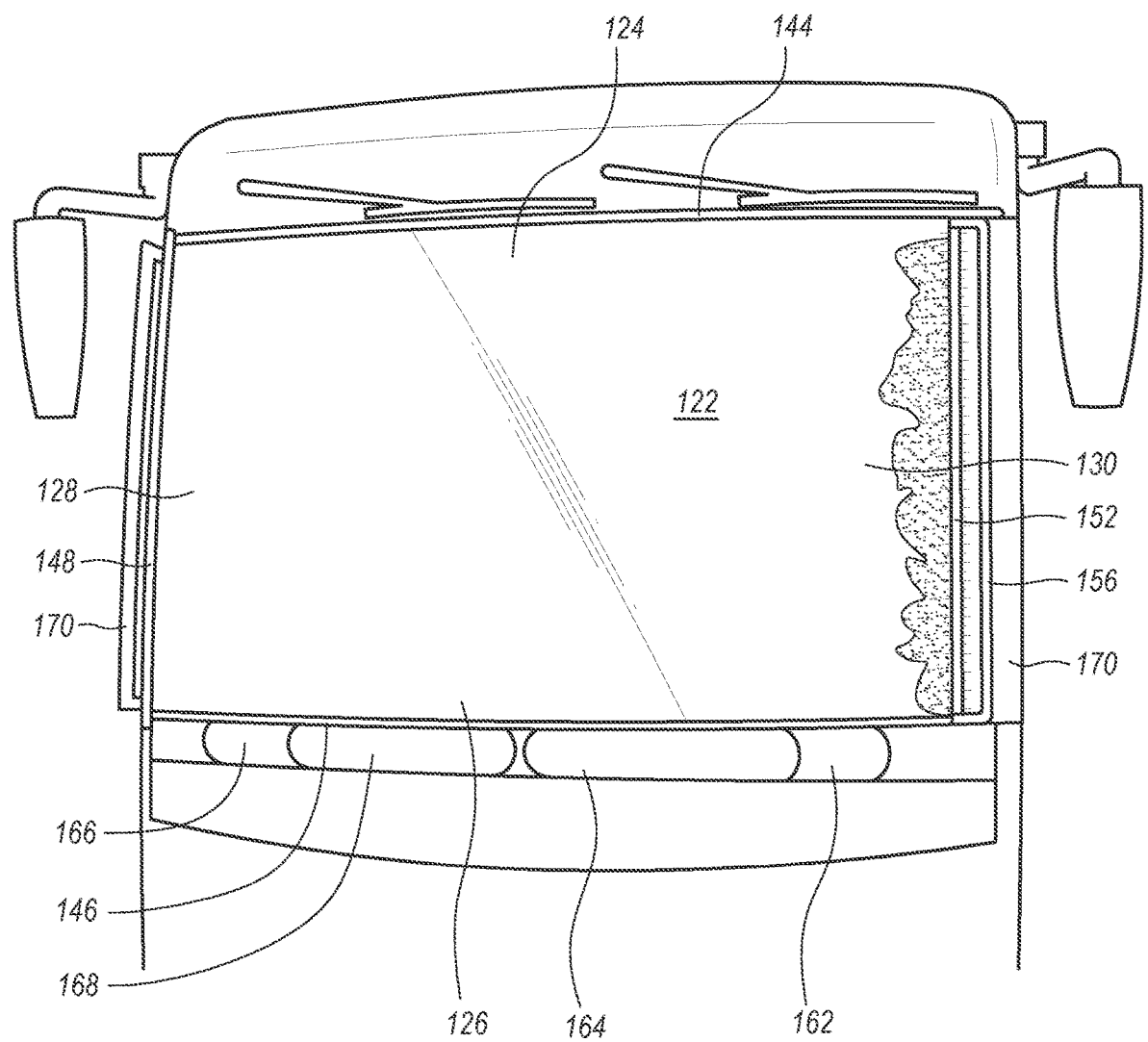
FIG. 25 is a right-side perspective view of windshield of FIG. 21 with the top and bottom frame covers removed and with the spray bar over the return side cover of the frame and with the rotating brush at the return side of the windshield.
Figure 26:
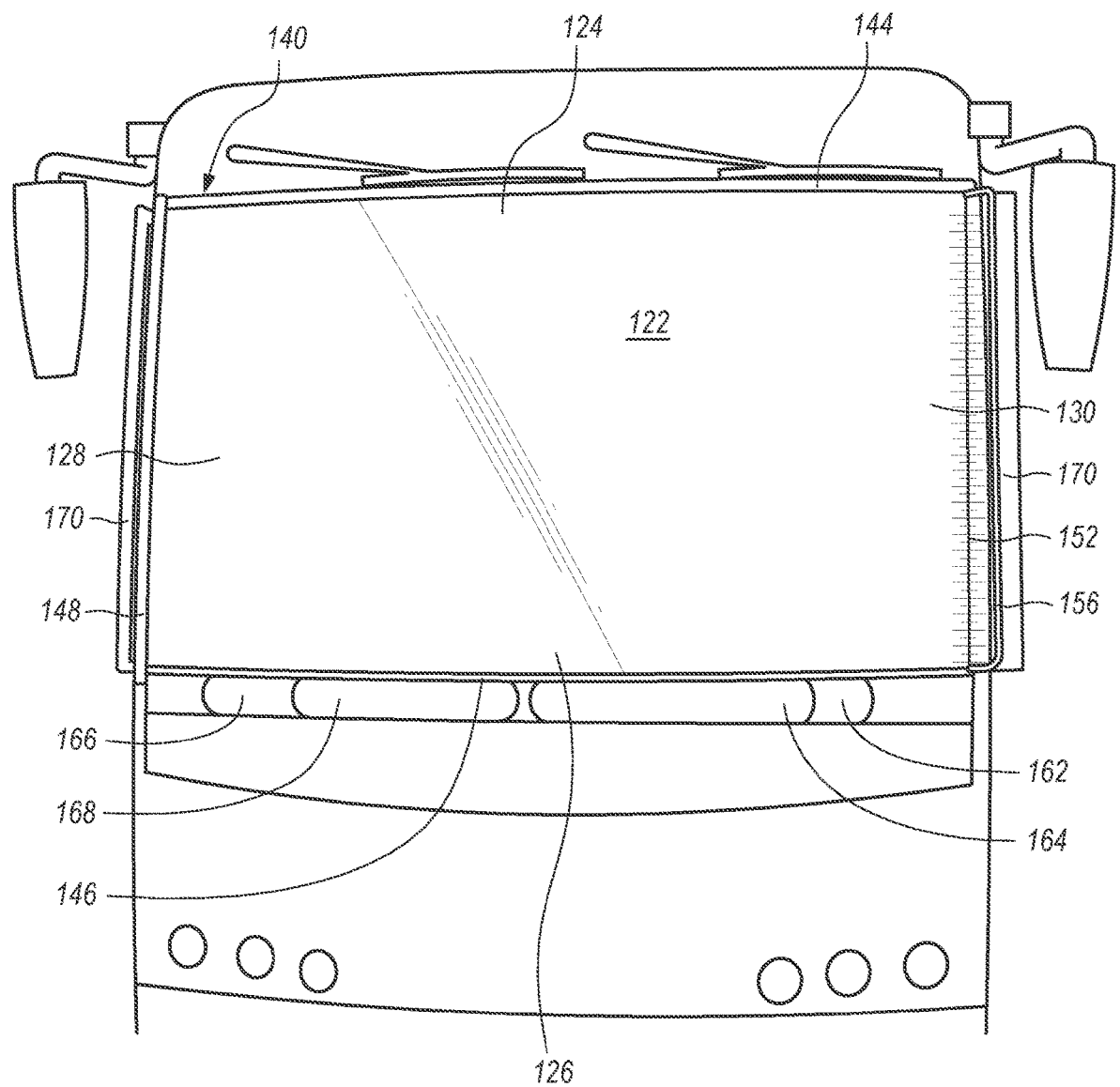
FIG. 26 is a right-side perspective view of windshield of FIG. 25, with the brush no longer rotating.
Figure 27:
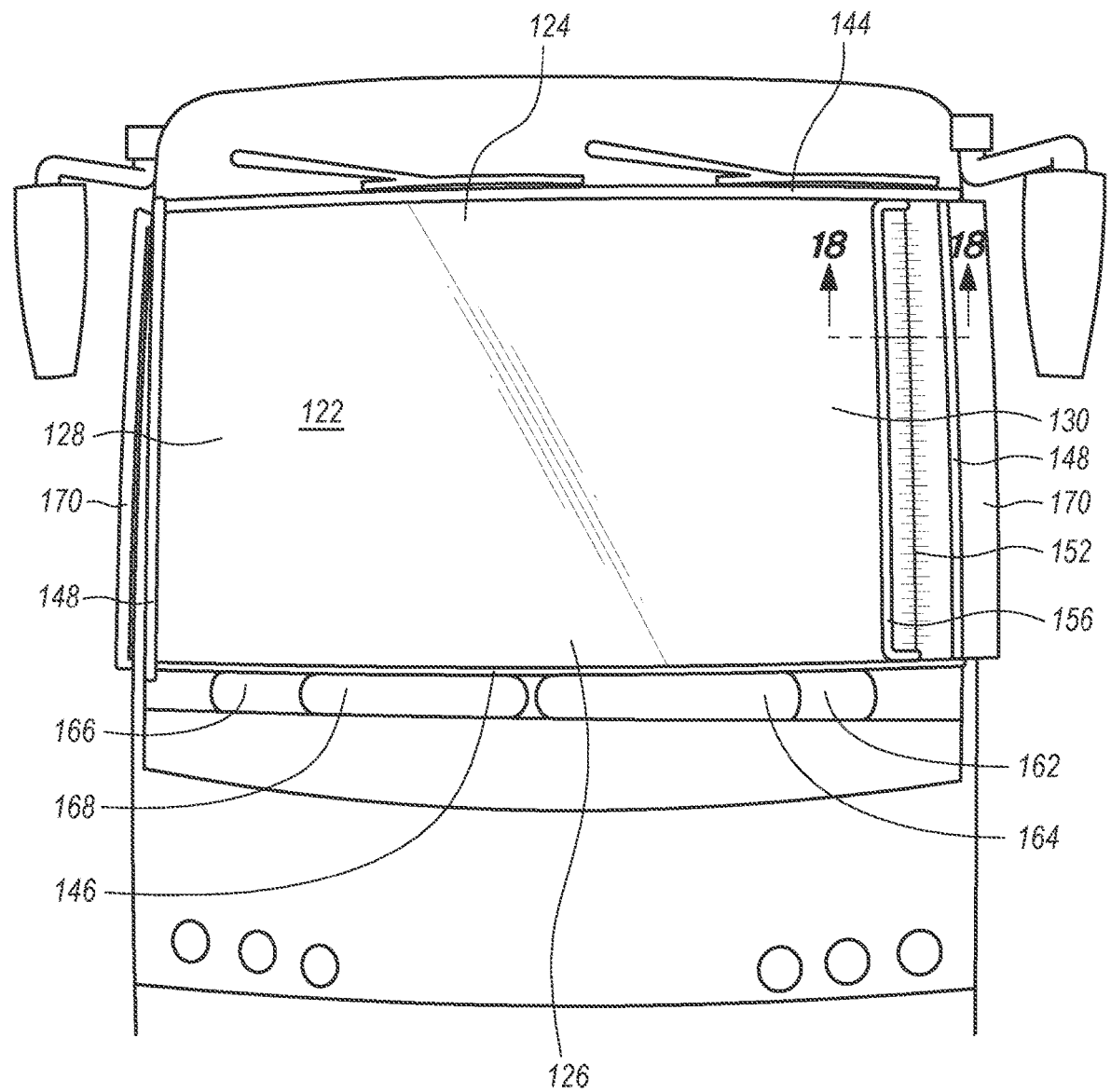
FIG. 27 is a right-side perspective view of windshield of FIG. 21 with the top and bottom frame covers removed, the brush not rotating and not contacting the windshield, and the spray bar adjacent the wiper blade to blow air onto the windshield by the wiper blade which is against the windshield, and ready to move from the return side of the windshield and return side frame toward the starting side of the windshield and starting side frame.
Figure 28:
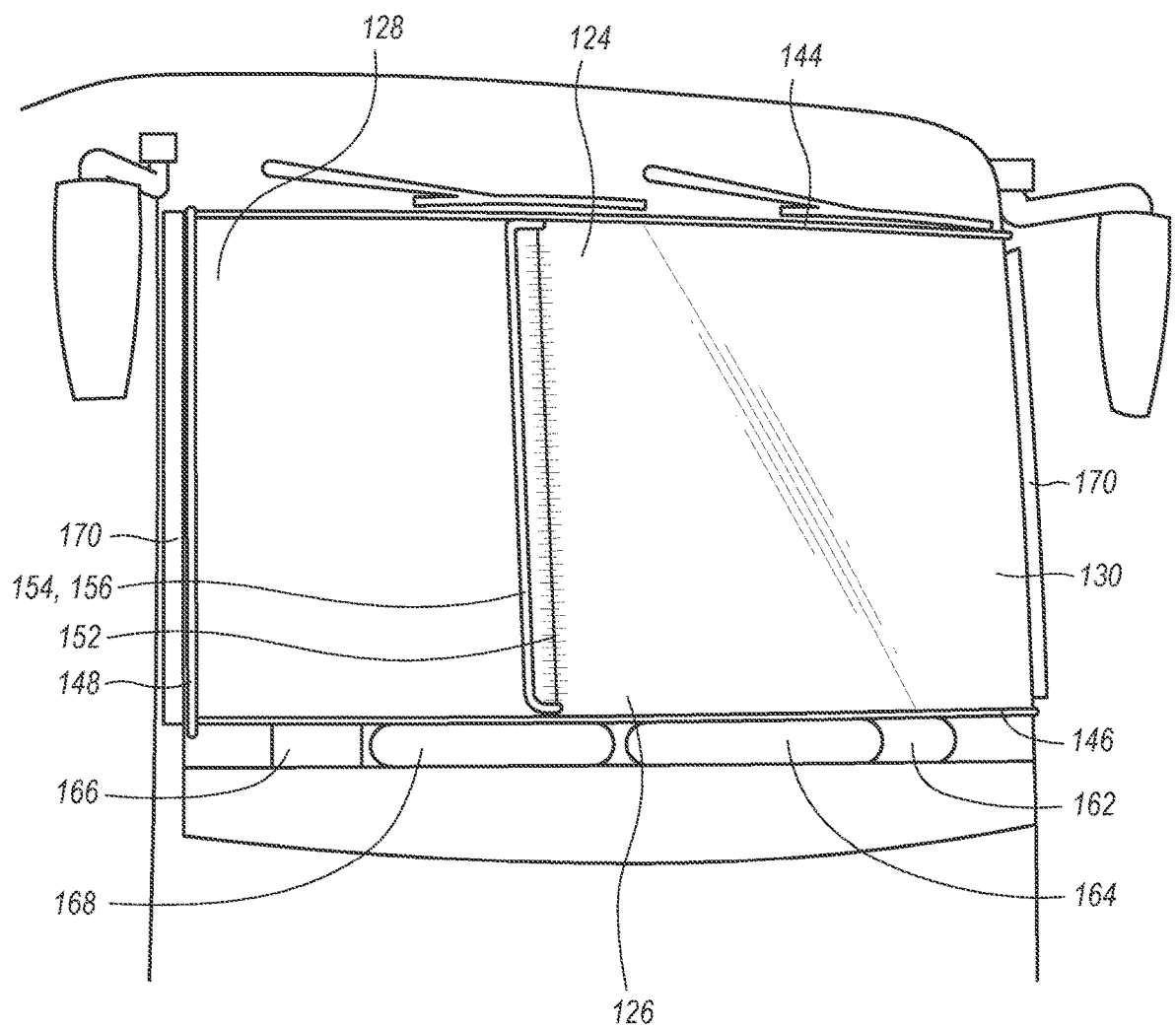
FIG. 28 is a right-side perspective view of windshield of FIG. 21 with the top and bottom frame covers removed, the brush not rotating and not contacting the windshield, the spray bar adjacent the wiper blade to blow air onto the windshield with the wiper blade which is against the windshield and ready to move from the return side of the windshield and return side frame toward the starting side of the windshield and starting side frame.
Figure 29:
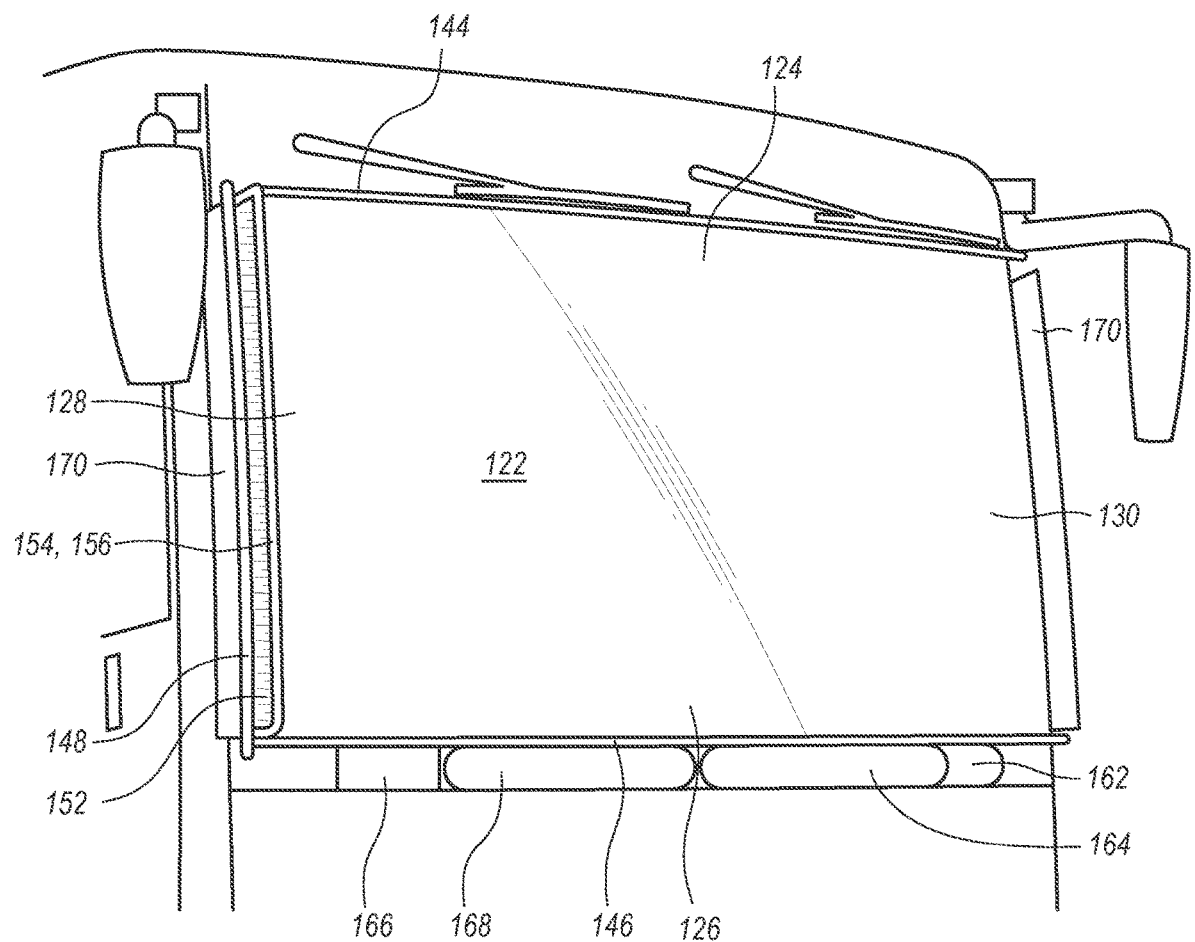
FIG. 29 is a left-side perspective view of windshield of FIG. 21 with the top and bottom frame covers removed and the windshield now cleaned by the apparatus of FIG. 28, the brush is not rotating, no air or washer fluid is flowing and the apparatus is and ready for storage.
Figure 30:
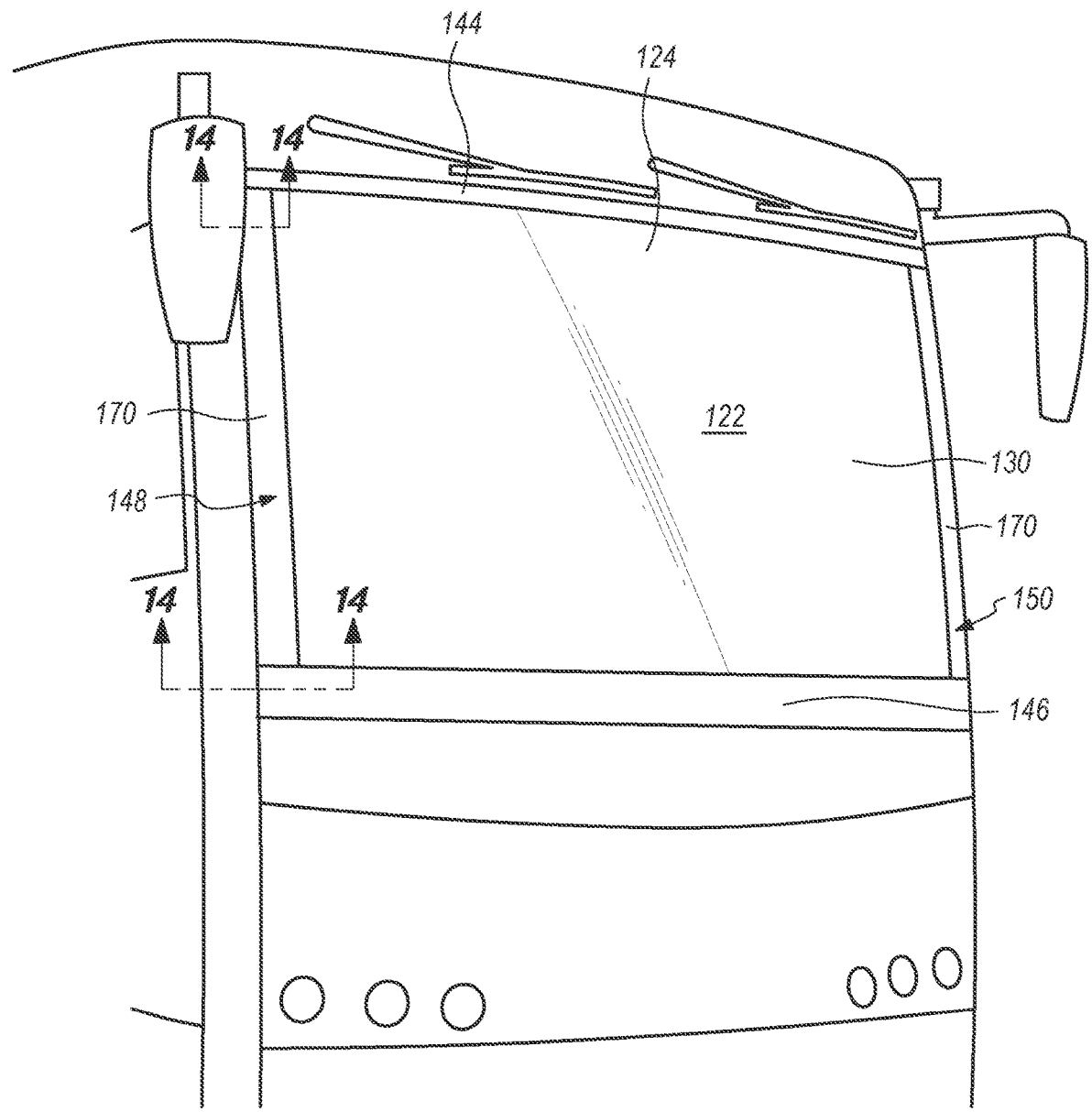
FIG. 30 is a left-side perspective view of the windshield of FIG. 20 after cleaning as in FIGS. 21-29, with the cleaning apparatus stored in the starting side frame and the starting side frame cover closed.

Referring now to FIGS. 15-17, the display 26 which may be touch sensitive may also illustrate the windshield 12 as an icon 100 which can be depressed or touched in order to activate the windshield cleaning system 10. When the windshield icon 100 is depressed, the windshield cleaner (e.g. cleaning head 14, 14a) may begin to clean the windshield 12. The icon of the windshield 12 may be programmed to clean a primary field of view of the windshield when the icon of the windshield 12 is depressed once. When the windshield icon is depressed a second time with the time delay between the first and second depressions being equal or great than a momentary pause such as one second or more, this may deactivate the windshield cleaner so that the windshield cleaner is traversed to a stored position.

As a further alternative to the preprogrammed nature of the icon of the windshield 12, it is also contemplated that the depression of the icon of the windshield 12 may be operative to clean a driver-side half of the windshield 12 or a passenger side half of the windshield 12. Alternatively, it is also contemplated that the depression of the icon of the windshield 12 may be operative to clean the entire surface area of the windshield 12 and not just its primary field of view.

More particularly, the display 26 may also illustrate the windshield cleaner icon 100. The display 26 may be in electrical communication with the computer 24 of the automobile. The computer may control the windshield cleaning system 10 and may be integral with the on-board computer of the automobile or may be an add-on computer that may integrate with the on-board computer. The windshield cleaning system 10 may provide for a spot cleaning function as well as an entire windshield cleaning function. It is also contemplated that the windshield cleaning system may include a windshield wiper with windshield blades that rotate about a pivot point(s). The computer 24 may also control the windshield blades of the windshield wiper system. In this regard, when the windshield cleaner icon 100 is displayed, the user may depress the windshield cleaner icon 100 on the touch sensitive display 26. Upon depression, the display may send a signal to the computer 24. The computer may send a signal to the motor 32 to rotate the wiper blades or operate the windshield cleaner for wiping and cleaning the windshield of the automobile. Additionally, the windshield cleaner icon 100 when either the articulating joint system or the gantry system is installed on the automobile may, when depressed, operate the articulating joint system or the gantry system whichever is installed on the automobile to clean the windshield of the automobile.

In another aspect, the display 26 may also have a cruise control icon 102 which when depressed may activate the cruise control program of the automobile (e.g., passenger vehicles, trucks, busses, recreational vehicles and motor homes). More particularly, when the cruise control icon is depressed, the current speed of the car or automobile may be maintained by the cruise control program of the automobile. The cruise control program of the automobile may be loaded on an on-board computer of the automobile. By on-board, this may include a computer that is integral or an add-on to the computer of the automobile that controls the other functions (e.g., door locks, engine control system, etc.) of the automobile. By way of example and not limitation, if an add-on computer performs the cruise control program, that add-on computer may be a smart phone. In this manner, the smart phone processor may perform the cruise control program. Alternatively, the smart phone processor/computer may work in conjunction with the on-board computer that performs the cruise control program.

The cruise control program may include an active cruise control feature wherein the automobile is set to a particular speed or set to a particular maximum speed but the automobile may be slowed down if a distance sensor on the automobile senses a vehicle in front of the automobile closer than a minimum allowable distance. When the cruise control icon 102 is depressed, the display 26 may send an electronic signal to the computer 24 of the automobile to activate the cruise control program loaded on the automobile computer. If the cruise control function is already activated, depression of the cruise control icon 102 may cause the display 26 to send an electronic signal to the computer 24 to deactivate the cruise control function. If the first and second depressions of the cruise control icon 102 are more than a momentary pause then each depression of the cruise control icon 102 may be used to activate and deactivate the cruise control program or feature. However, if the cruise control icon 102 is depressed in two quick successions so that the time between the two depressions is less than a momentary pause, a cruise control settings menu may be displayed on the display. In this regard, the cruise control icon 102 may also be utilized to set customizable settings for the cruise control program. These settings include but are not limited to a top speed of the vehicle when the cruise control feature is activated, a minimum distance with a vehicle in front of the automobile, a default speed and a default minimum distance with the vehicle in front of the automobile.

The cruise control feature may allow the automobile speed to be set to a particular speed. The speed may be either the current speed of the automobile or an adjustable max speed controllable by the user. If the cruise control function allow only for a current speed of the automobile to be set, the cruise control function may operate so that the current speed of the automobile is maintained when the cruise control feature activated. The cruise control feature may allow for an adjustment in the automobile speed controllable by the user. Upon depression of the cruise control icon 102, the cruise control function may be activated so that the current speed of the automobile is maintained and the display may also show a top speed of the automobile with plus and minus icons used to increase or decrease the target speed. If the top speed is increased or decreased, the automobile is accelerated or decelerated based on the relative target speed of the automobile and the actual speed of the automobile. Initially, when the cruise control function is activated upon depression of the cruise control icon 102, the target speed may be set to the current speed of the automobile.

The cruise control function may have customizable settings as discussed above. The customizable settings may be accessed through a cruise control setting icon or it is also contemplated that the customizable settings may be accessed through a double tapping action of the cruise control icon 102 on the display. When the cruise control function has an active cruise control feature, the customizable settings may include a setting for top speed of the automobile. The top speed of the automobile may be set to between 65 mph and 100 mph. For example, the top speed of the automobile under control of the cruise control function may be below 70 mph. In this regard, the setting for top speed of the automobile may be no greater than the range stated above. The customizable settings may also include a setting for a minimum distance with the vehicle in front of the automobile. The speed of the automobile may be reduced as the automobile approaches of vehicle. A proximity sensor of the automobile may sense that it is coming closer to a vehicle in front of it. The proximity sensor is capable of determining a distance between the automobile and the vehicle in front of it. The minimum distance with the vehicle in front of the automobile may be equal to a stopping distance of the automobile upon full application of the brakes of the automobile.

As used herein, the relative directions up and down are with respect to the direction of gravity. As used herein, the following part numbers refer to the following parts: 120—cleaning device; 122—windshield; 124—top of windshield; 126—bottom of windshield; 128—starting/first side of windshield; 129—center of windshield; 130—return/second side of windshield; 132—top carrier; 134—bottom carrier; 136—top tracks; 138—bottom tracks; 140—frame; 144—top frame; 146—bottom frame; 148—starting/first side frame; 150—return/second side frame; 152—brush; 153—motor; 154—wiper blade; 156—spray bar; 158*a*, 158*b*—first and second flow channel; 160*a*, 160*b*—first and second spray nozzles; 162—pump; 164—container for wash fluid; 166—air compressor; 168—air storage container; 170—side frame cover, 172—drain, 174—cleaning tool housing, 176—housing cover, 178*a*, 178*b*—first and second cleaning tool arms, 180*a*, 180*b*—first and second arm drive mechanism, 182*a*, 182*b*—first and second arm tracks, and 184—splashguard. In embodiments with just one set of cleaning tools (e.g. wiper blade, spray bar, brush), side frame 148 is referred to as a starting side frame and side frame 150 is referred to as a return side frame, however, in embodiments where a plurality of cleaning tools are used, side frame 148 is referred to as a first side frame and side frame 150 is referred to as a second side frame. While the starting side frame 148 is shown as located on the left side of the windshield 122 (when facing the windshield), the starting side frame may be on the right side.

The cleaning devices described below have been described with the cleaning devices being deployed from a front side of the vehicle or vehicle windshield to clean a motor vehicle windshield. Embodiments in support of a front deployed method and structure may be modified so that the cleaning devices are deployed from the side of a vehicle windshield or vehicle so that the width of the windshield is not reduced to accommodate the cleaning devices. For example, carrier tracks may be curved so as to be routed from the side of the vehicle windshield or vehicle. Moreover, the windshield 122 may be flat or curved. The windshield cleaner may be sized so that the entire windshield or any select portion thereof can be cleaned with the windshield cleaner. It is also contemplated that the disclosed mechanisms and structures could be adapted to clean any appropriate surface, for example a building window or a tabletop.

Referring to FIGS. 18-31, a method and apparatus are disclosed for washing surfaces to which the apparatus is mounted, with special application for washing the windshield 122 of a bus or RV having a top 124, an opposing bottom 126, a starting side 128 and a return side 130 of the windshield. The cleaning device 120 advantageously moves from the starting side 128 to the return side 130 and back to the starting side 128. The cleaning device 120 advantageously extends across the windshield between the top and bottom sides 124, 128 and may be connected to top and bottom carriers 132, 134 which move along top and bottom tracks 136, 138 as the cleaning device moves from the starting side 128 to the return side 130 and back.

Advantageously, the cleaning device 120 is contained in a frame 140 having a top frame 144 which contains the top tracks 136, and an opposing bottom frame 146 which contains the bottom tracks 138. The frame 140 may have starting side frame 148 and an opposing return side frame 150. Advantageously, the starting side frame 148 and return side frame 150 extend between the top and bottom frames 144, 146 at opposing ends of the frame 140. The various parts of the frame 140 advantageously have cross-sectional shapes that are square in cross-section, where square includes rectangular cross-sectional shapes.

The cleaning device 120 has components to clean and dry the windshield 122 and these components may include a brush 152 to wash and scrub the windshield, a wiper blade 154 to scrape water, and wash fluid and debris off the windshield, and at least one spray bar 156 to spray wash fluid onto the windshield and/or brush and to spray bar 156 and to spray air onto the windshield during drying. Advantageously all the cleaning components such as the brush 152, wiper blade 154 and spray bar 156 have opposing ends that are connected to a different one of the carriers 132, 134 so they extend across a height of the windshield 122 and move with the carriers from side to side across the windshield.

The brush 152 may comprise a rotatable, cylindrical brush and may be made of radially extending fibers or bristles and preferably has a predetermined, un-deformed diameter. As used herein, the rotatable brush rotates more than one revolution in one direction rather than oscillates back and forth less than one revolution. The brush 152 may comprise a plurality of radially mounted, elongated but flexible members that hang downward with gravity and that use centrifugal force arising from rotation to cause the flexible members to resemble a cylindrical brush. A brush 152 made of a plurality of radially extending, polymer bristles extending from a central cylindrical core of about 0.5-inch diameter, with an overall diameter of 2-3 inches is believed suitable. The brush 152 is rotated by various mechanisms, including by a motor 153 which is advantageously an electric motor or a fluid driven motor as described in U.S. Pat. No. 8,032,976. When an electric motor 153 is use, the motor may be connected to one of the carriers 132, 134 to rotate the brush 152 directly or through a gear mechanism. An electric motor 153 mounted on and moving with the bottom carrier 134 is believed suitable. When a fluid drive is used to rotate brush 152, the fluid motor may be as described in the above U.S. Pat. No. 8,032,976, or it may be the fluid pump 162 or the air compressor 166 (or air storage container 168), with an optional valve on one of the carriers 132, 134 or elsewhere regulating the fluid flow.

Whether the rotating mechanism is a motor electrically powered through a conductive wire or fluid powered as by air or washer fluid through a supply tube, the fluid supply tube or electrical supply wires may extend from one side frame 148, 150 toward the opposing side frame 150, 148, and are advantageously contained in one of the top or bottom frames 144, 146. Electrical wires or fluid tubes extending from the starting side frame 148 and resiliently tethered to the return side frame 150 and contained in the bottom frame—are believed suitable. The resilient tether is believed to help keep the tubes or wires from tangling during reciprocal motion of the brush 53. It is also believed suitable to have the electrical wires or fluid supply tubes extending from the middle of the top or bottom frames and tethered to one of the starting side or return side frames to help keep the tubes or wires from tangling during reciprocating movement of the brush 152.

The wiper blade 154 is an elongated, flexible, rubber or elastomeric blade of the type used in windshield wipers or a squeegee. The wiper blade 154 typically has a triangular cross-sectional shape narrowest at the tip which abuts the windshield 122 during use. The wiper blade, when pressed against the windshield 122 and moved from the return side 130 of the windshield toward the starting side 128 of the windshield, pushes water, washing fluid and debris off the windshield surface to leave an effectively dry windshield when things work properly. The angle of the wiper blade 154 relative to the outer surface of the windshield 122 will vary, with an angle of about 70-90° believed suitable, and with the flexible tip of the wiper blade lagging behind the thicker mounting portion of the blade as the blade moves during use. The length of the wiper blade 154 is preferably aligned in the vertical plane, but could be inclined thereto with the top more inclined toward the starting side frame 148 to direct the water toward the bottom frame 146.

The spray bar 156 may comprise a single rotating bar having separate, first and second flow channels 158a, 158b (FIG. 18), each flow channel having a respective first and second plurality spray nozzles 160a, 160b so nozzles 160a are associate first flow channel 158a, and nozzles 160b are associated with second flow channel 158b. The first flow channel 158a is in fluid communication with a source of pressurized wash fluid, which may comprise pump 162 that is in fluid communication with a source of wash fluid or cleaning fluid, such as container 164. As desired, the pump 162 may draw soap from one container and water from another container and mix them for deliver to flow channel 158a, but preferably a premixed was fluid is provided in container 164, with the pump passing the wash fluid to the first flow channel 158a under a predetermined pressure. A pressure of a few psi is believed suitable for use, about 2-10 psi. While higher pressures are believed usable, it is believed desirable to avoid pressures high enough to require high pressure fittings and seals as those may shorten the system's life. Thus, a pressure less than about 20 psi is believed desirable. As used herein, the term "less than about 20 psi" may include zero, but that would not generate any pressure so the term "a pressure less than about 20 psi" refers to a non-zero pressure sufficient to function in the device described herein. The water, liquid soap or the mixture of water and soap may be heated with a heater (e.g., thermos exchanger with the engine of the vehicle, electric heater, etc.) so that heated mixture of water and soap may be sprayed onto the windshield. If the windshield is frosted or has ice frozen over it, then the heat liquid mixture may be utilized to defrost the windshield.

The second flow channel 158b is in fluid communication with a source of pressurized air, which may comprise an air compressor 166, or an air storage container 168, or both. If the air compressor is utilized, then the air compressor may run off of power from the vehicle engine. Alternatively, in lieu of a separate air compressor dedicated for the windshield cleaner, it is also contemplated that the windshield cleaner may utilize the air compressor of the vehicle (e.g., air ride, etc.). An air storage container 168 is desirable as it may provide a high air pressure with little or no delay, but the pressurized air has its own storage issues and has limited capacity. The use of both a pressurized container 168 and an air compressor 166 allows a prompt supply of pressurized air and a continuing supply. A pressure sufficient to blow water droplets off the windshield 122 is desirable, with a pressure of about 10-40 psi believed desirable. Higher pressures are believed acceptable for use, but the higher pressures may involve more complex seals and protective measures if a high-pressure container 168 is used.

The fluid supply tubes to the first and second flow channels 158a, 158b may arranged the same as described for the electrical wires and fluid supply to the brush 152. Advantageously, the supply tubes comprise flexible elastomeric tubes that extend from the starting side frame 148 or the middle of the bottom frame 146, with the supply tubs tethered to one of the return side frame 150 or starting side frame 148 to help avoid tangling.

During use of the cleaning system 120, the brush 152 rotates against the windshield 122 as the carriers 132, 134 move the brush from the starting side frame 148 to the return side frame 150, with the brush preferably not rotating against the windshield as the carriers move the brush back to the starting side frame 148. During use, the spray bar 156 has first spray nozzles 61a adjacent the windshield and adjacent the rotating brush 152 and between the rotating brush and the return side 150 during washing. Shortly before or during the return movement of the carriers 132, 134 from the return side frame 150 to the starting side 148, the spray bar 156 rotates to the opposing side of the brush 152 so the second spray nozzles 160b are adjacent the windshield 122 and adjacent the wiper blade 154, while the brush 152 is lifted away from the surface of windshield 122 and preferably does not rotate. During use, the wiper blade 154 does not contact and scrape against the windshield 122 as the carriers 132, 134 move the wiper blade from the starting side frame 148 to the return side frame 150, with the wiper blade urged against the windshield 122 to scrape water from the windshield as the carriers move the wiper blade from the return side frame 150 to the starting side frame 148.

The engagement and disengagement of the brush 152 and wiper blade 154 with the windshield may be achieved by various mechanisms, including rotating a support member having the brush 152 and wiper blade 154 on opposing, first and second ends of the support member, so that the wiper blade 154 is away from the windshield 122 when the brush 152 engages the windshield, and the brush 152 is away from the windshield when the wiper blade 154 engages the windshield. The brush 152 and wiper blade 154 may be positioned various ways, including separate linear or rotary actuators (e.g., solenoids or motors) connected to one or both carriers 132, 134 and further connected to the brush 152 and/or wiper blade 154 so the brush and blade may be moved separately toward or away from the windshield or move simultaneously in opposing directions toward or away from the windshield. The movement may be achieved, by pneumatic or fluid motors driven by the pump 162, air compressor 166, or air storage container 168. Various cams and cam pins may be connected to one or both of the carriers 132, 134, or on the support member for the brush and wiper blade, or on the top and bottom frames 144, 146 or return side frame 150, to position the brush 152 and wiper blade 154 relative to the windshield 122. Depending on the mechanism used to position the brush 152 and wiper blade 154, various position or actuator sensors may be used to control the mechanisms. A resilient spring may be interposed between the device providing the moving force and the wiper blade 154 and between the device providing the moving force and the brush 152 in order to resiliently urge the brush 152 and wiper blade 154 against the windshield 122.

The spray bar 156 advantageously has a U-shape with opposing ends connected to different ones of the top and bottom carriers 132, 134. The spray bar 156 rotates relative to those carriers 132, 134 to place the first spray nozzles 160a adjacent the brush 152 and windshield either before or as the spray bar moves from the starting side frame 148 toward the return side frame 150. As the spray bar reaches or extends into the return side frame 150 the spray bar rotates to the other side of the brush 152. The rotation may be achieved, by various devices, including pneumatic or fluid motors driven by the pump 162, air compressor 166, or air storage container 168. Electric motors and cam mechanisms are also believed suitable, with cam pins connected to the top or bottom frames 144, 146 or to the return frame 150 engaging portions of the spray bar 156 or a cam member connected to the carrier, to cause rotation of the spray bar adjacent the return frame 150. Depending on the mechanism used to position the spray bar 156, various position or actuator sensors may be used to control the mechanism(s) rotating or positioning the spray bar.

The top and bottom carriers 132, 135 are advantageously sized and configured to fit within the top and bottom frames 144, 146. The carriers 132, 134 advantageously reciprocate along the top and bottom tracks 136, 138 from the starting side of the windshield (or starting side frame) to the return side of the windshield (or return side frame) and back to the starting side of the windshield (or return side frame). The tracks 136, 138 and their respective carriers 132, 134 may take various forms to guide the carriers during use as they reciprocate from the starting side frame 148 to the return side frame 150 and back to the starting side frame 148. The tracks 136, 138 may be the same, or different in construction.

Typically, one of the tracks or carriers has a rolling or sliding contact that is entrapped by the other of the tracks or carriers to guide the movement of the carriers along the tracks. The tracks 136, 138 may take the form of an elongated member with an enlarged portion while the carriers 132, 134 are configured to engage the enlarged portion in a rolling or sliding contact and move along the tracks with the enlarged portion guiding the carrier. Monorails may use this type of system. Conversely, the tracks 136, 138 may form a recess with the carriers 132, 134 having an enlarged portion to engage the recess in a sliding or rolling contact and move along the tracks with the enlarged portion guiding the carrier. One of the tracks and one of the carriers may have one of the above general features, while the other of the tracks and carriers has the other of the above general features, and the orientation of the top and bottom parts may change.

Thus, for example, the bottom track 138 may take the form of a generally horizontally or laterally extending C-shaped track with a generally vertical wheel or wheels on the bottom carrier 134 guided between the short legs of the C-section on the bottom track 138, while the top track 136 may be comprise a generally vertical, C-shaped track with the top carrier 132 having generally vertically oriented wheels and rolling along the bottom, short leg of the C-shaped, top track. Alternatively, the top track could have a construction as described for the bottom track, or vice versa. As a further illustrative example, tracks and rolling and sliding followers as used on sliding glass doors and room dividers are also believed suitable. The carriers 132, 134 and the parts extending between them (brush, wiper blade, spray bar) may be supported by the bottom carrier and guided by the top carrier, or suspended from the top carrier and guided by the bottom carrier, or a combination of the two.

If the tracks 136, 138 do not involve a specific drive mechanism as described below, then a separate movement mechanism may be provided to move the carriers 132, 134 and associated brush 152, wiper blade 154 and spray bar 156 in a reciprocal motion across the windshield and back. A belt or pully system may extend between the starting side frame 148 and return side frame 150, with the belt or pulley connected to one of the top or bottom carriers 132, 134, with a drive motor and control advantageously located in one of the side frames, preferably the starting side frame 148. Other drive mechanisms may be used, including pneumatic drives or fluid drives powered by the air compressor 166 or air storage container 168 or pump 162. A separate electric motor drive could also be provided, powered by the vehicle's battery. The other electrical components and motors described herein are also advantageously powered by and thus in electrical communication with the vehicle's battery.

Some drive mechanisms involve specific drives. One or both of the tracks 136, 138 may comprise a rack gear that may be slightly curved to confirm to the shape of the portion windshield along which the track extends, with a pinion gear connected to one or both of the carriers 132 or 134 guided by the track connected to the carrier. The windshield 122 and tracks, 136, 138 are curved or bowed so the opposing ends of the top and bottom tracks are offset from a middle of the track. A cog wheel and track may be associated with only one or each of the carriers 132, 134. These drive mechanisms lend themselves to use with tracks 136, 138 that are slightly curved to conform to the shape of the adjacent windshield. If straight tracks may be used, then lead screws and ball screws may also be used to move the carrier(s) 132, 134 across the windshield 122 and back to the starting side frame 148.

The starting/first side frame 148 and return/second side frame 150 may each have its own cover 170 which are advantageously opened during use and closed when not in use. The top and bottom frames 144, 148 also preferably have similar covers that open during use and closed when not in use, but hose covers are not shown in detail. The starting frame cover 170 covers the starting side frame 148 and cleaning components located therein when not in use. Advantageously, the carriers 132, 134, brush 152, wiper blade 154 and spray bar 156 start and stop their reciprocal motion at the starting side frame 148 and fit within that frame 148 and cover 170 when not in use. Both covers 170 also acts as a splash shields to reduce the amount of washer water the rotating brush 152 splashes to the sides of the vehicle. Water splashing to the side of the windshield 122 may enter the vehicle if a side windshield is open, and may collect on the side of the vehicle or side windshields and create undesirable deposits of dirt and mud. Advantageously, each cover 170 directs any collected washer fluid and debris toward the side frame associated with the cover and a drain 172 is provided at the bottom of the starting side frame 148 and return side frame 150 to allow such collected fluids to be directed by drain tubing toward the bottom of the vehicle where it drips onto the ground on which the vehicle travels.

During use, the covers 170 open on the vehicle side frames 148, 150 and if not already in position, the spray bar 156 moves into its first operating position adjacent the windshield 122 and brush 152. The brush 152 starts rotating and washer fluid is sprayed onto the windshield and/or brush through first spray nozzles 160*a* of the spray bar. One or both of the top and bottom carriers 132, 134 move the rotating brush 152, spray bar 156 and non-contacting wiper blade 154 across the windshield 122 from the starting side 128 of the windshield and the starting side frame 148, toward the return side of the windshield 130 and the return side frame 150. The top and bottom carriers 132, 134 move along the respective top and bottom tracks 136, 138 during this movement. The wiper blade 154 is not in contact with the windshield 122 during this movement. The washing position is shown in solid lines in FIG. 18.

When the spray bar 156 reaches the return side frame 150 the spray bar 156 is rotated about half a turn to a second operating position adjacent the windshield 122 and adjacent the wiper blade 154 and air flows from the second spray nozzles 160*b*. This drying position is shown in broken lines in FIG. 18. The flow of washer fluid to the rotating brush 152 is stopped and the rotating brush is lifted from contact with the windshield while the wiper is placed in contact with the windshield. After spinning a short while to throw off washer fluid from the brush, the rotation of the brush is stopped. The carrier plate(s) 132, 134 then move the wiper blade 154, spray bar 156 and non-rotating, non-contacting brush 152 across the windshield from the return side of the windshield 130 and return side frame 150 to the starting side of the windshield 128 and the starting side frame 148, with the wiper blade and spray nozzles 160*b* removing washer water and debris from the windshield surface during that return movement of the parts. The washer water and debris are advantageously blown toward the bottom frame 146 and starting side frame 148, both of which advantageously direct that washer water and debris to the drains 172.

Figure 31:
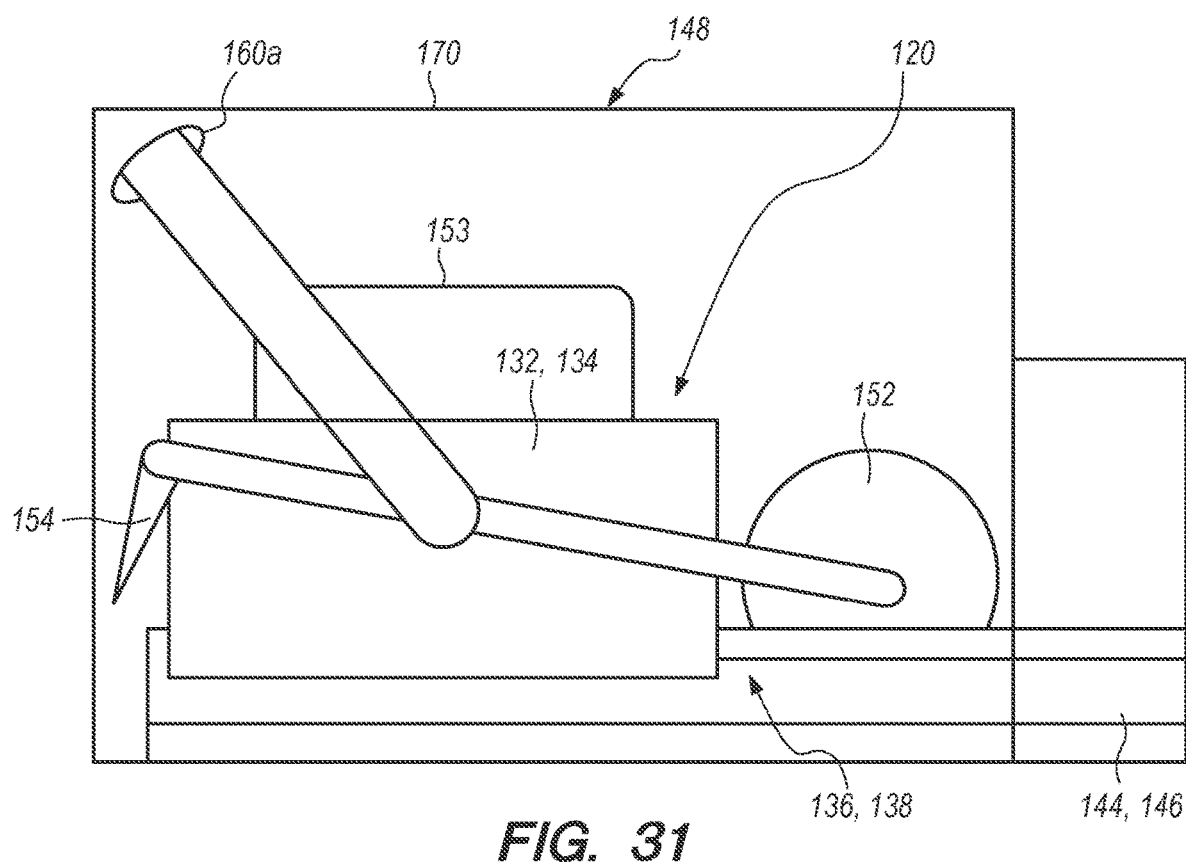
FIG. 31 is a sectional view taken along sections 14-14 of FIG. 30, showing the cleaning apparatus in a stored position in the starting side frame with the cover in a closed position.
Figure 32:
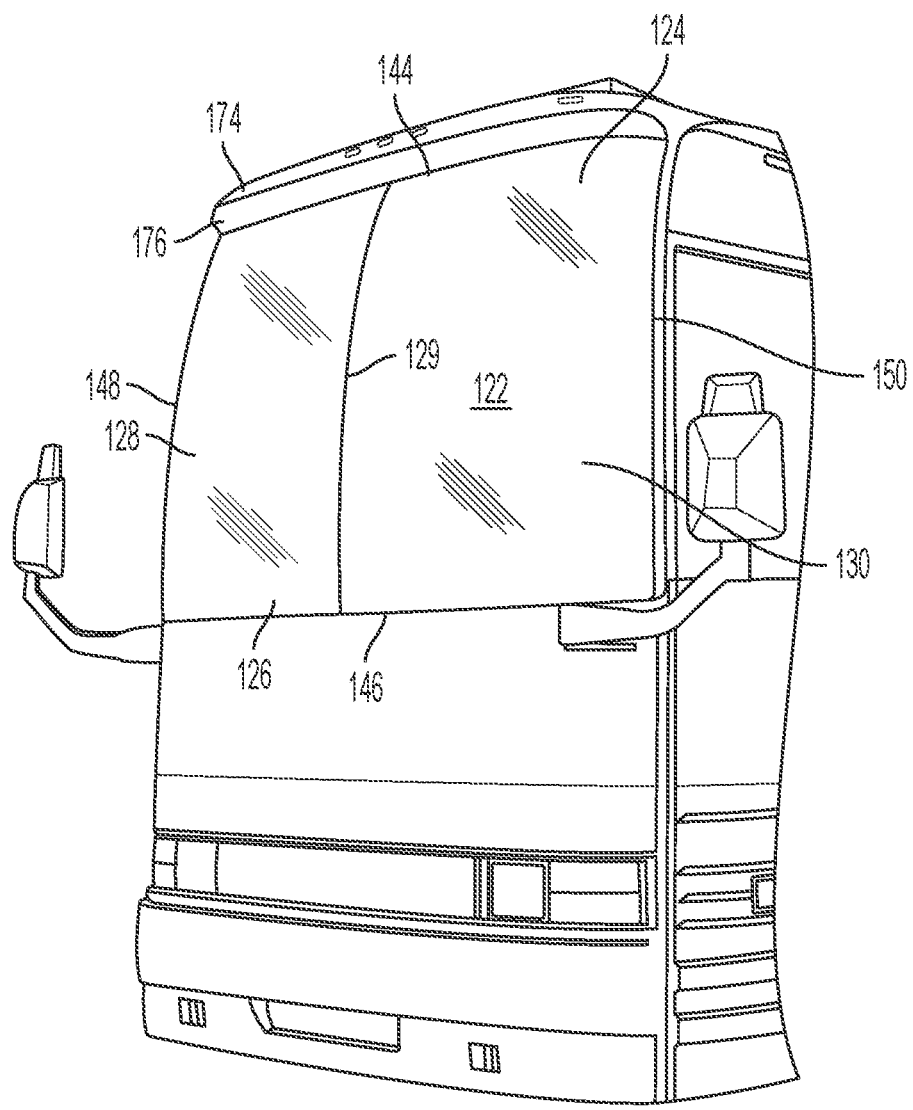
FIG. 32 is a right-side perspective of a windshield having a cleaning apparatus enclosed within a housing.

As shown in FIG. 31, when the spray bar 156 reaches the starting side frame 148 the spray bar is moved to a storage position so the spray bar, brush 152 and wiper blade 154 may fit within the starting side frame 147 with the cover closed over the starting side frame 148. Because the starting side frame 148 has a rectangular cross-sectional shape, the spray bar is moved to a location adjacent the juncture of the starting side frame 148 and the starting side frame cover 170, which is about 135° away from the surface of the windshield and about 45° from the return location adjacent the windshield and the wiper blade 154. The spray bar may be angled toward the corner of the rectangular cross-sectional shape of the starting side frame 148 to reduce the profile of the side frame 48. The storage configurations will vary depending on the configurations of the parts. Each cover 170 is placed over the starting side frame 148 or the return side frame 150 that is associated with each cover 170. The covers 170 are preferably hinged to the associated starting side frame 148 and return side frame 150, and rotated to the open and closed position by a separate electric motor.

Referring to FIGS. 32-39, systems, methods, and apparatus are disclosed for utilizing an alternative cleaning tool housing 174 to house brushes, wiper blades, and spray bars for a cleaning device in a disengaged position when not in use and in an engaged position when in use for cleaning a surface. As used herein, a housing that "houses" a cleaning tool is one that substantially (between 90% and 100%) surrounds at least three sides of a three-dimensional volume enclosing the cleaning tool. Cleaning tool housing 174 is shown coupled to a rooftop of a motor vehicle above top frame 144, and is preferably coupled using a permanent attachment means, such as welding or glue, although other attachment means, such as screws and bolts, could be used to couple cleaning tool housing to the motor vehicle.

Cleaning tool housing 174 is sized and disposed to house cleaning tools for the cleaning device—in this case two sets of brushes, wiper blades, spray bars, and splashguards where each set composes a cleaning tool arm 180*a* and 180*b*. While the space for the brushes, wiper blades, and spray bars is shown as a single cavity large enough to hold both cleaning tool arms 180*a* and 180*b*, cleaning tool housing 174 could be configured to have a plurality of cavities, for example two cavities that each house a cleaning tool arm, or six cavities that each discretely house a discrete cleaning tool. Cleaning tool housing 174 preferably has at least one housing cover 176 to enclose at least a portion of a cavity in which a cleaning tool is housed. Housing cover 176 is shown here as a single motorized door that folds within a cavity of cleaning tool housing 174 when the cleaning device is activated, however housing cover 176 could comprise a plurality of covers or could comprise a manual door in other embodiments.

Figure 33:
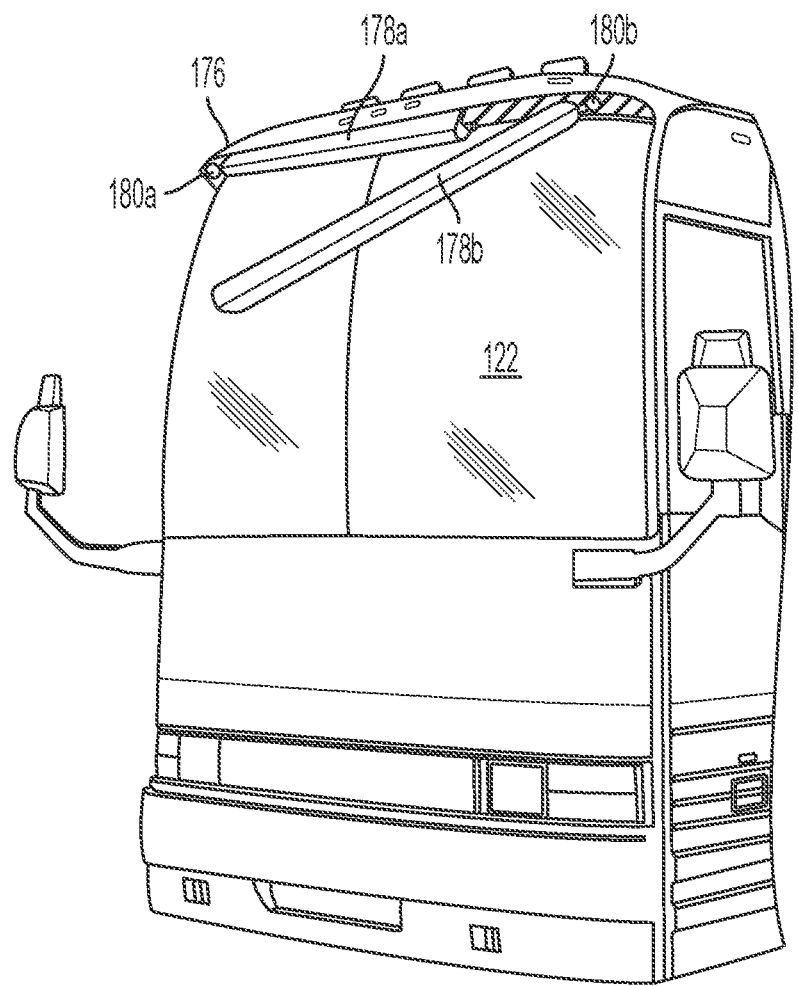
FIG. 33 is a right-side perspective of windshield of FIG. 32 where the cleaning apparatus is moving from a disengaged position to an engaged position.
Figure 34:
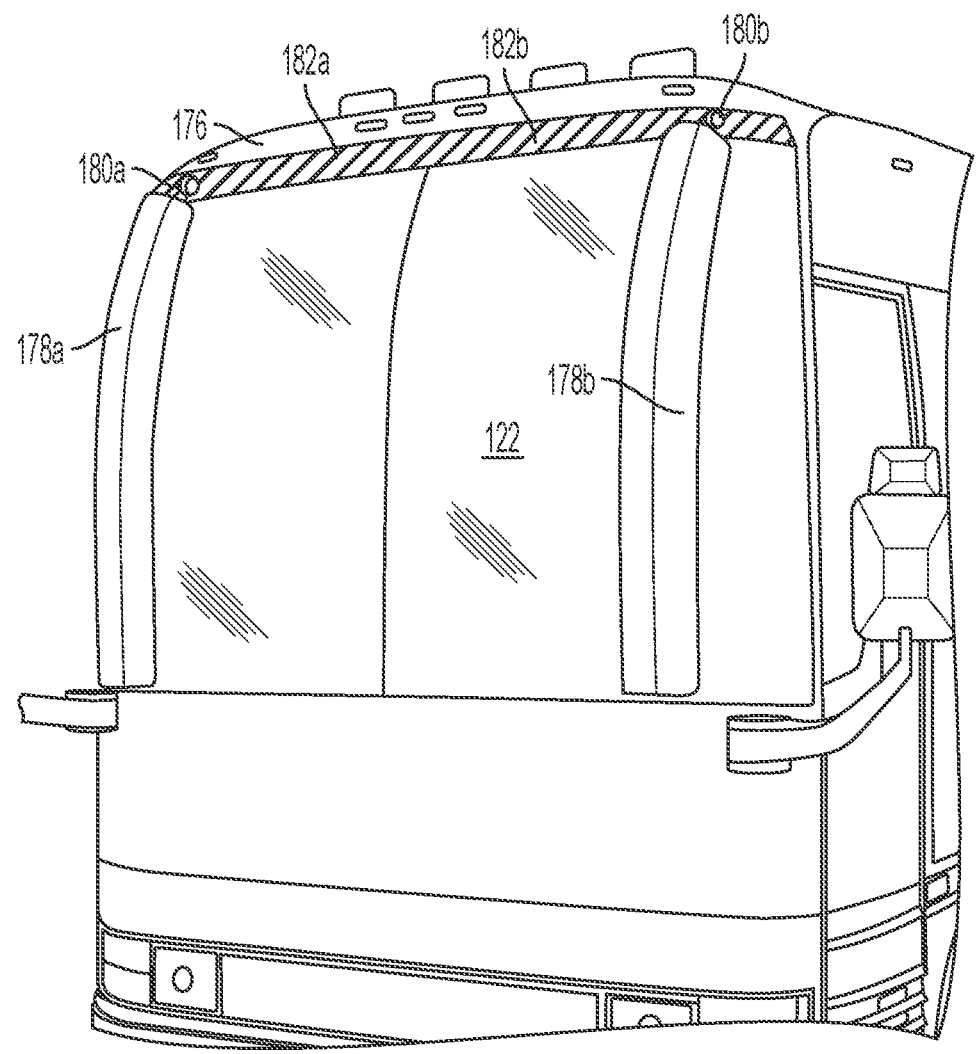
FIG. 34 is a right-side perspective of windshield of FIG. 32 where the cleaning apparatus is in an engaged position to clean the windshield.
Figure 35:
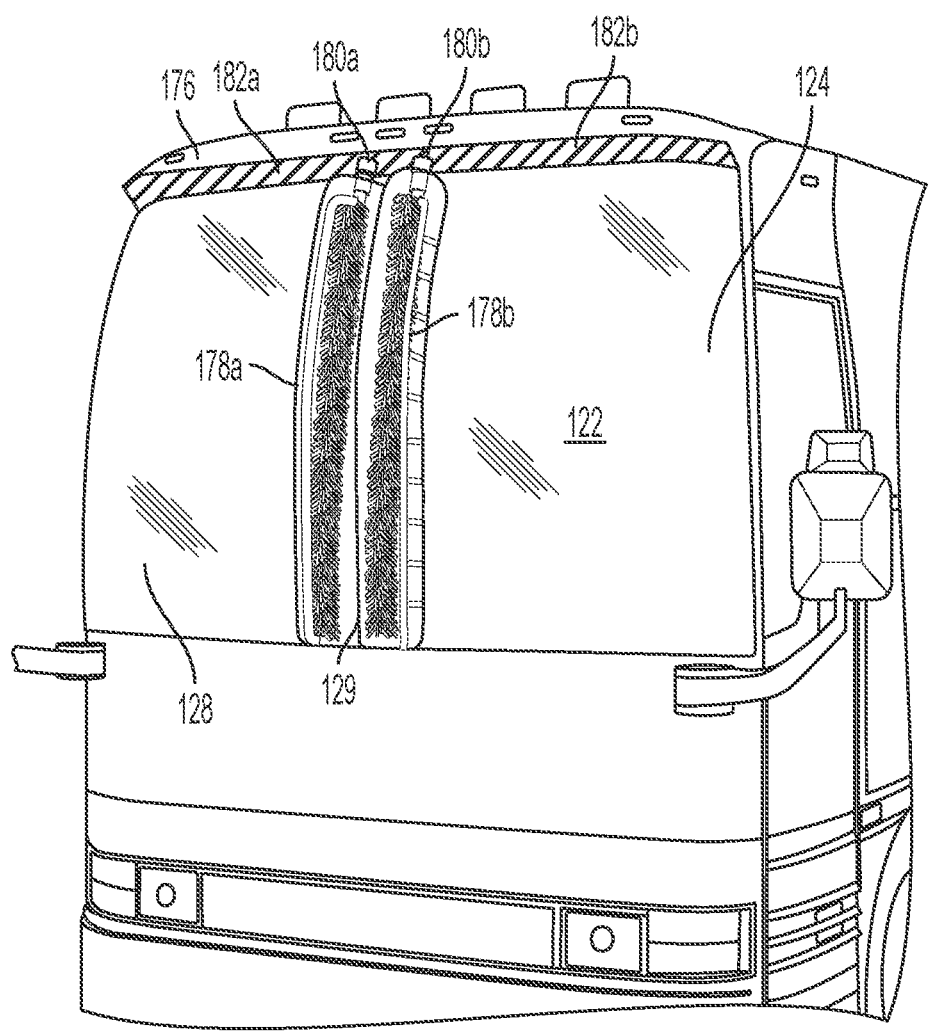
FIG. 35 is a right-side perspective of windshield of FIG. 32 having a translucent splash shield.

As shown in FIGS. 33 and 34, arm drive mechanism 180*a* is configured to move first cleaning tool arm from a disengaged position within cleaning tool housing 174 to an engaged position outside of cleaning tool housing 174, and arm drive mechanism 180*b* is configured to move first cleaning tool arm 178*b* from a disengaged position within cleaning tool housing 174 to an engaged position outside of cleaning tool housing 174. While the engagement drive mechanisms shown in FIGS. 33 and 34 are disclosed by way of example as rotating ball joints of arm drive mechanisms 180*a* and 180*b*, any suitable mechanism could be used to move a cleaning tool from a disengaged position within the cleaning tool housing to an engaged position outside the cleaning tool housing, such as a motorized hinge or a series of tracks and wheels. Here, arm drive mechanisms 180*a* and 180*b* move first and second cleaning tool arms 178*a* and 178*b* from a horizontal disengaged position within cleaning tool housing 174 seen in FIG. 32 to a vertical engaged position outside cleaning tool housing seen in FIG. 34 using rotating ball joints. The horizontal and vertical axis are substantially perpendicular to one another, which allows the cleaning tool arms to be discretely stored within a storage area more aesthetically pleasing than a side of a motor vehicle windshield. Depending upon the surface that the cleaning device is used for, a cleaning tool may such that its major length changes between any disparate axis, for example from a vertical position to a horizontal position or from a horizontal position to a diagonal position. As used herein, axis that are "substantially perpendicular" or "substantially parallel" to one another are axis that are perpendicular or parallel to one another within 5-10 degrees.

Each of cleaning tool arms 178a and 178b are mounted to first and second arm tracks 182a and 182b, located within cleaning tool housing 174, which allows movement drive mechanisms to move cleaning tools mounted on the arms across a surface of windshield 122 merely by moving cleaning tool arms 178a and 178b along tracks 182a and 182b. As shown, first and second arm tracks 182a and 182b are slightly curved near the edges of curved windshield 122, which allow cleaning tool arms 178a and 178b, respectively, to clean a non-planar surface of windshield 122 along the curved edges of windshield 122. When a cleaning tool arm is designed to clean a non-planar surface, preferably, any tracks that a cleaning tool arm is mounted to would have a track that is sized and disposed to conform to a profile of the surface such that a cleaning tool (e.g. a brush and/or a wiper blade) of the cleaning tool arm maintains contact while the cleaning tool arm is moved along the track. While arm drive mechanisms 180a and 180b are used to move cleaning tool arms 178a and 178b, respectively, along first and second arm tracks 182a and 182b, respectively, other known movement drive mechanisms could be used to move cleaning tools along a surface to be cleaned, such as robotic arms with multiple elbow joints or hinged joints for a cleaning tool similar to hinged joints of known windshield wipers.

Arm drive mechanisms 182a and 182b move the cleaning tool arms 178a and 178b, respectively, towards center of windshield 129, and are then activated to scrub their respective sides of windshield 122—first side of windshield 128 and second side of windshield 130. Activation of cleaning tool arms 178a and 178b can be observed more clearly in FIGS. 35-39, which show that liquid is sprayed towards windshield 122 while a brush wipes the surface while the cleaning tool arm is moved in one direction across windshield 122 to scrub a side of windshield 122 in FIGS. 35-38A, and then a wiper blade is placed against the surface while the cleaning tool arm is moved in another direction across windshield 122 to dry a side of windshield 122 in FIGS. 38B-39.

Figure 36:
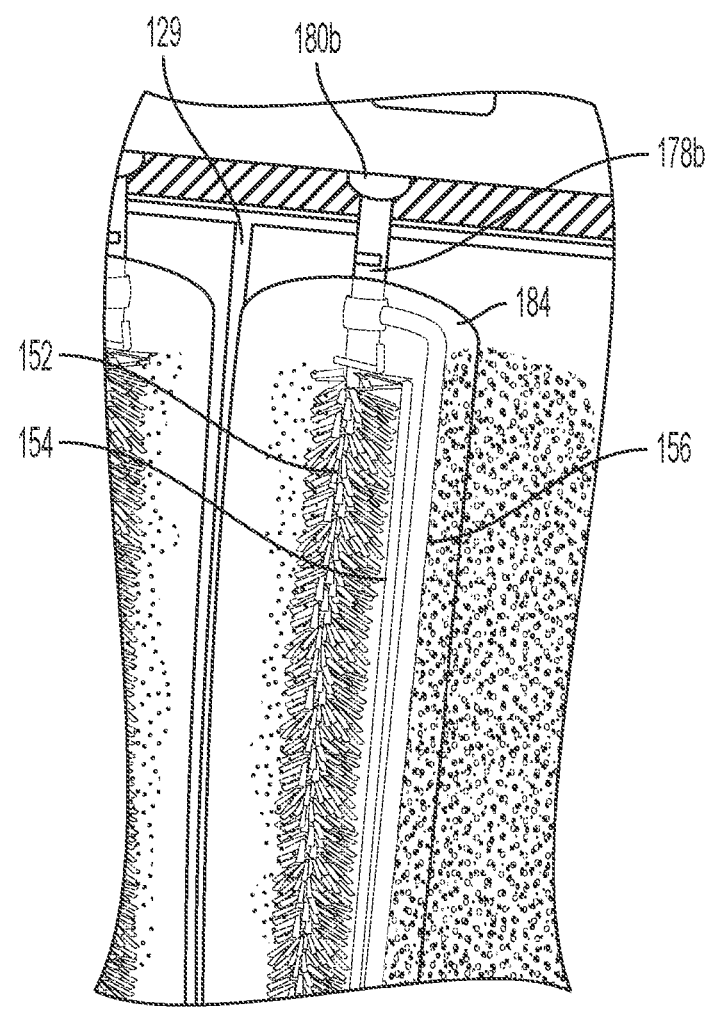
FIG. 36 is a zoomed-in view of one of the cleaning tool arms of FIG. 35.
Figure 37:
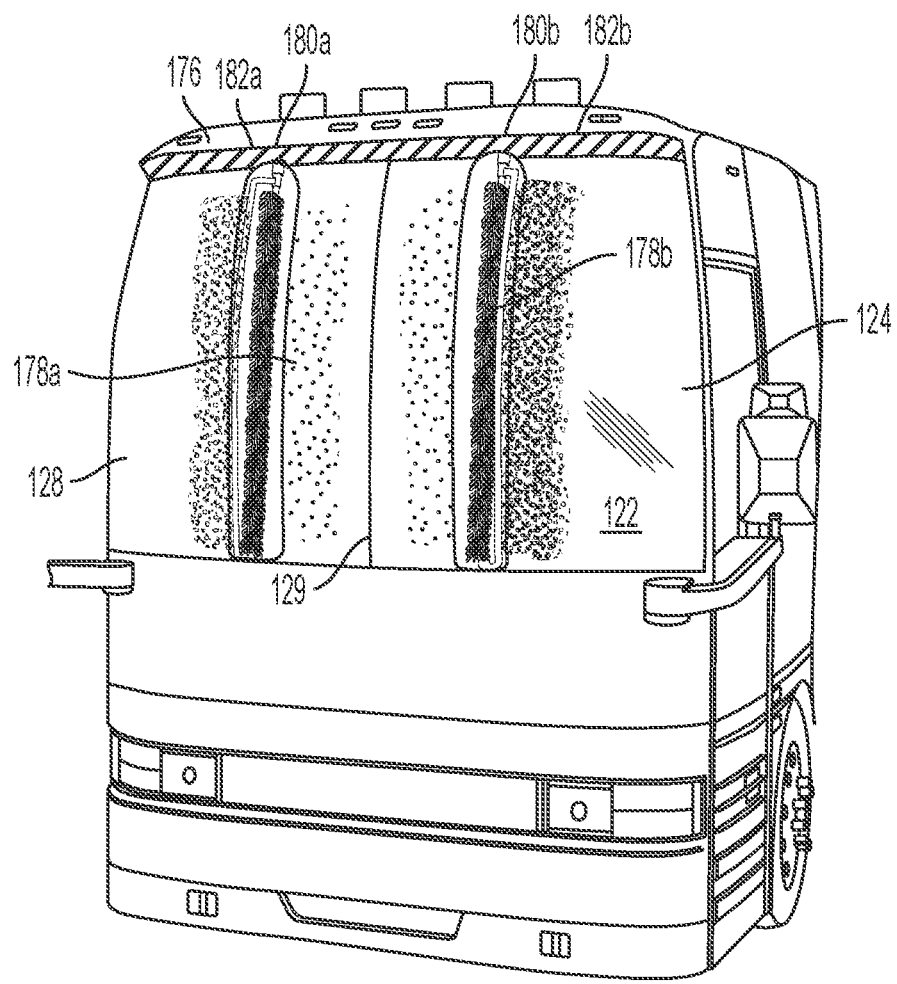
FIG. 37 is right side perspective of windshield of FIG. 35 with the brushes rotating, the spray bar spraying liquid, and the arm drive mechanisms moving the cleaning tool arms across the surface of the windshield.
Figures 38A, 38B:
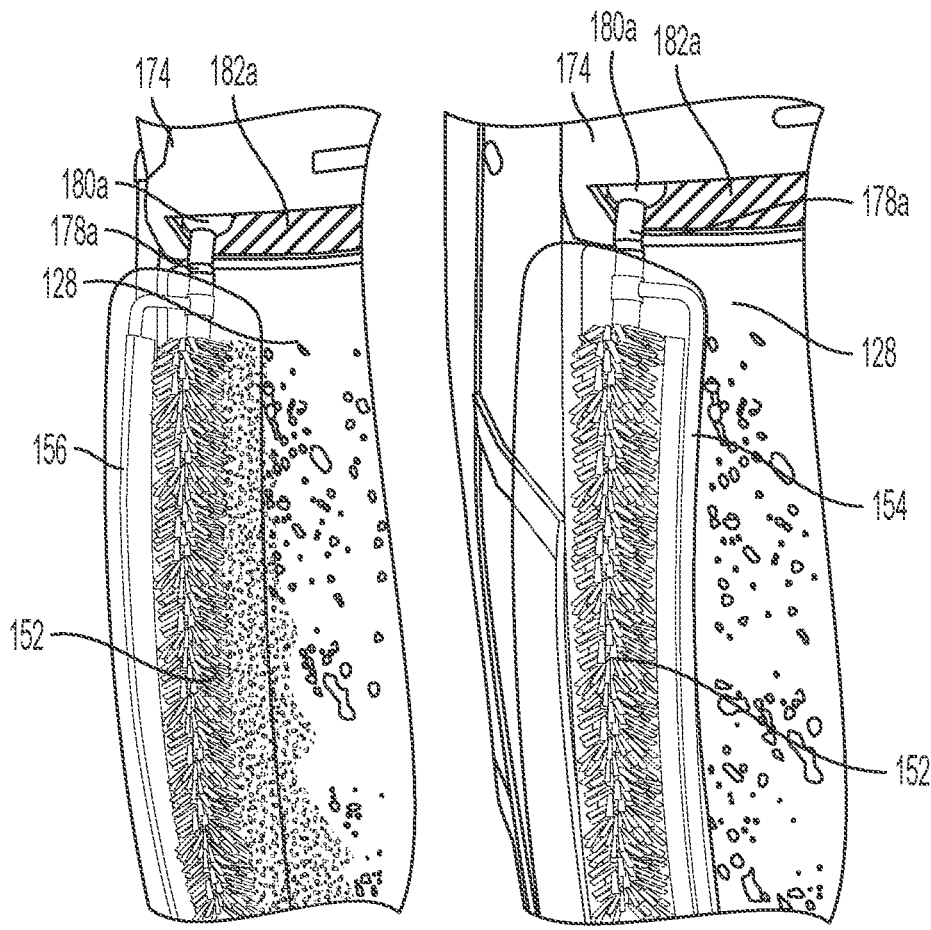
FIG. 38A is a zoomed in view of one of the cleaning tool arms of FIG. 35, with the brush and the spray bar in use and the wiper blade not in use.
FIG. 38B is a zoomed in view of the cleaning tool arm of FIG. 38A, with the wiper blade in use and the brush and the spray bar not in use.
Figure 39:
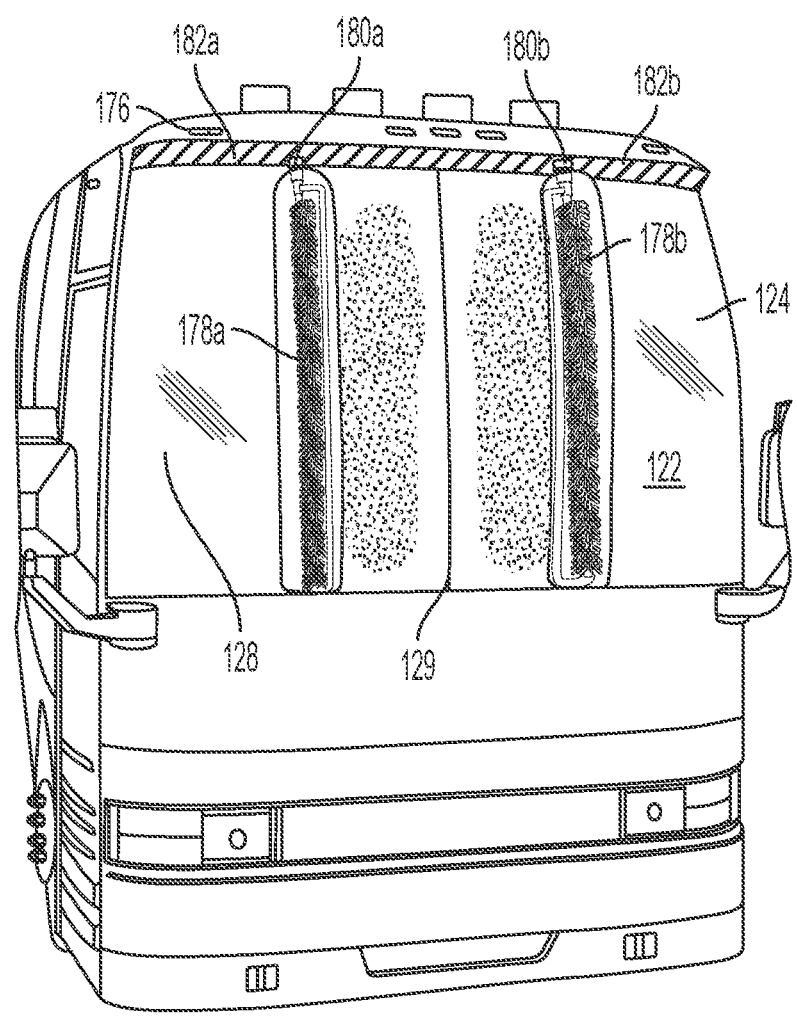
FIG. 39 is a left side perspective view of windshield of FIG. 35 with the wiper blade contacting the windshield and the arm drive mechanisms moving the cleaning tool arms across the surface of the windshield.

As shown in FIG. 36, when cleaning tool arm 178b is activated to scrub the second side 124 of windshield 122, spray bar 156 is used to spray liquid, for example water or a washer fluid, towards the surface of windshield 122, while brush 152 rotates against the surface of windshield 122. Splashguard 184 prevents the spraying water from spraying/splashing/ricocheting too far away from the surface of windshield 122, directing a majority of splashing fluid back towards the surface of windshield 122. Preferably, a brush drive mechanism is used to rotate brush 152 without also rotating spray bar 156, for example by using nested bars coupled via ball bearings. Any means of spraying liquid via spray bar 156 could be used, for example by using previously disclosed fluid channels with sets of spray nozzles pointed towards the surface of windshield 122. Since spray bar 156 is located to the right of rotating brush 152, and cleaning tool arm 178b moves to the right when scrubbing the second side 124 of windshield 122, portions of windshield 122 is sprayed with the liquid before the brush scrubs that portion of windshield 122. This is shown more clearly in FIG. 37, which shows one side of the cleaning tool arms having concentrated foam bubbles generated by spraying washer fluid towards the surface of windshield 122 with a spray bar, and the other side of the cleaning tool arms having less concentrated scrubbing bubbles generated by scrubbing the surface of windshield 122 with a brush. Similar embodiments exist for cleaning tool arm 178a.

In some embodiments, spray bar 156 is configured to perform a deicing procedure prior to spraying cleaning liquid onto windshield 122. In one embodiment, the deicing procedure comprises configuring spray bar 156 to first spray a deicing material onto windshield 122 prior to spraying cleaning fluid onto windshield 122. Any suitable deicing material could be used, for example warm water, any fluid having a melting point lower than water (e.g. alcohol, glycol, or a mixture thereof) or warm air could be sprayed onto windshield 122 prior to spraying cleaning fluid. In embodiments where the deicing material is warm water, the system could be configured to first heat the water within a liquid reservoir before spraying the warm water onto windshield 122, or by directing fluid from a hot water heater on the vehicle onto windshield 122. While the liquid reservoir could be contained within cleaning tool housing 174, the liquid reservoir could also be coupled to an exterior attachment means (e.g. a threaded screw hole) on cleaning tool housing, or could be coupled to another portion of the vehicle, having a hose that leads to a spray nozzle, such as nozzle 160a or 160b. In such embodiments, preferably two different hoses, one that transports deicing material and another that transports cleaning fluid, both lead to a single spray nozzle on a cleaning bar. In other embodiments, a separate spray nozzle (not shown) mounted to spray bar 156 could be used to spray deicing material onto windshield 122 prior to spraying cleaning fluid.

As shown in FIGS. 38A, 38B, 40A, and 40B, when cleaning tool arm 178a, reaches an edge of windshield 122, the system stops the rotation of brush 152 and stops spray bar 156 from spraying liquid, and then activates a transitioning drive mechanism to move spray bar 156 from a spraying position to a wiping position. Exemplary transitioning drive mechanisms could comprise a simple rotating joint coupled to the hinge to rotate cleaning tool arm 178a to move its spray bar from a spraying position to a wiping position. Cleaning tool arm 178a rotates spray bar 156 about brush 152 such that wiper blade 154 mounted to spray bar 156 is in contact with the surface of the windshield 122. From this position, the system dries windshield 122 by moving the cleaning tool arms back towards center of windshield 129. Since wiper blade 154 is in contact with the surface of windshield 122, as cleaning tool arm 178a moves towards center of windshield 122, wiper blade 154 acts as a squeegee to dry the surface of windshield 122. Preferably, such a transitioning drive mechanism is used to move brush 152 away from the surface of windshield 122 to prevent any bristles of brush 152 from touching the surface of windshield 122 while wiper blade 154 squeegee's the surface of windshield 122. Also preferably, an air compressor blows air through a fluid channel in spray bar 156 to blow air through a set of spray nozzles to help dry the surface of windshield 122. Similar embodiments exist for cleaning tool arm 178b.

Figure 40A:
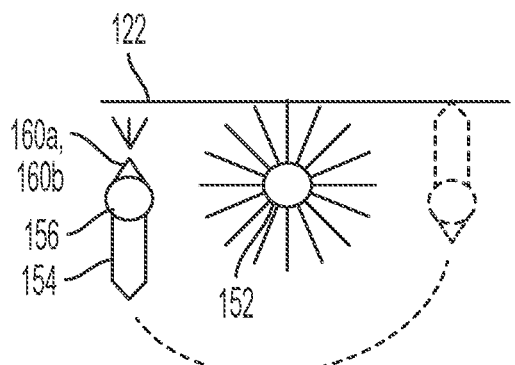
FIG. 40A is a cross-sectional view of a cleaning tool arm in a scrubbing position.
Figure 40B:
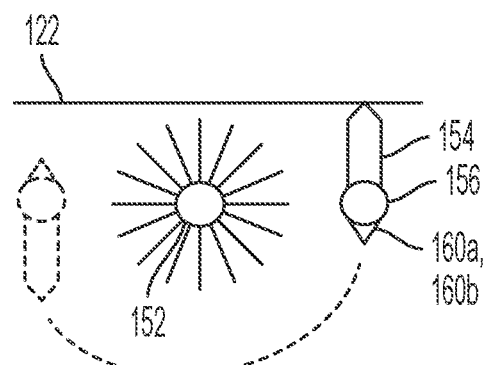
FIG. 40B is a cross-sectional view of the cleaning tool arm of FIG. 40A in a wiping position.
Figure 40C:
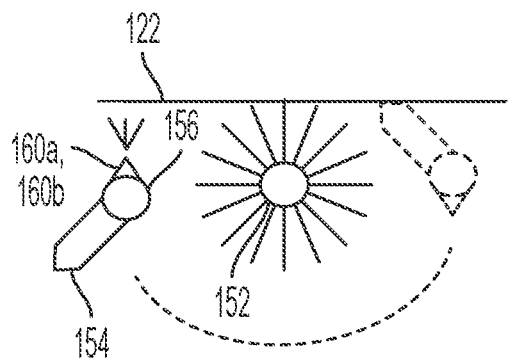
FIG. 40C is a cross-sectional view of a cleaning tool arm with an alternative wiper blade.
Figure 40D:
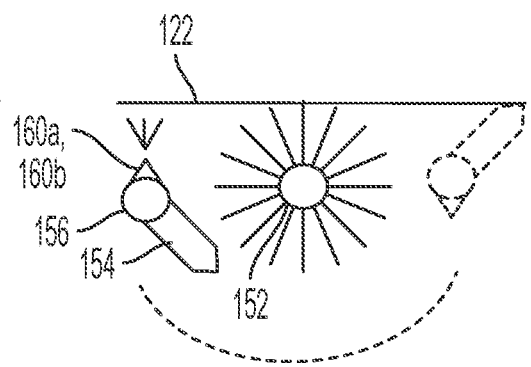
FIG. 40D is a cross-sectional view of another cleaning tool arm with yet another alternative wiper blade.

As shown in FIGS. 40C and 40D, the tip of wiper blade 154 could be oriented in a variety of directions to dry the surface of windshield 122. The tip of wiper blade 154 could be oriented substantially perpendicular to the surface of windshield 122, acute to the surface of windshield 122, or obtuse to the surface of windshield 122. In some embodiments, wiper blade 154 could also be bent. For example, a length of wiper blade 154 distal from the tip is substantially perpendicular to the surface of windshield 122 while a length of wiper blade 154 proximal to the tip is substantially acute or obtuse to the surface of windshield 122. In some embodiments, both spray bar 156 and wiper blade 154 could have matching attachment mechanisms that allow a user to interchangeably attach wiper blades having different angled configurations to spray bar 156. Contemplated attachment mechanisms include sliding dovetail joints, matching recesses/projections, and magnets.

When cleaning tool arms 178a and 178b are finished drying the surface of windshield 122, the arm drive mechanisms 180a and 180b, respectively, preferably rotate cleaning tool arms 178a and 178b, respectively, such that the tip of the wiper blades no longer touch the surface of windshield 122, and then move cleaning tool arms 178a and 178b to disengaged positions within cleaning tool housing 176. A door drive mechanism could then preferably close housing cover 176.

While two cleaning tool arms 178a and 178b are used to clean windshield 122, more or less cleaning tool arms could be used. For example, a single cleaning tool arm could be stored within cleaning tool housing 176, which is unfolded to an edge of the windshield, such as first side of windshield 128, and is then moved along a track spanning the entire horizontal length of windshield 122, or two cleaning tool arms could be moved to an engaged position on the first side of windshield 128 and two more cleaning tool arms could be moved to an engaged position on the second side of windshield 130.

While wiper blade 154 is shown as coupled to a side of spray bar 156, wiper blade 154 could have been coupled to a separate bar to the side of spray bar 156, or could be on a separate arm completely. In other embodiments, a cleaning device could have discrete arms for each of the brush, spray bar, and wiper blade, each of which can have discrete engagement drive mechanisms and movement drive mechanisms. While a single arm drive mechanism is used as an engagement drive mechanism to move each cleaning tool arm between the engaged position and the disengaged position, as a movement drive mechanism to move each cleaning tool arm across the surface of the windshield, and as a transitioning drive mechanism to move the brush, spray bar, and wiper blade from a spraying position to a wiping position, in some embodiments discrete drive mechanisms could be used as the engagement drive mechanism, movement drive mechanism, and transitioning drive mechanisms for a cleaning device. For example, an engagement drive mechanism could comprise a hinge that unfolds cleaning tool arm 178a from a disengaged position within cleaning tool housing 176 to first side of windshield 128, a transition drive mechanism could comprise a rotating joint coupled to the hinge to rotate cleaning tool arm 178a to move its spray bar from a spraying position to a wiping position, and a movement drive mechanism could comprise a trolley coupled to the rotating joint that moves cleaning tool arm 178a along first arm track 182a.

Movement of the cleaning tools could also be reversed compared to the exemplary movements disclosed herein, for example the cleaning tools could brush from the exterior edges to the middle, and wipe from the middle to the exterior edges, or could even be performed in other directions, for example brushing from top to bottom and wiping from bottom to top and vice-versa, or even moving diagonally. Preferably, the movement of the cleaning tools runs from one major edge to another major edge of the surface, for example from a major edge of a rectangle to a major edge of a rectangle.

While cleaning tool housing 174 is shown coupled to a portion of the motor vehicle located above top frame 144, cleaning tool housing 174 could be coupled to either side of windshield 122, or even could be coupled below windshield 122. In some embodiments, cleaning tool housing could be coupled to a motorized arm that extends to a point proximal to windshield 122 such that a drive mechanism is configured to extend a cleaning tool from the cleaning tool housing to operationally affect a surface of windshield 122, however cleaning tool housing 176 is preferably coupled within a few inches from an edge of windshield 122, such as within 10 inches, 5 inches, 1 inch, or even abutting a frame of windshield 122, such as top frame 144. In embodiments where the cleaning tool is mobile with respect to the surface to be cleaned, such as an elevated scaffolding for cleaning the exterior of a building, the cleaning tool housing could be mounted to an edge of the scaffolding—preferably an edge closest to the surface of the window.

Regarding the embodiments disclosed in FIGS. 18-31, an appropriate control system may be advantageously provided to open and close the covers 170, move the spray bar 154 to its first, second and storage positions at the appropriate time and location, start and stop rotation of the brush 152 at the appropriate time and location, start and stop the flow of washer fluid to and through the first spray nozzles 160a, start and stop the flow of air to and through the second spray nozzles 160b, start, stop and reverse the movement of the top and bottom carriers 132, 134 (and connected brush, spray bar and wiper blade).

Regarding the embodiments disclosed in FIGS. 32-39, appropriate control systems may be advantageously provided to open and close housing cover 176, move first and second cleaning tool arms 178a and 178b between the disengaged position and the engaged position, move first and second cleaning tool arms 178a and 178b across the surface of windshield 122, move the brushes of first and second cleaning tool arms 178a and 178b away and towards the surface of windshield 122, start and stop rotation of the brushes of first and second cleaning tool arms 178a and 178b, start and stop the flow of washer fluid to the spray bars of first and second cleaning tool arms 178a and 178b, start and stop the flow of air to the spray bars of first and second cleaning tool arms 178a and 178b, and transition the spray bars of first and second cleaning tool arms 178a and 178b between the spraying position and the wiping position, all at the appropriate times and locations.

In embodiments where spray bar 156 is configured to spray both deicing material and cleaning fluid onto windshield 122, the control system may be configured to have a user interface that allows a user to select either a deicing wash or a non-deicing wash, where the only difference between the two washes is whether deicing material is first sprayed on the windshield before cleaning fluid is sprayed onto the windshield. In embodiments where deicing material is first sprayed, the control system could be configured to spray deicing material across the windshield while the arm moves across the windshield, and then spray cleaning fluid across the windshield over the deicing material, or could be configured to first spray deicing material across the windshield use the wiper blade across the windshield, and then spray cleaning fluid across the windshield.

The frame 140 is preferably sized to close surround and enclose the periphery of windshield, and preferably the outer, front surface of the frame is flat against or flush with the adjacent surface of the vehicle to which the frame 140 is connected. The frame 140 advantageously extends into the front portion of the vehicle and thus may require some alteration of the vehicle if the frame 140 is retrofit to preexisting vehicles. As the frame 140 encircles the windshield 140, it may be advantageous for the frame 140 to have inwardly extending flanges to which the windshield 122 is connected so that the windshield may be mounted to or connected to the frame 140. The frame 140 is believed optional, especially the top and bottom frames 144, 146 which could primarily enclose the rails on which the top and bottom carriers 134, 136 travel and which guide those carriers.

Figure 41:
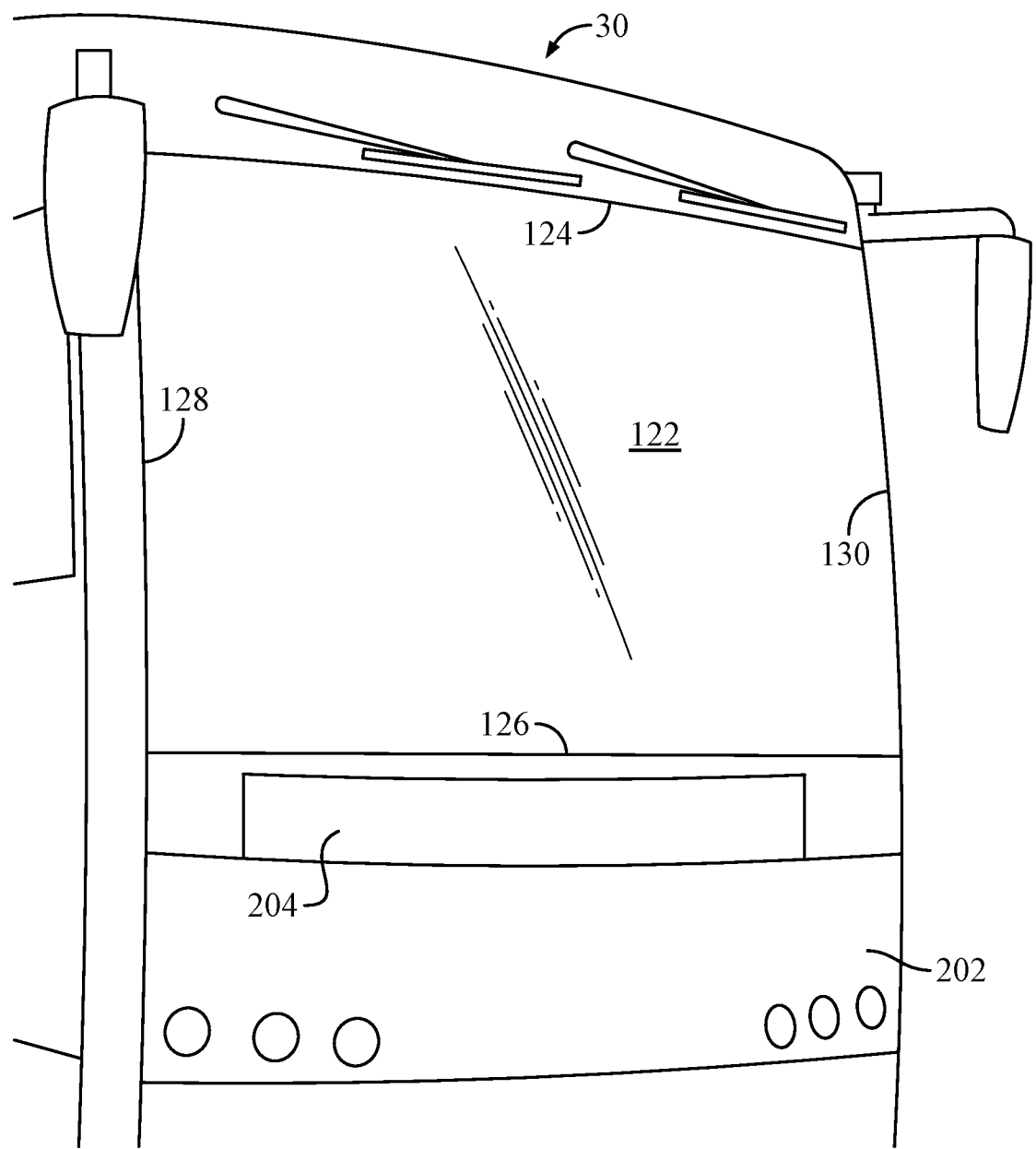
FIG. 41 is a front-side perspective view of a motor vehicle having an alternative windshield cleaning system that is held within a closed storage cavity when not deployed.
Figure 42:
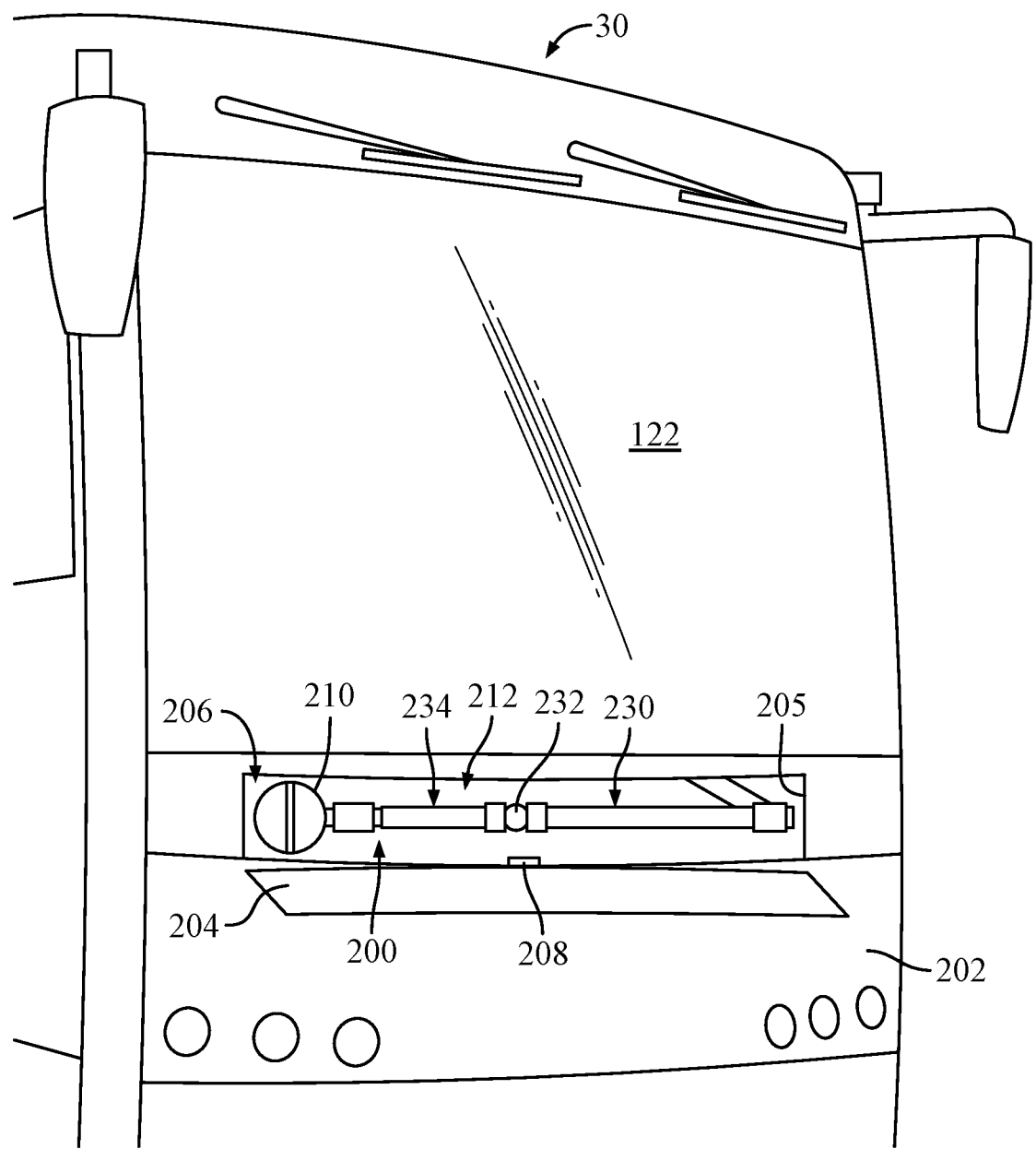
FIG. 42 shows the configuration of FIG. 41 with a cover of the windshield cleaning system open.

With reference next to FIGS. 41-46, in another embodiment, a window cleaning system 200 can be stored hidden within a front face 202 of the vehicle 30 when not in use, and selectively deployed to clean the windshield 122 of the vehicle 30. With specific reference to FIGS. 41 and 42, the windshield 122 of the vehicle 30 has a top portion 124, bottom portion 116 first side portion 128, and second side portion 130. A front face 202 of the vehicle 30 in the illustrated embodiment is substantially vertical and disposed generally below the windshield 122. A cover 204 preferably is arranged to lie substantially flush with the front face 202 and provides selective access through a cavity 205 to a storage space 206 behind the front face 202. The cover 204 can be configured to hingedly open as shown in FIG. 42 so as to reveal the window cleaning system 200. As shown, window cleaning system 200 is retained within the storage space 206 close behind the front face 202. Preferably, a cover actuator 208, such as a motor, is configured to selectively rotate the cover 204 about its hinge to the open position shown in FIG. 42.

Figure 43:
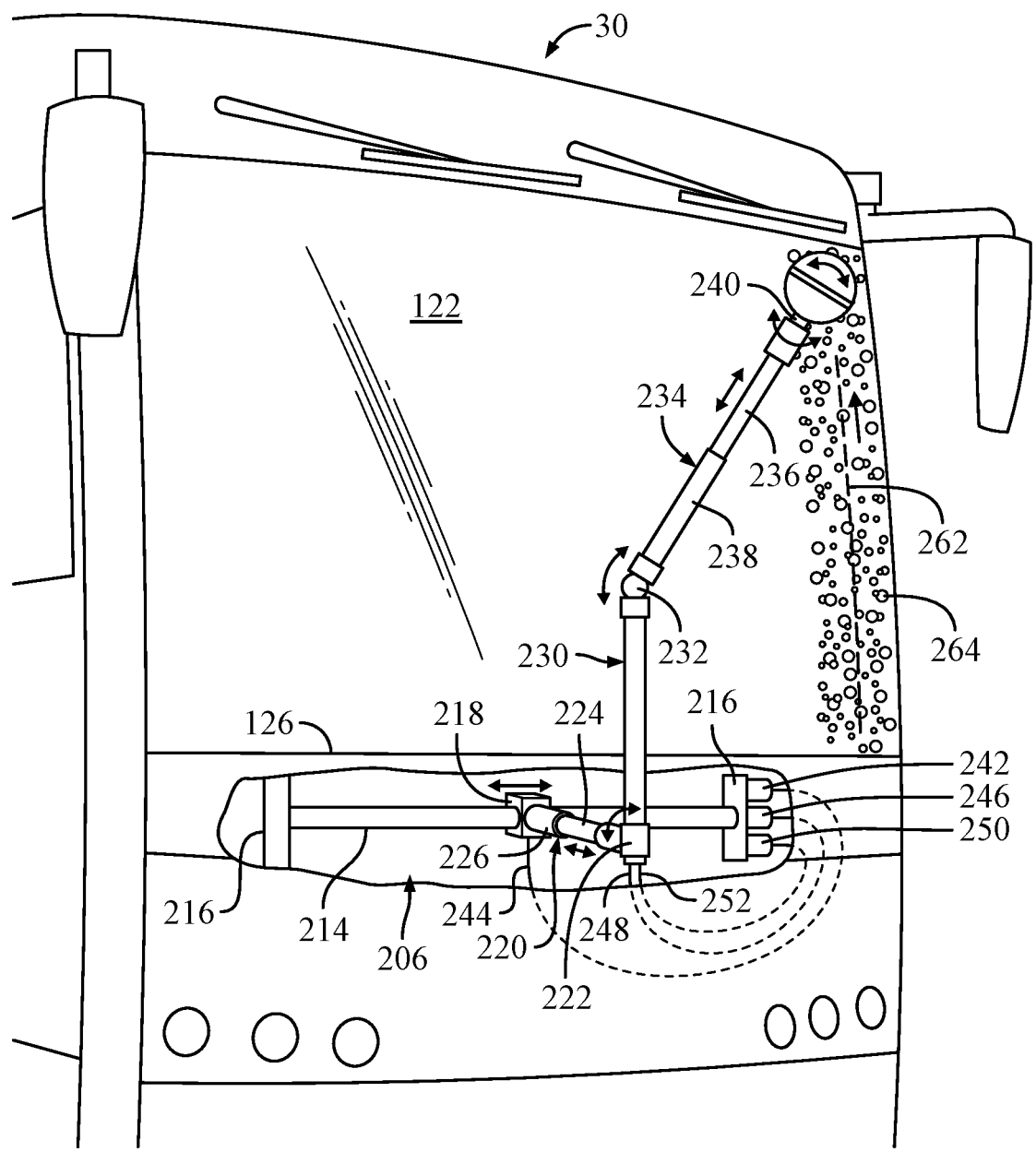
FIG. 43 shows the configuration of FIG. 41 partially cut away and during a cleaning cycle.

With additional reference to FIG. 43, the window cleaning system 200 includes a cleaning head 210 supported by an active positioning system 212 that is configured to position the cleaning head 210 at substantially any position on the windshield 122. The illustrated active positioning system 212 includes an elongated track 214 that supports a base mount 218 thereon. The base mount 218 preferably comprises an actuator such as a motor that is configured to move the base mount 218 linearly along the length of the track 214. In the illustrated embodiment, the track 214 is mounted at either end onto structural members 216 of the vehicle 30.

With continued reference specifically to FIGS. 42 and 43, a base extension member 220 extends from the base mount 218 and terminates at a base joint 222. As illustrated, the base extension member 220 further comprises a base telescoping member 224 and a base receiver member 226. As such, a length of the base extension member 220 can be readily adjusted so as to position the base joint 222 forwardly of the front face 202 as the cleaning system 200 as it is being deployed. Expansion and contraction of the base extension member 220 can be effectuated by an actuator such as a motor and/or piston/cylinder structure, or any other actuator structure. It is to be understood that various structures can be employed for the base extension member 220. For example rather than the illustrated telescopic arrangement, the base extension member 220 can be configured to be moved relative to the base mount 218 so as to move the base joint 222 linearly between the deployed position shown in FIG. 43 and the storage position shown in FIG. 42.

The base joint 222 can be rotated relative to the base mount 218. An elongated first extension member 230 extends from the base joint 222 to an articulating joint 232. An elongated second extension member 234 extends from the articulating joint 232 to a head joint 240 that is connected to the cleaning head 210. The illustrated second extension member 234 comprises a telescoping member 236 that is received within a receiving member 238 so that the length of the second extension member 234 can be selectively modified.

Preferably, the articulating joint 232 is configured so that the second extension member 234 can be rotated relative to the first extension member 236. A plurality of actuators, such as motors, can be provided to selectively actuate the base mount 218, base extension member 220, base joint 222, first extension member 230, articulating joint 232, second extension member 234, and head joint 240. Preferably, a controller 242, which is shown schematically in FIG. 43, can be connected to the active positioning system 212 via a power/data line 244 so as to provide power and control instructions so that the plurality of actuators work together to place the cleaning head 210 in a desired position and move it according to a desired pattern. The controller 242 can be independent of or work in concert with the vehicle's computer 24. In some variations, the controller 242 can be incorporated into the vehicle's computer 24. Also, it is to be understood that, in other variations, data can be communicated within the system by wired or wireless connections, including hybrids of same.

With continued reference to FIG. 43, a cleaning fluid source 246 can supply cleaning fluid to a cleaning fluid line 248 that can extend through hollow portions of the first extension member 230 and second extension number 234 to deliver cleaning fluid to the cleaning head 210. Similarly, an air compressor 250 can supply compressed air to an air line 252, which can extend through hollow portions of the first extension member 230 and second extension member 234 to deliver compressed air to the cleaning head 210. As will be discussed in more detail below in connection with FIGS. 45 and 46, the cleaning head 210 can comprise a brush side 254 having a plurality of bristles 256 and a drying side 258 having a wiper blade 260.

Figure 44:
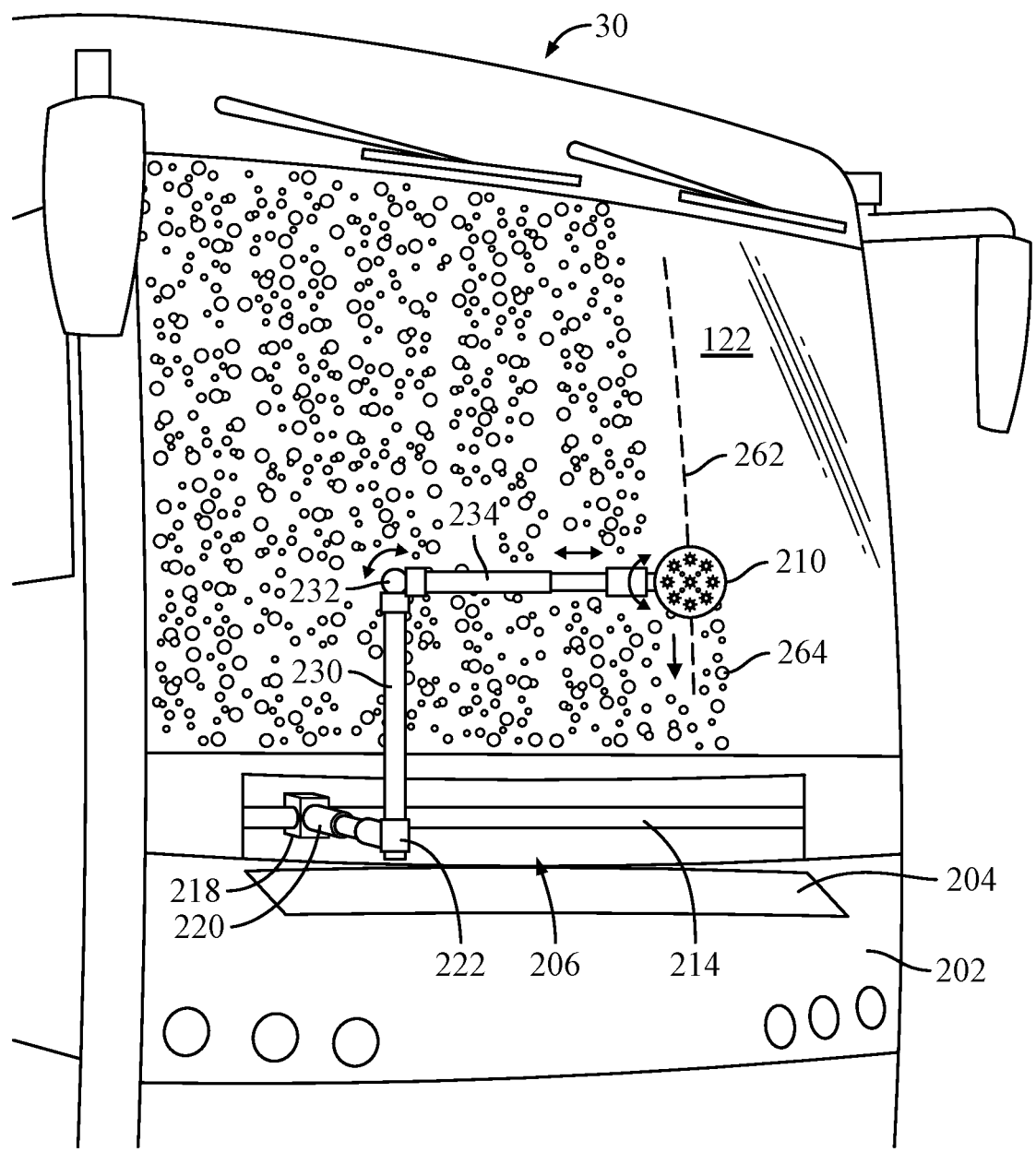
FIG. 44 shows the configuration of FIG. 41 during a drying cycle.

With specific reference to FIGS. 43 and 44, in operation, once the active positioning system 212 has been deployed, the components of the active positioning system 212 will move in concert to place the brush side 254 of the cleaning head 210 into contact with the windshield 122. Most preferably, cleaning of the windshield 122 is conducted in an organized manner. For example, as shown in FIG. 43, the cleaning head 210 may first be placed in a corner of the windshield 122 where the bottom side 126 and second side 130 intersect. With the bristles 256 pressed against and making constant contact with the windshield 122, cleaning fluid can be injected and the bristles 256 moved over the windshield 122 along a path 262 from the bottom side 126 of the windshield 122 vertically to the top side 124 of the windshield 122. This pattern can be repeated, creating multiple adjacent, parallel paths 262 in which the cleaning head 210 may be moved up and down while scrubbing the windshield 122, loosening and removing debris from the windshield. This pattern can be repeated so that the entire windshield is scrubbed, possibly leaving behind layers of cleaning fluid that have been foamed into soap suds 264.

In the illustrated embodiment, the first extension member 230 is configured to be at least slightly rotatable about its axis so as to have the effect of pushing the cleaning head 210 against the windshield 122 with a desired level of force. A sensor can be provided to measure the resistance force provided by the windshield 122 and provide feedback to the controller 242 so that a desired pressing force can be maintained throughout the cleaning process.

With specific reference next to FIG. 44, once the entire windshield 122 has been cleaned using the brush side 254, the head joint 240 can rotate, positioning the drying side 258 of the cleaning had 210 facing the windshield 122. The cleaning head 210 can also be rotated so that the wiper 260 is positioned generally horizontally, or at least generally perpendicular to the path 262. The active positioning system 212 can then be controlled to slide the wiper 260 across the windshield 122 along paths 262 so as to remove cleaning fluid/suds 264 and loosened debris from the windshield 122.

Once the windshield 122 has been sufficiently cleaned and dried, the active positioning system 212 can operate to return the window cleaning system 200 to its storage position as depicted in FIG. 42, and the cover 204 can be closed to completely hide the system 200 as depicted in FIG. 41.

Figure 45:
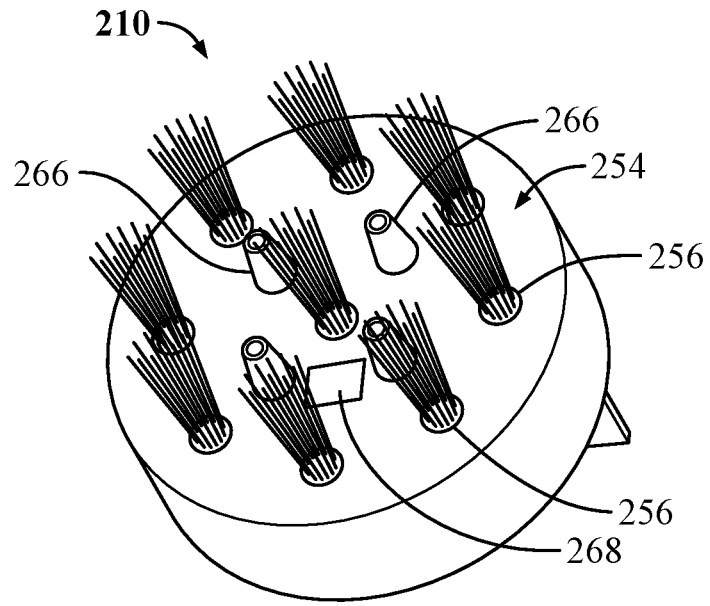
FIG. 45 is a perspective view of a brush side of a cleaning head of the windshield cleaner of FIG. 41.

With reference next to FIG. 45, the brush side 254 of the cleaning head 210 can be configured with several bristles 256, or another structure configured to agitate and remove undesired material from the windshield. A plurality of spray nozzles 266 can be configured to receive cleaning fluid from the cleaning fluid tube 248. A rotating and/or vibrating motor 268 can be configured to rotate and/or vibrate the brush side 254, or in some variations the entire cleaning head 210, so that the bristles 256 will agitate window debris so as to loosen and remove such debris from the windshield 122. It is to be understood that any appropriate configuration of bristles and spray nozzles can be employed.

Figure 46:
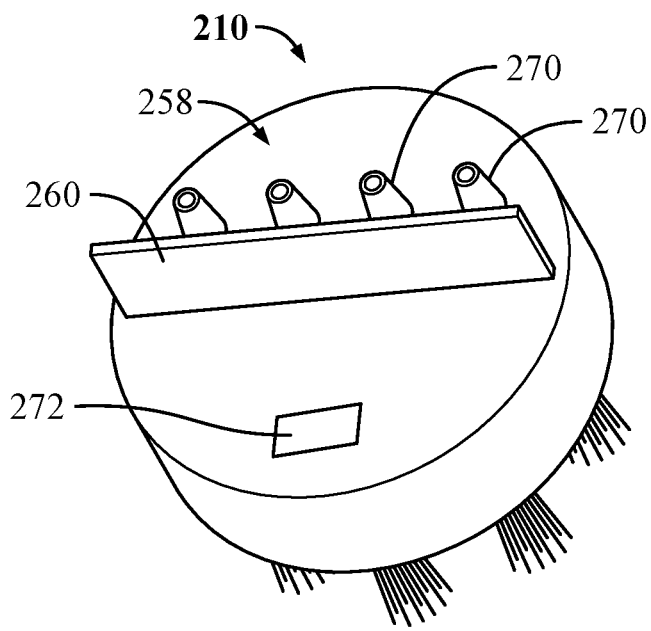
FIG. 46 is a perspective view a drying side of the cleaning head of the windshield cleaner of FIG. 41.
Figure 47:
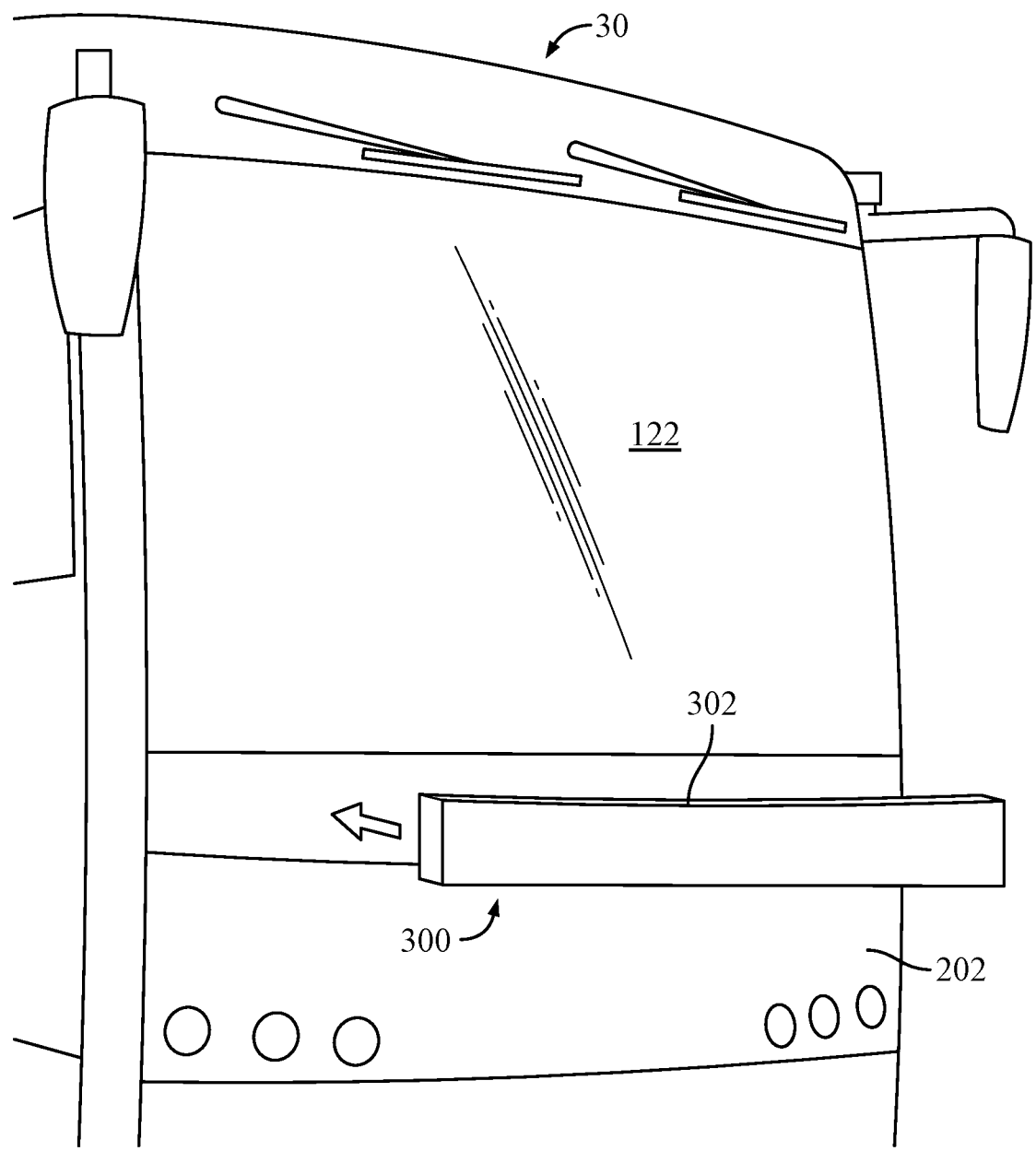
FIG. 47 is a perspective view of a motor vehicle upon which a self-contained windshield cleaning system can be mounted.
Figure 48:
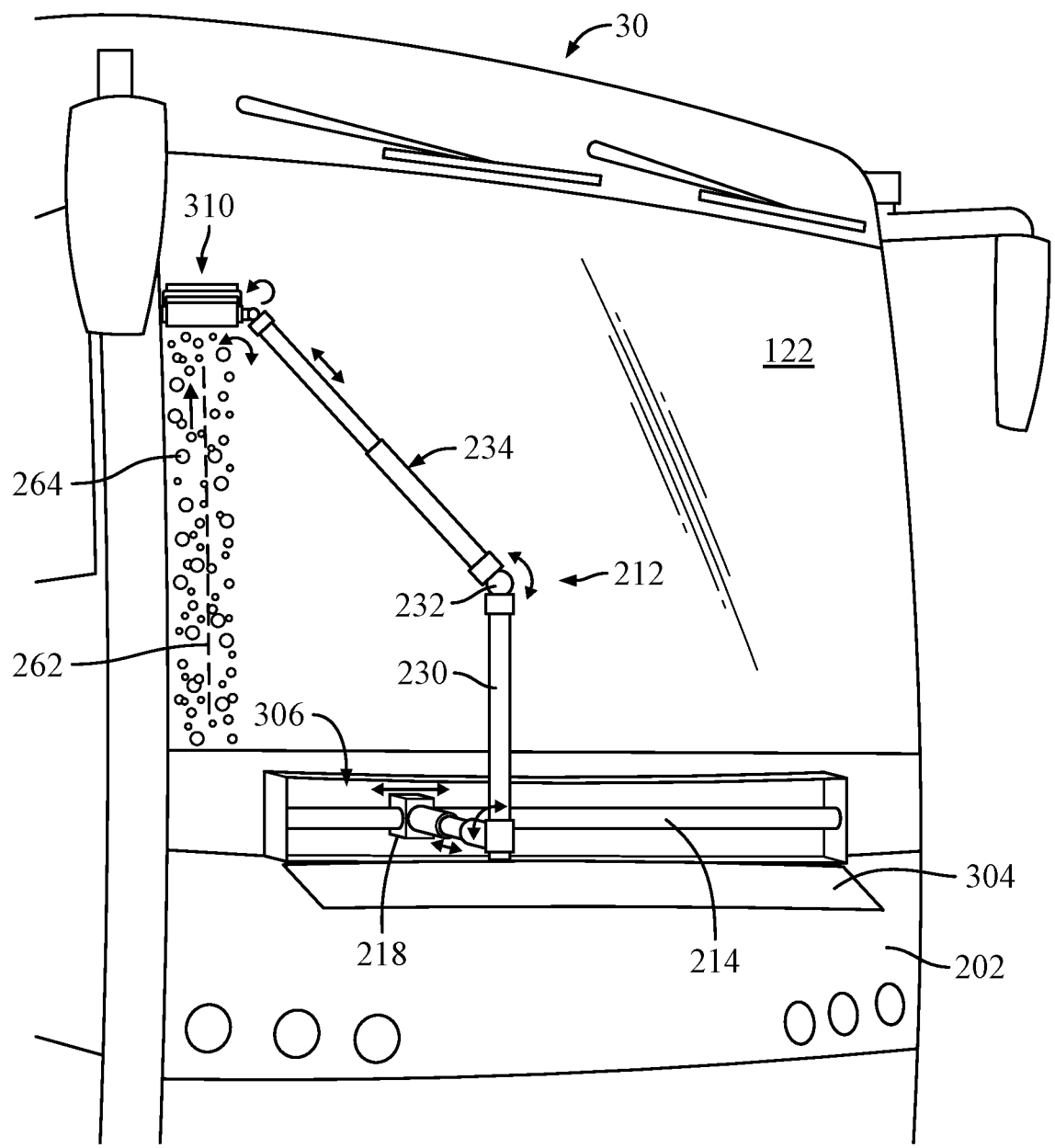
FIG. 48 shows the motor vehicle of FIG. 47 with the self-contained windshield cleaning system installed and deployed during operation.

With reference next to FIG. 46, the drying side 258 of the cleaning head 210 comprises the wiper blade 260 and can comprise a plurality of air nozzles 270. The air nozzles 270 can be configured to direct flows of compressed air onto the windshield 122 to aid drying of the windshield. Most preferably, the air nozzles 270 are arranged on one side of the wiper blade 260 and during operation the cleaning head 210 is rotated so that the air nozzles direct compressed air onto the windshield 122 immediately after the wiper blade 260 has wiped cleaning fluid from the windshield. As such, cleaning fluid that may remain on the windshield after passage of the wiper blade 260 is subject to the flow of compressed air, which helps dry the windshield 122.

A location sensor 272 can be incorporated into the cleaning head 210. The location sensor 272 can be configured to detect the position of the cleaning head 210 relative to the windshield 122. Preferably, the controller 242 is configured with knowledge of the shape and dimensions of the associated windshield 122. As such, the controller 242 can selectively control the plurality of actuators associated with the active positioning system 212 to place and move the cleaning head 210 appropriately. Data from the location sensor 272 can be provided to the controller 242 to establish that the actual location of the cleaning head 210 is as expected by the controller 242. Thus, data from the location center sensor 272 can be used by the controller 242 to calibrate the positioning system 212. The location sensor 272 can be configured in any of a plurality of ways. For example, in some variations the location sensor 272 can sense a distance from a ferrous material and thus sense how close the cleaning had 210 is to metallic portions of the car adjacent edges of the windshield. In another variation, a location sensor 272 can include an RFID reader, and a plurality of RFID chips can be placed about edges of the windshield or adjacent edges of windshield. Using data indicating the relative position of the cleaning head 210 relative to the RFID chips, the controller 242 can determine the actual location of the cleaning head 210 relative to the windshield 122.

It is to be understood that a plurality of actuators, such as motors and/or piston/cylinder combinations, can be provided in connection with the various joints, telescoping members, rotating or vibrating members, or the like. Such actuators can be configured in any desirable manner and can be arranged using various structural approaches known in the art. Also, although specific embodiments discussed herein employ electric-powered actuators, it is to be understood that some variations can employ one or more actuators that are powered and controlled using other approaches, such as using hydraulic fluid, pressurized gas, or the like.

With reference next to FIGS. 47-50, in a variation, a self-contained windshield cleaning system 300 can comprise a container 302 configured to define an enclosed space 306 within which an active positioning system 212 and cleaning head 310 can be enclosed when in a stored position. The illustrated self-contained window cleaning system 300 can be installed by attaching the container 302 to vehicle 30 below the windshield 122 or another window. In the illustrated embodiment, the container 302 can be mounted onto the front panel 202 of the vehicle 30 just below the windshield 122. In some variations, the front panel 202 can be cut to create a cavity into which the container 302 can be fully or partially fit and secured.

As shown, the track 214 is mounted at either end to the sidewalls of the container 302, and a front wall of the container 302 includes a cover 304 that preferably is hinged and can be selectively opened to provide access for the cleaning head 310 and positioning system 212 be deployed. The active positioning system 212 can include a base mount 218, base extension member 228, base joint 222, first extension member 230, articulating joint 232 second extension member 234, and head joint 240 that can be moved in concert in a manner as discussed above in order to position the cleaning head 310 as desired. Although not specifically shown, it is anticipated that power/data wires and tubes can be provided to provide power and control instructions for actuators of the system 300 and to provide cleaning fluid and pressurized air to the cleaning head 310.

Figure 49:
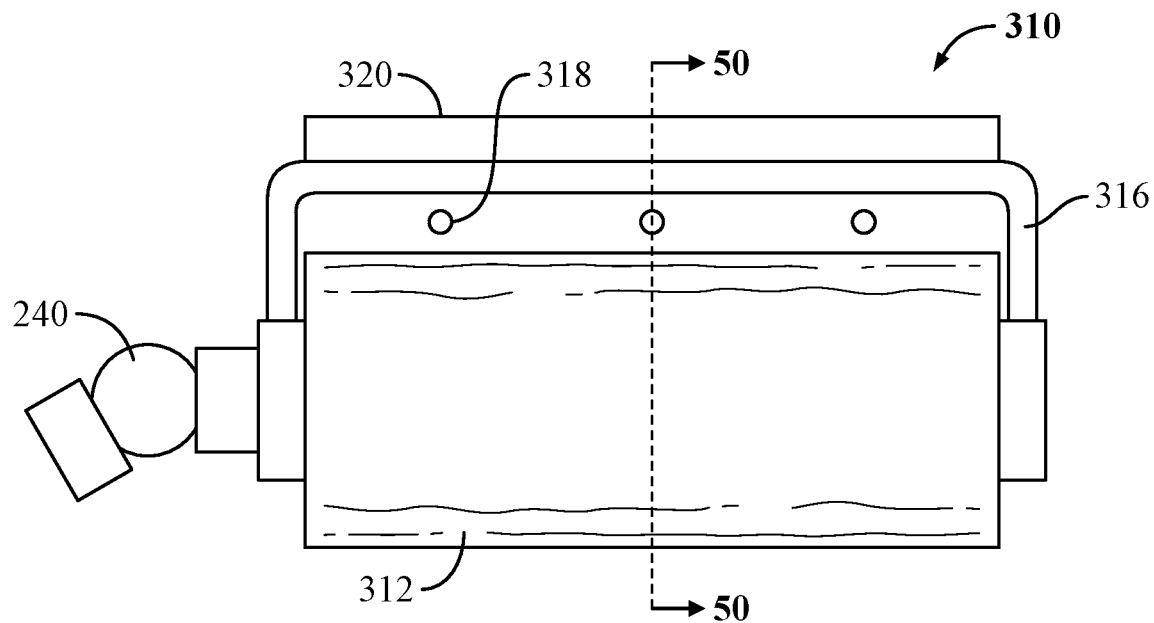
FIG. 49 is a side view of a cleaning head for use with the windshield cleaning system of FIG. 48.
Figure 50:
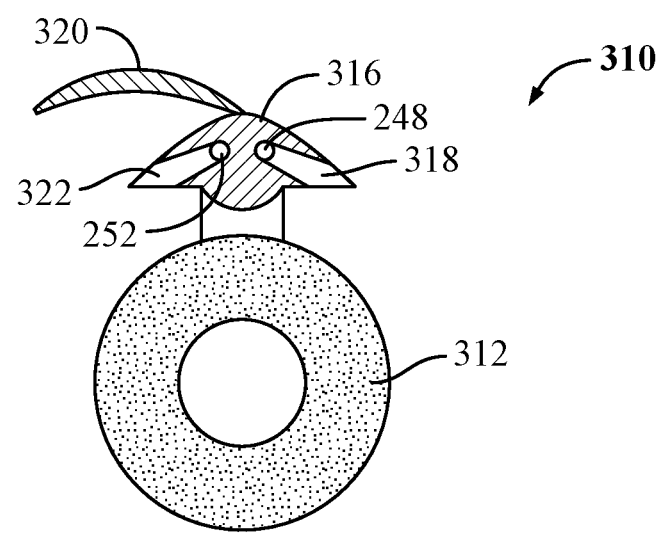
FIG. 50 is a cross-sectional view taken along lines 50-50 of FIG. 49.

With specific reference next to FIGS. 49 and 50, the cleaning head 310 can have similarities to embodiments discussed above, and can include a brush 312 that can be configured to rotate in order to agitate debris on the windshield 122. A spray bar 316 can extend over the length of the brush 312 and can include a plurality of spray nozzles 318 that are connected to cleaning fluid lines 248 and configured to spray cleaning fluid on the windshield 122 and/or directly on the brush 312. The wiper blade 320 can extend from the spray bar 316, and one or more air nozzles 322 can be placed in communication with the air line 252 and configured to selectively dispense pressurized air onto the windshield 122. Once the windshield 122 is treated with cleaning fluid and agitation by the brush 312, the cleaning head 310 can be rotated to put a tip of the wiper blade 320 into contact with the window windshield 122 and the cleaning head 310 can be moved while simultaneously actuating the air nozzles 322 to wipe and dry the windshield 122.

Figure 51:
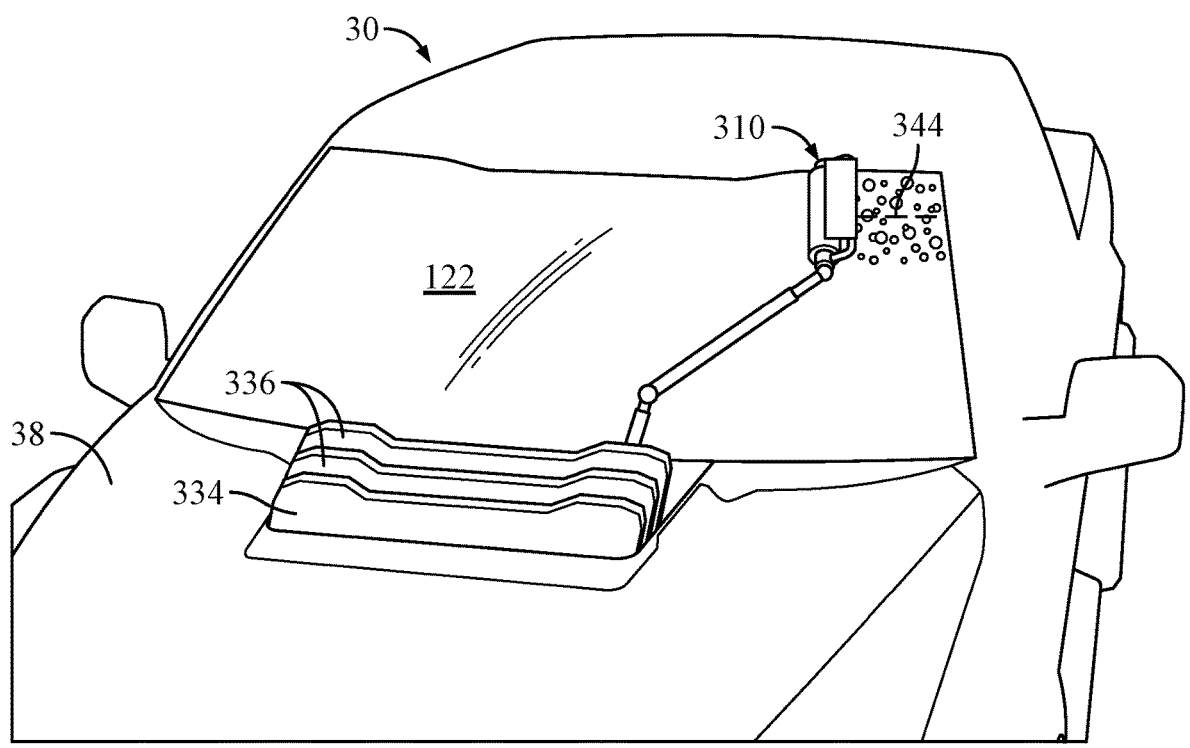
FIG. 51 is a perspective view of another motor vehicle having an alternative windshield cleaning system, shown during a cleaning cycle.
Figure 52:
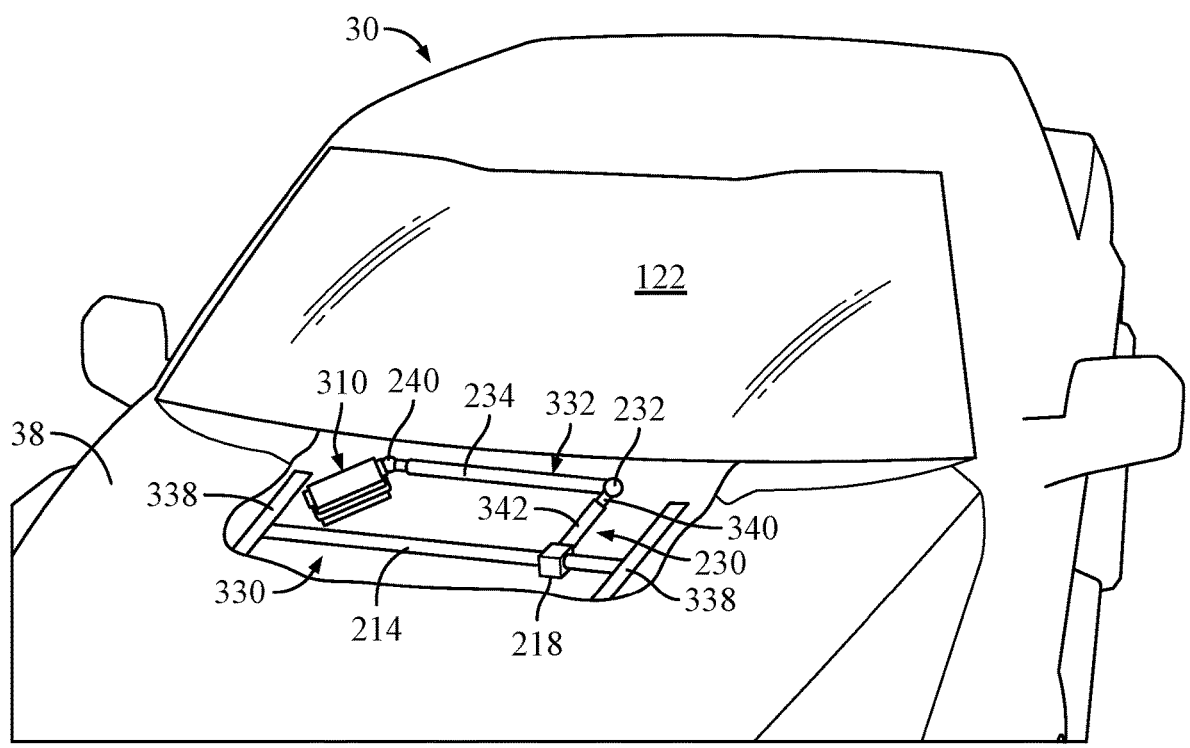
FIG. 52 is a top, cutaway view of the configuration of FIG. 51, schematically showing structure of the windshield cleaning system.

With reference next to FIGS. 51 and 52, in another embodiment, a windshield washing system 330 can be provided under the hood 38 of a vehicle 30. A cover 334 disposed in the hood 38 may hide the washing system 330 from view, and preferably is hingedly openable in order to allow the washing system 330 to deploy. In the illustrated variation, the cover 334 extends forwardly from the windshield side of the hood 38 and is centered within the width of the hood 38, only extending over a part of the hood width. As shown, the cover 334 has a width about half of a width of the hood 38. It is to be understood that additional variations may employ covers 334 that extend only part of the width of the hood 38, but may have widths greater than or less than half of the width of the hood 38. Also, the illustrated cover 334 comprises a plurality of louvres 336 that are configured to hingedly rotate to open the cover 334. The cover 334 is hinged along its forward-most edge, and can open sufficiently to enable the washing system 330 to be deployed while opening about 75° or less, and in some variations about 60° or less, and in further variations about 45° or less.

As best shown in FIG. 52, the illustrated window washing system 330 comprises a cleaning head 310 supported by an active positioning system 332 configured to position the cleaning head 310 substantially anywhere on the windshield 122. The illustrated active positioning system 332 shares some features with the active positioning system 212 discussed above. As shown, the base mount 218 is supported so as to be linearly movable along track 214. The track 214 can be supported at either end by structural members 338 that are incorporated into the hood 38 or within the vehicle's front compartment. A first extension member 230 extends to an articulating joint 232, and a second extension member 234 extends from the articulating joint 232 to a head joint 240, upon which the cleaning head 310 is supported. The first extension member 230 can include a telescoping portion 340 and a receiver portion 342 so that the length of the first extension member 230 can be varied as needed. The cleaning head 310 can be similar to that discussed above. In the illustrated embodiment, the active positioning system 332 is configured to move the cleaning head 310 transversely across the windshield along a generally horizontal path 344 to both clean the windshield and, on a later pass, wipe and dry the windshield 122.

As discussed above in connection with FIGS. 7-12, variations are contemplated in which a particular portion of the windshield may be cleaned, such as to clean residue 68 from an insect impact or other debris that may be concentrated in a localized portion of the windshield. To wit, a user may wish to concentrate scrubbing and cleaning on only a relatively-small portion of the windshield. With specific reference next to FIGS. 53 and 54, a digital display 26 can be provided within a cabin 28 of the car, disposed in the dashboard 40. A camera 350 can be provided, such as on the dashboard 40 or on the ceiling of the cabin 28, can be and configured to capture a real-time or near-real-time image of the windshield 122. Such windshield image 122a can be depicted on the display. Since the windshield image 122a is a real-time or near-real-time depiction of the actual windshield 122, debris such as insect residue 68 will be depicted as a residue image 68a. Preferably, the image captured by the camera 350 is processed by the vehicle's computer 24 and/or a cleaning system controller (such as 242) so that the windshield image 122a is mapped to the display 26.

Figure 53:
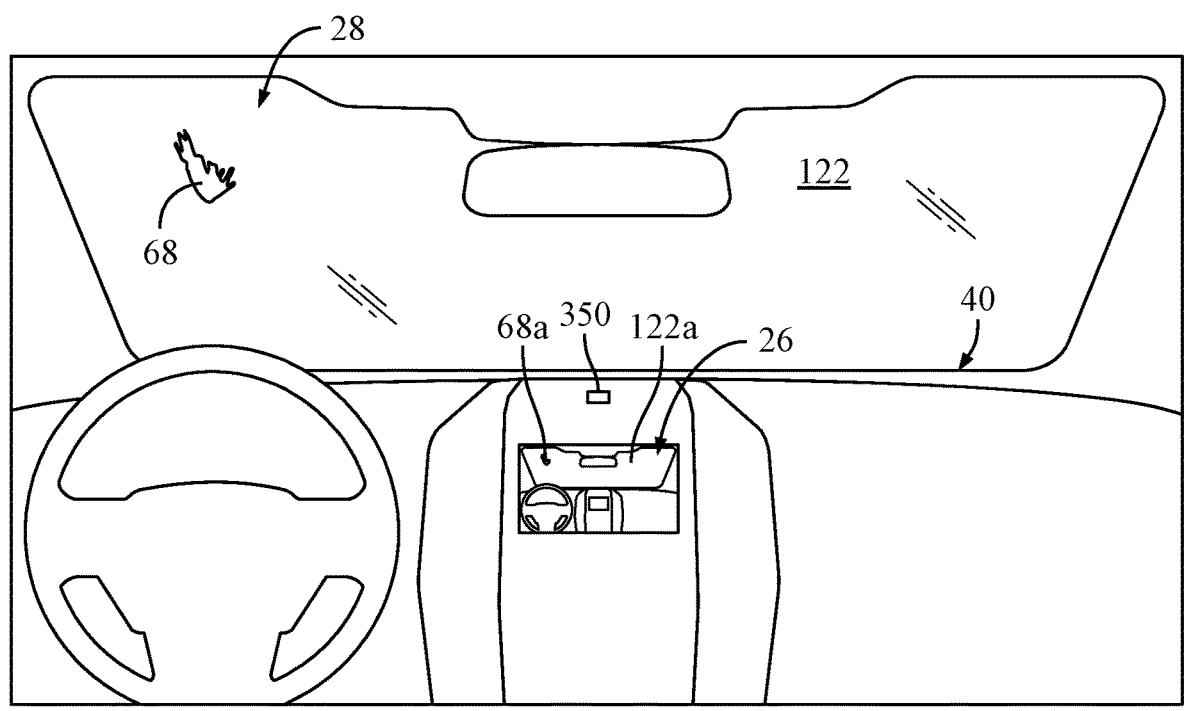
FIG. 53 shows an example dashboard of the motor vehicle of FIG. 51, having a display configured to enable control of the windshield cleaning system.
Figure 54:
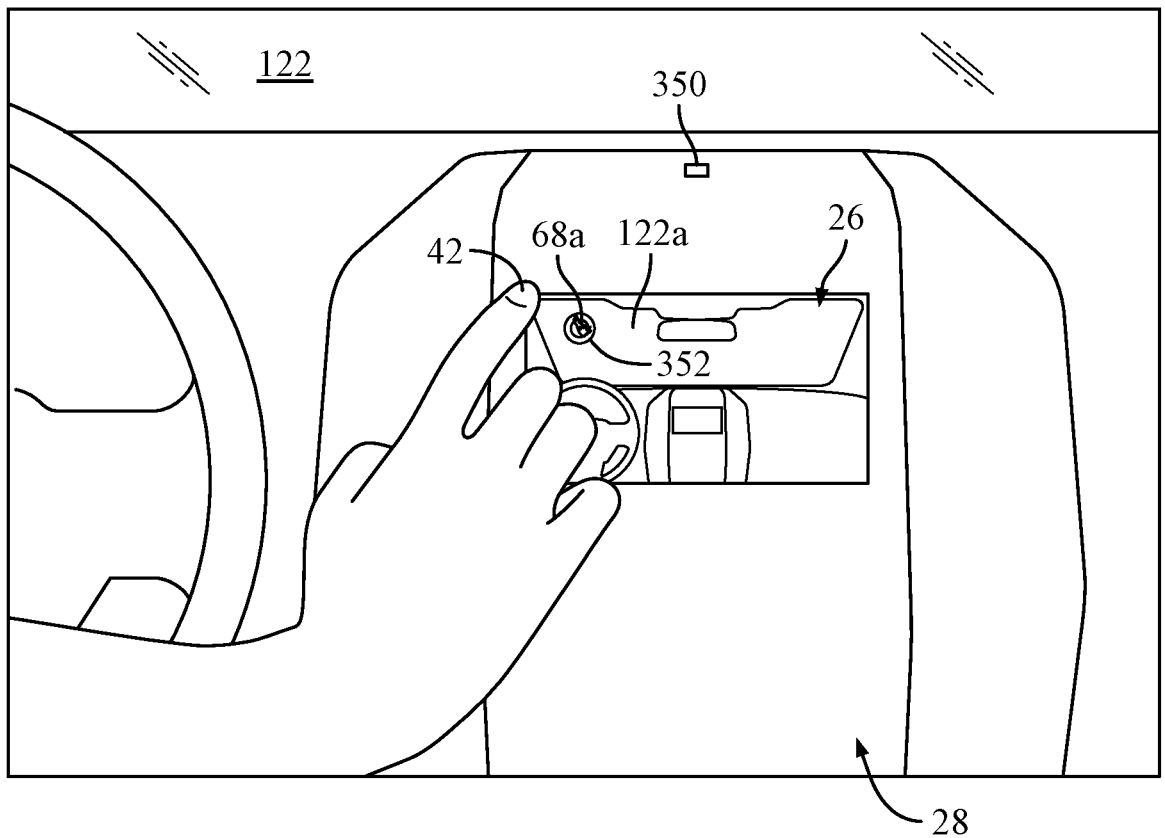
FIG. 54 is a close-up view of the display of FIG. 53 during use during a spot-clean operation.

With continued reference to FIGS. 53 and 54, in operation, a user can use their finger 42 to touch the residue image 68a on the display 26. The display 26 preferably is a touch-screen display configured to identify the location on the display 26 that has been touched by the user's finger 42. Since the display 26 is mapped to the windshield image 122a, the location of the windshield image 122a touched by the user's finger 42 on the display is mapped to the actual position on the actual windshield 122. In the illustrated example, the user's finger touches the display 26 at the location of the residue image 68a, which location is highlighted 352 to indicate that it has been selected. A processor, such as computer 24, will communicate this selection, and the corresponding selected location upon the actual windshield 122, to the controller 242.

Figure 55:
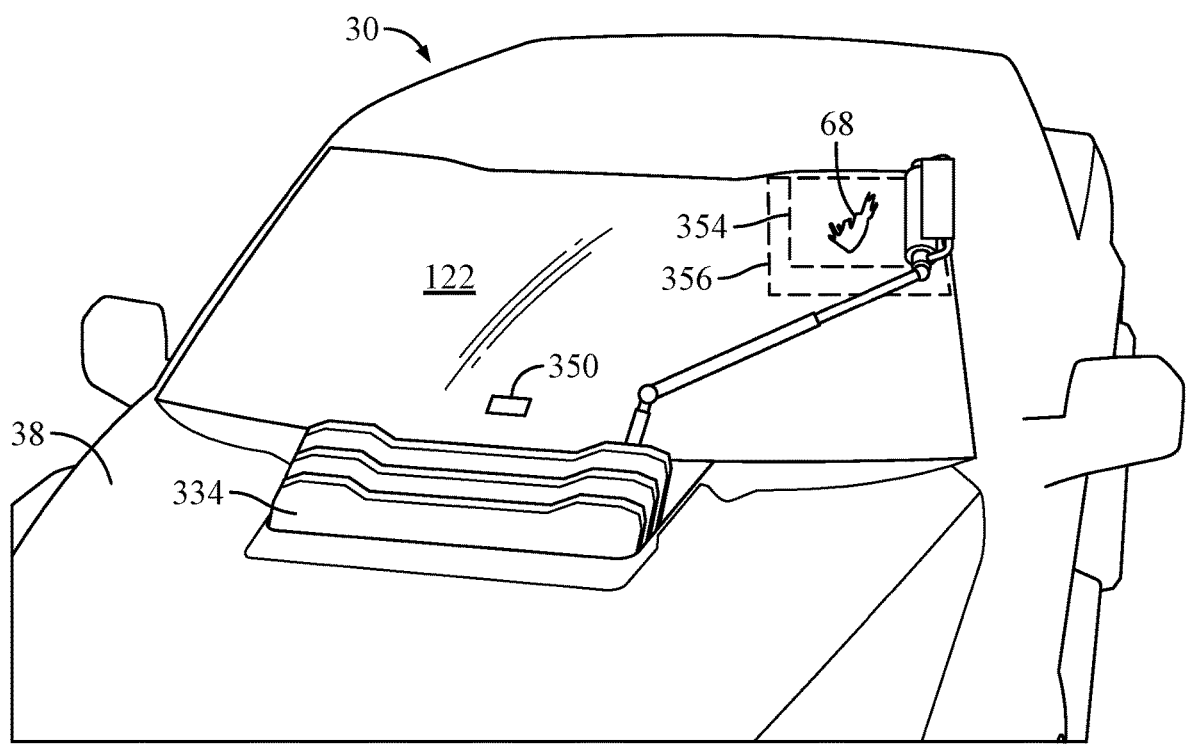
FIG. 55 shows the motor vehicle and windshield cleaning system of FIG. 52 during a spot-clean operation.

With reference next to FIG. 55, the controller 242 and then deploy the windshield washing system 330 to the selected location on the windshield, which will correspond to the location of the residue 68 is highlighted by the user on the display 26. Most preferably, the controller 242 will define a cleaning zone 354 about the selected location. The cleaning zone 354 can be selected to range a short distance, such as between about 1-9 inches, around the selected location. Most preferably the cleaning zone 354 considers cleaning paths 344, such as the horizontal cleaning paths employed by the illustrated windshield washing system 330. For example, the illustrated windshield washing system 330 typically follows a horizontal cleaning path 334 during operation. In additional variations, during such spot-clean operations, the windshield washing system 330 can be configured to make multiple cleaning passes with the cleaning head 310 over the cleaning zone 354, including continuous operation of the brush 312 in back-and-forth passes, one or more of which can include horizontal variation of the path (i.e., a generally diagonal path).

Once the selected location has been cleaned so as to loosen and remove the residue 68, the wiper blade 320, and possibly air nozzles 322 of the cleaning head 310 can be employed to dry the cleaning zone 354. Preferably, a drying zone 356 is defined that is somewhat larger than the cleaning zone 354. The windshield washing system 330 is operated to dry the windshield 122 over the entire drying zone 356 so as to also dry fluid overspray and/or streaks. In some embodiments, the drying zone 356 can be defined to extend all the way to the bottom side 126 of the windshield 122 to ensure drips and streaks are removed.

Figure 56:
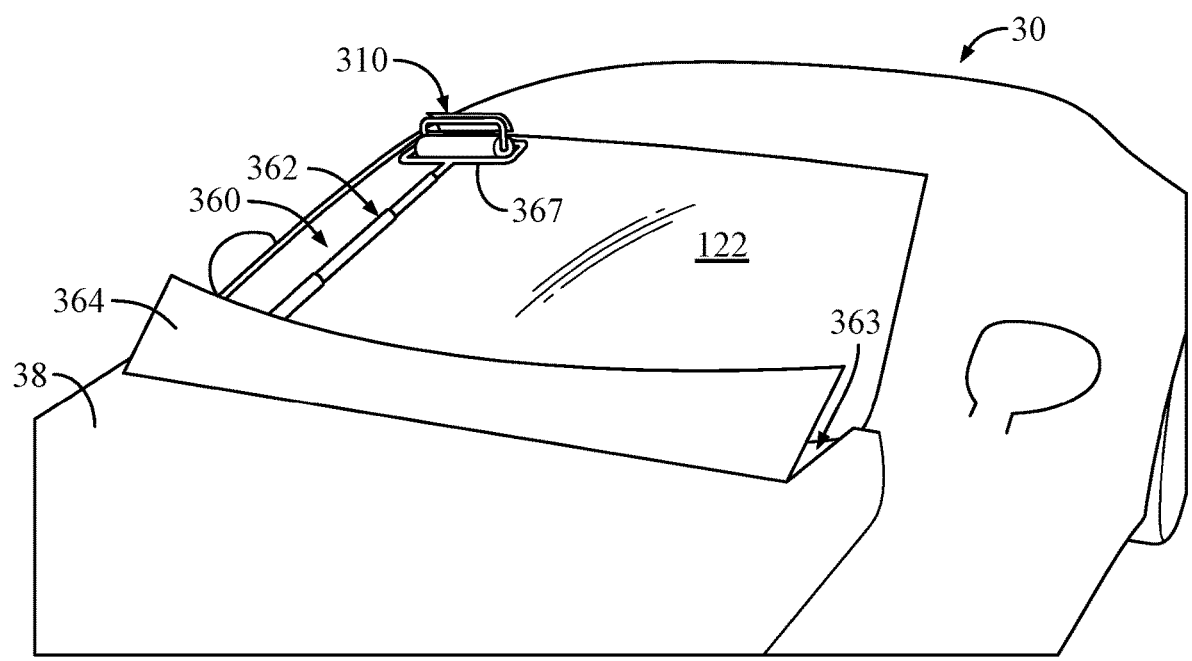
FIG. 56 is a perspective view of another motor vehicle having an alternative windshield cleaning system, shown during a cleaning cycle.
Figure 57:
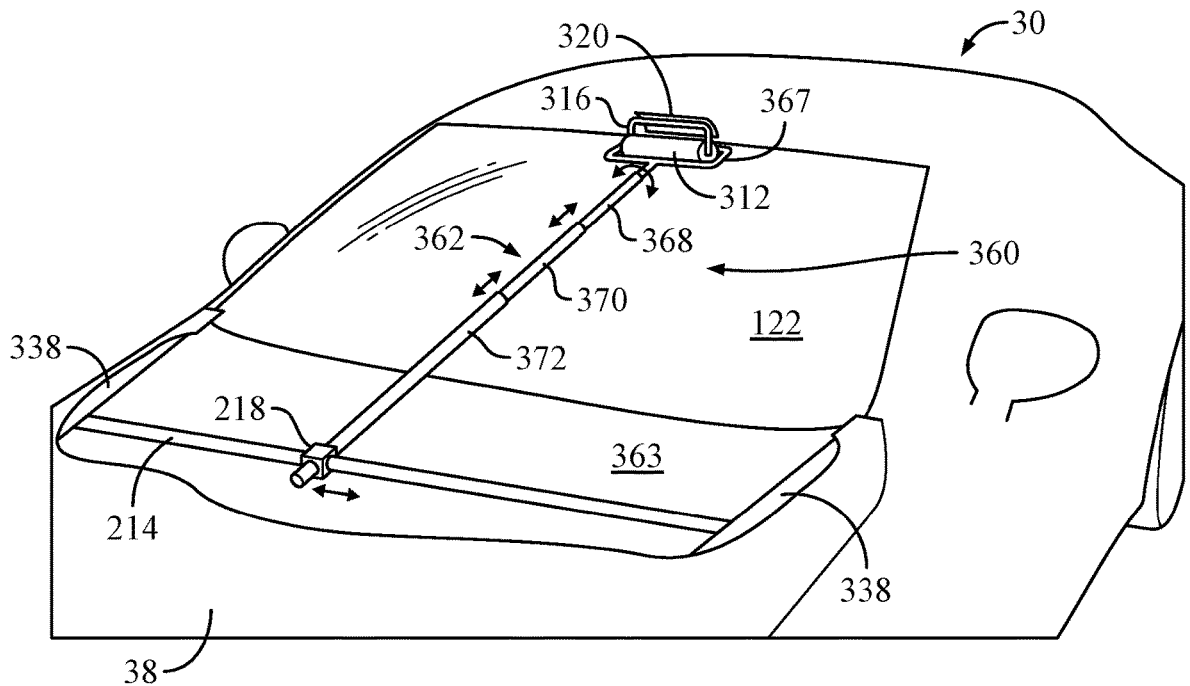
FIG. 57 is a top, cutaway view of the configuration of FIG. 56, schematically showing structure of the windshield cleaning system in a storage position.
Figure 58:
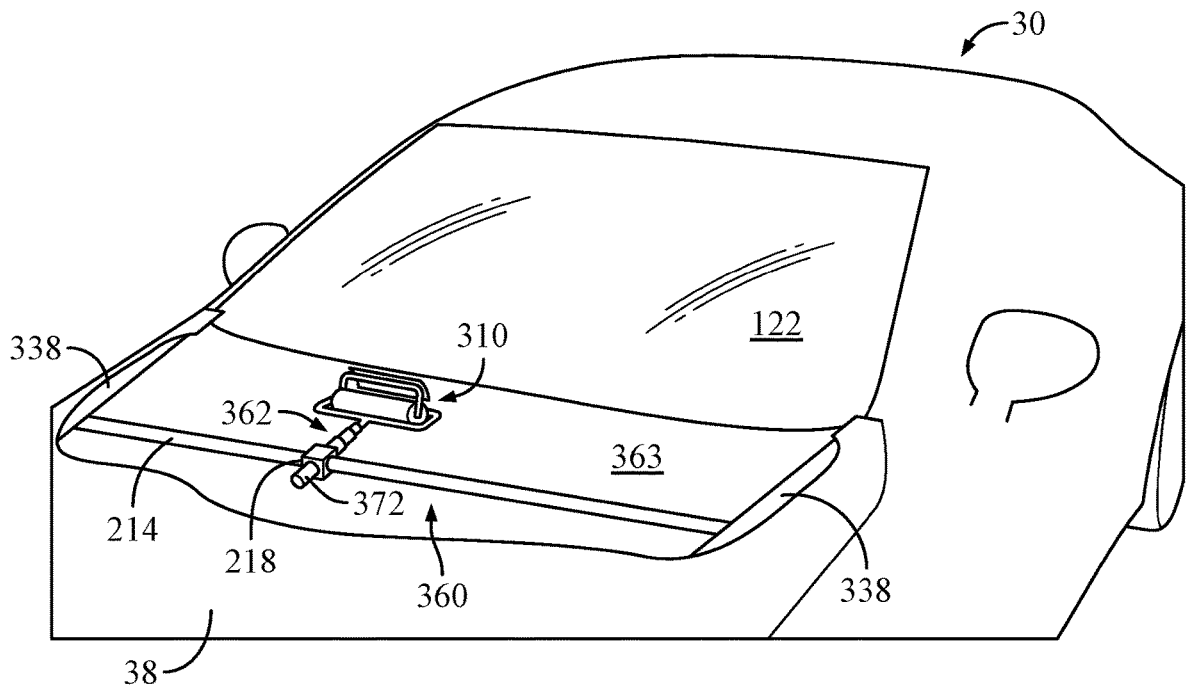
FIG. 58 is a top, cutaway view of the configuration of FIG. 56, schematically showing structure of the windshield cleaning system in an operating position.
Figure 59:
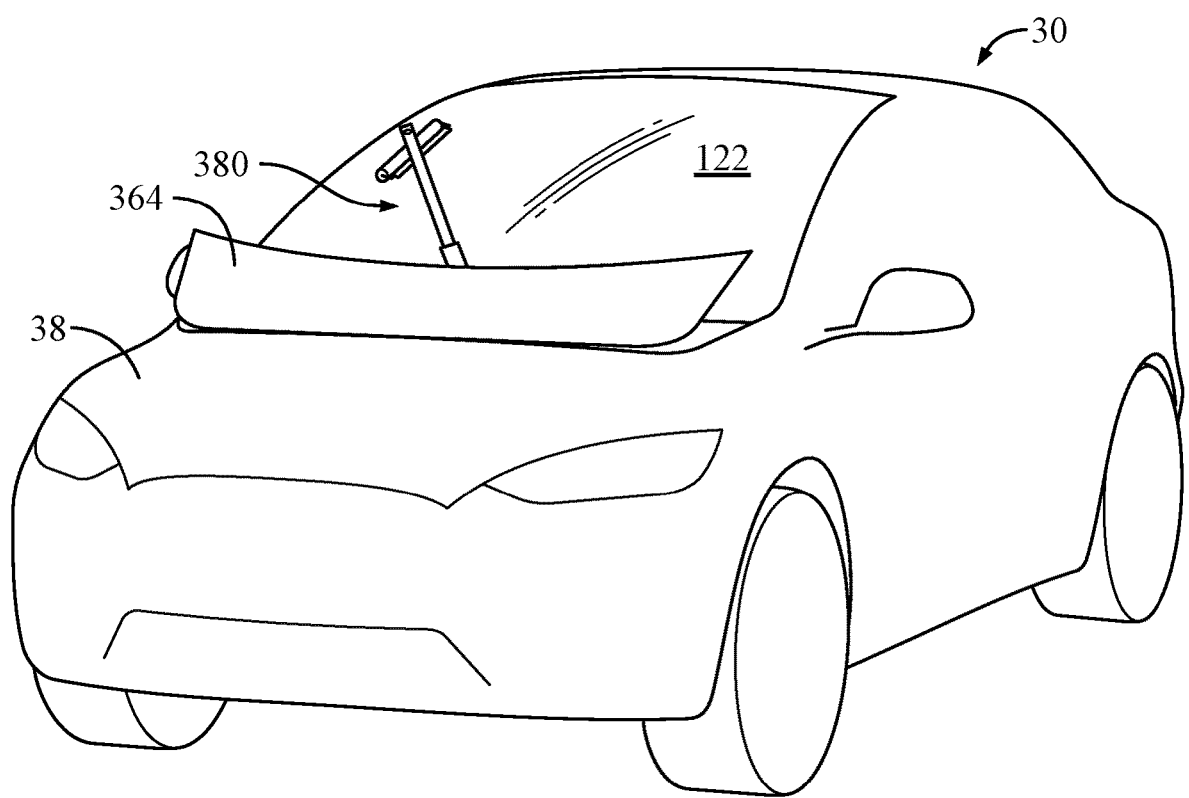
FIG. 59 is a perspective view of another motor vehicle having an alternative windshield cleaning system, shown during a cleaning cycle.
Figure 60:
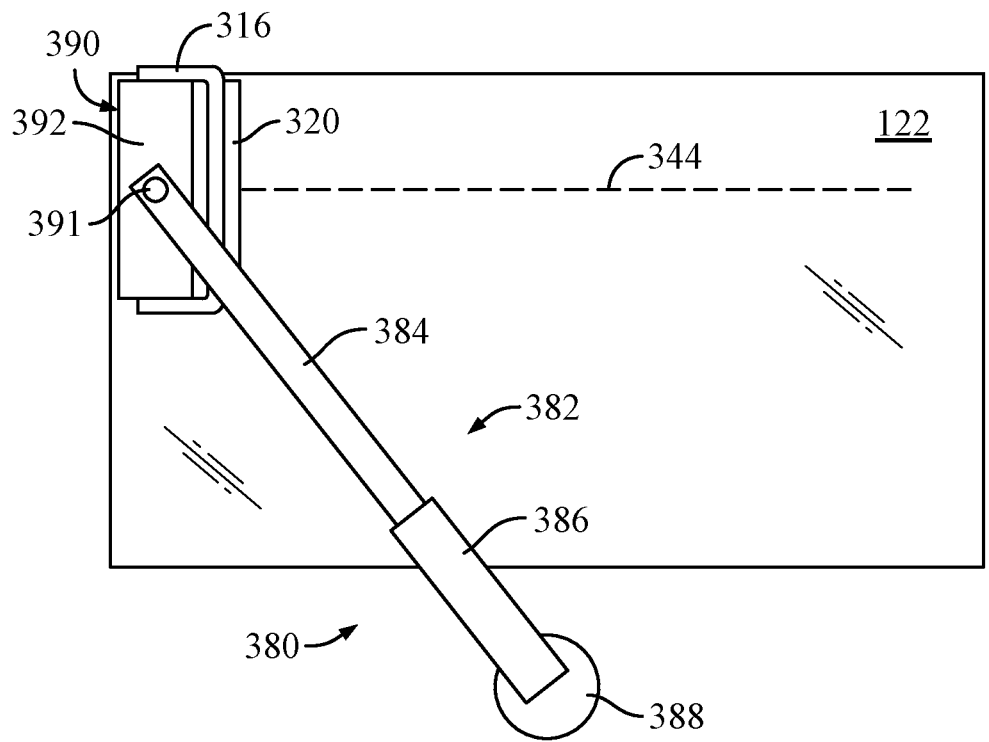
FIG. 60 is a top, cutaway view of the configuration of FIG. 56, schematically showing structure of the windshield cleaning system in an operating position.

With reference next to FIGS. 56-58, another variation of a windshield washing system 360 can be provided under the hood 38 of the vehicle 30. A cover 364 disposed in the hood may hide the washing system 360 from you within a storage space 363, and preferably is hingedly openable in order to allow the washing system 362 to be deployed. In the illustrated variation, the cover 364 extends forwardly from the windshield side of the hood 38 generally along the entire width, or substantially the entire width, of the vehicle 34 or hood 38. The illustrated cover 364 is a unitary piece that is hinged along its forward-most edge and can open sufficiently to enable the washing system 360 to be deployed.

The illustrated windshield washing system 360 comprises a cleaning head 310 supported by an active positioning system 362 configured to position the cleaning head 310 substantially anywhere on the windshield 122. The illustrated active positioning system 332 comprises a base mount 218 supported so as to be linearly movable along track 214. The track 214 preferably extends along substantially the entire width of the vehicle and can be supported at either end by structural members 216 of the vehicle 30.

With specific reference to FIG. 57, a telescoping extension member 366 is mounted to the base mount 218 at or adjacent its proximal end and supports a cleaning head 310 at or adjacent its distal end. The telescoping extension member 366 serves as a telescoping arm to position the head mount 367 along a height of the windshield. A head mount 367 is telescoping via the telescoping arm or telescoping extension member 366. The head mount 367 may extend from the distal end of the extension extension member 366 and split into two branches so as to hold the cleaning head 310 on opposing ends. Preferably the head mount 367 can be rotated or pivoted about an axis of the extension member 366 to move between use of the brush 312 and wiper blade 320. The extension member 366 translates linearly with the base mount 218 so that the cleaning head 310 can be placed into contact with substantially the entire width of the windshield 122. The illustrated extension member 366 comprises a first telescoping member 368 that is received within a second telescoping member 370, which is correspondingly received into a receiver member 372 that is attached to the base mount 218. As such, a length of the extension member 366 can be extended so that the cleaning head 310 can be placed into contact with and substantially the entire height, front to back, of the windshield 122.

With specific reference to FIG. 58, to store the windshield washing system 360, it must be enclosed in the storage space 363 enclosed by the cover 364. In the illustrated variation, in order to fit within the storage space 363, the extension member 366 is fully retracted so that the first telescoping member 368 is retracted into the telescoping member 370, and the first and second telescoping members 368, 370 are fully drawn into the receiver member 372. The receiver member 372 can further be moved proximally relative to the base mount 218 so that the entire windshield washing system 360, including be cleaning head 310, are drawn or traversed into the storage space 363. The cover 364 can then be closed, and the windshield washing system 360 is maintained out of sight. In additional variations, in order to place the system 360 in a storage position, the base mount 218 can rotate the extension member 366 so that it extends generally parallel to the track 214.

With reference next to FIGS. 59-62, another embodiment of a windshield washing system 380 can be stored within a storage space 363 enclosed by a cover 364 disposed in the vehicle hood 38. The illustrated windshield washing system 380 comprises a telescoping extension member 382 made up of a telescoping member 384 that is received within a receiver member 386 so as to selectively increase (i.e., extend) and decrease (i.e., reduce) an effective length of the telescoping extension member 382. A cleaning head 390 is attached to a distal end of the telescoping extension member 382. A proximal end of the extension member 382, which is a proximal end, or base end, of the receiver member 386 is rotationally mounted on a rotating mount 388. In this configuration, actuators of the telescoping extension member 382, rotating mount 388 and cleaning head 390 can be operated so as to perform cleaning and drying operations upon the windshield, preferably using horizontal cleaning paths 344.

In the illustrated embodiment, the cleaning head 390 is rotatably (i.e., pivotably) attached to the extension member 382 at a pivotable brush attachment 391 positioned generally centrally along the length of a brush portion 392. During each horizontal draw of the cleaning head 390 across the windshield 122 during operation of a cleaning cycle, the telescoping member 384 is withdrawn into the receiver member 386 a maximum extent as the brush 392 is brought past the rotational mount 388 so that the extension member 382 is perpendicular to the horizontal path 344. As shown, a length of the receiver member 386 is selected so that its distal end terminates less than half of the width of the brush portion 392 from the bottom-most part of the windshield 122 that is cleaned.

Figure 61:
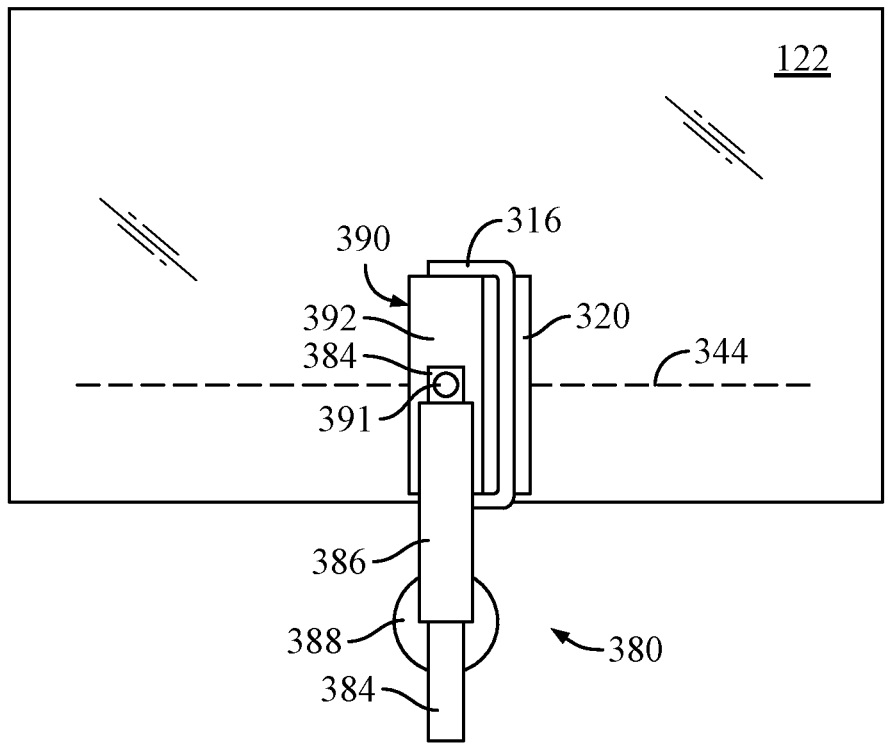
FIG. 61 is a top, cutaway view of the configuration of FIG. 56, schematically showing structure of the windshield cleaning system in another operating position.

In the configuration illustrated in FIG. 61, the telescoping member 384 is longer than the receiver member 386, and a proximal end of the telescoping member 384 extends proximally from a proximal end of the receiver member 386 at times during cleaning cycle. In additional embodiments, the receiver member 386 can be longer so that the proximal end of the telescoping member 384 never exits the receiver member 386, and the receiver member thus is rotatably mounted to the rotating mount 388 at a point along the length of the receiver member spaced from both its proximal and distal ends. In still further embodiments, the extension member 382 can employ two or more shorter telescoping members that don't extend out of the proximal end of the receiver member 386, and the receiver member 386 is still mounted to the rotating mount 388 at or adjacent its proximal end.

Figure 62:
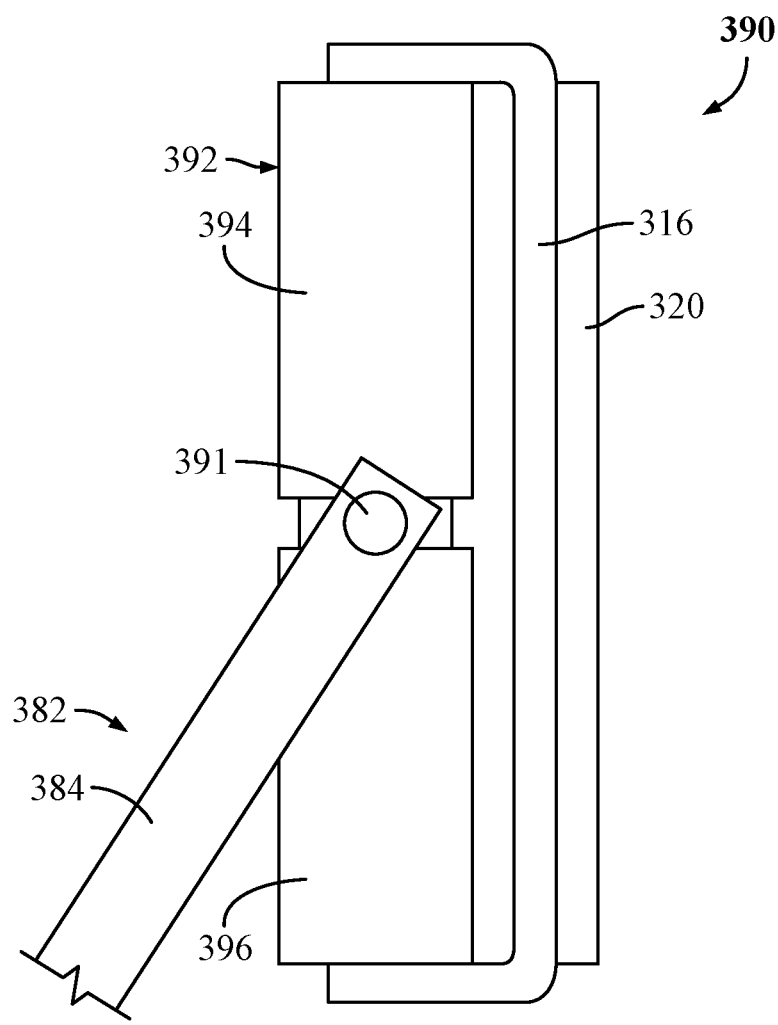
FIG. 62 is a schematic view of a cleaning head of the windshield cleaning system of FIG. 59.

With specific reference to FIG. 62, the brush 392 of the cleaning head 390 can comprise opposing brush parts 394, 396 disposed on either side of an attachment space 396 aligned with the brush attachment 391 so that the brush parts 394, 396 can rotate without interfering with the brush attachment 391. The cleaning head 390 can also include a spray bar 316 having a wiper 320 and air nozzles 322. In additional variations, the cleaning head can be configured differently, such as similar to cleaning head 310 as described above, and/or instead of the brush attachment 391 splitting the brush 392, the cleaning head can be attached to the extension member 382 via a structure similar to the head mount 367 discussed above in connection with FIGS. 56-58. In still further variations, the cleaning head can be attached to the extension member 382 at a joint 240 adjacent one end of the cleaning head 390 and configured similar to the cleaning head 310 discussed above.

It is to be understood that this and the other variations and embodiments described herein can be controlled and used in connection with a spot cleaning system having similarities to that discussed above in connection with FIGS. 53 and 54. Also, variations and embodiments described herein can be expected to incorporate variations of structures from one another, such as any of the cleaning heads as described herein as well as various configurations of active positioning systems. Further, brush members as disclosed herein can be motorized to rotate, vibrate, or any other desired motion to provide agitation to loosen debris.

The disclosed cleaning devices may be actuated by placing the various motors, pumps, and air compressors in electrical communication with an activation switch on the motor vehicle, preferably inside the vehicle's passenger compartment and readily accessible by the vehicle's driver. Placement of the activation switch on the vehicle's dashboard is believed suitable. By way of example and not limitation, the activation switch may be an original equipment manufacturer's touch screen mounted to the vehicle such as a dashboard mounted touch screen. The activation switch may be an icon on the touch screen preset to perform one or more back and forth cleaning passes of the cleaning device when the icon is touched, or may be adjustable to specify more than one reciprocal, back and forth pass of the cleaning device. The icon may be representative of a windshield washer (e.g., pictorially or textually). The activation switch may be preset to allow from one to four cleaning passes. As used herein, one full cleaning pass advantageously includes one reciprocal pass back and forth across a section of the windshield. By placing appropriate sensors along any portions of the disclosed tracks, frames, windshield, or housings, cleaning tools may travel less than completely across the windshield 22 and may thus perform a partial cleaning pass over a preselected partial portion of the windshield. Such partial cleaning passes preferably include the side portion of the windshield 22 in which the cleaning tool is stored when not in use, with the cleaning device reversing direction before completing a washing passage. A touch screen with variable number inputs or a rotary switch with various cycles hardwired to the switch, are believed suitable to vary the number of whole or partial passes.

The activation switch may be in electrical communication with a computer or electronic circuit that controls the cleaning device.

In lieu of the dashboard mounted touch screen, it is also contemplated that the activation switch may be an application placed in a computer storage of a smartphone or other portable, handheld device. The smartphone may be disposed on a designated area on the dashboard of the vehicle. When it is placed on the designated area, the application may be launched either through recognition of a Bluetooth connection or some other mechanical or electronic sensor. The software application when launched may be used to cause the cell phone or device to emit a signal to the vehicle's computer or electronic circuit that controls the cleaning device. The vehicle's computer or electronic circuit that controls the cleaning device may detect the signal and operate or activate the cleaning device. The communication link between the smartphone and the vehicle computer or electronic circuit may be by Bluetooth, WiFi, optical or signal currently known in the art or developed in the future. The designated area for the smartphone may be a receptacle in the dashboard of the vehicle to make the smartphone's touch screen easily visible to the driver and easy to touch by the driver.

Alternatively, when smartphone is not in the cabin of the vehicle. The smartphone can establish a communication link with the vehicle's computer or electronic circuit which controls the window cleaner. By way of example and not limitation, the application on the smartphone can be launched. When it is launched, it can search for a communication link with the paired vehicle's communication device. The vehicle's communication device can be always on so that it will establish communication with the smartphone when the application on the smartphone is launched or active. In this regard, when the user is outside of the vehicle, the user can operate the windshield/window cleaner to clean the windshield. The distance may be limited by the communication link (e.g., Bluetooth). Advantageously, the vehicle's computer, processor, etc. and the vehicle's receiver and/or sensor are in electrical communication with a battery of the motor vehicle so that the cleaning system may be actuated even when the vehicle engine is not running.

While described for use with a bus or RV, the method and apparatus may be used with other windshields and other surfaces. Disclosed cleaning devices may replace the normal windshield wipers on the motor vehicles, or may be used in addition to the vehicle's standard windshield wipers, although not at the same time as the cleaning device would hit the standard windshield wipers.

In the original equipment manufacturer's touch screen mounted to the vehicle and the smartphone application embodiments discussed above, the touch screen and the smart phone may also be control other aspects of the windshield cleaner 120. By way of example and not limitation, touch screen and the smartphone application can be programmed and linked to the vehicle so as to heat the water with the heater either through a dedicated heater which is a part of the windshield cleaner or a heat exchanger which works with the engine to provide heat for the water. In this regard, the user can use the smartphone and its corresponding application to control the windshield cleaner (e.g., turn on engine, turn on windshield cleaner only, etc.) to provide heated mixture of water and soap to the windshield for the purpose of defrosting the windshield without having to enter the vehicle. The user can operate the windshield cleaner from inside the comfort of a building where a communication link that can be established between the smartphone and the vehicle computer.

The various aspects of the smartphone discussed herein which controls the windshield cleaning system may be employed in any of the aspects describe herein. By way of example and not limitation, a software application may be downloaded on the smartphone. The software application may communication with the onboard computer or another ancillary computer on the automobile which controls the windshield cleaning system or a different function of the automobile. Moreover, the various aspects of the windshield cleaning system discussed herein may be controlled by voice activation. The voice activation may be through the smartphone which as discussed herein controls the windshield cleaning system. Alternatively or additionally, the voice activation may be through the automobile's onboard computer. For example, the smartphone or automobile may have a microphone which receives speech commands of the user. The smartphone or the onboard computer of the automobile may receive the speech commands and operate all aspects discussed herein.

The above description is given by way of example, and not limitation. Given the above disclosure, one skilled in the art could devise variations that are within the scope and spirit of the invention disclosed herein, including various ways of attaching the bristles 62 to a base of the cleaning head and various ways of attaching wiper blade 156 to spray bar 156. Given the above disclosure, one skilled in the art could also devise variations on the disclosed ways to configure the tracks 136, 138 to engage the carriers 132, 134 and to move the carriers 132, 134 along their respective tracks 136, 138, and various ways to configure and rotate the spray bar 156. Further, the various features of the embodiments disclosed herein can be used alone, or in varying combinations with each other and are not intended to be limited to the specific combination described herein.

What is claimed is:

1. A method of cleaning a window of an automobile, comprising:
    deploying a cleaning device from a storage cavity, the cleaning device comprising a positioning system supporting a cleaning head;
    the positioning system comprising an extension member supported by a base and a head joint supported by the extension member;
    moving the extension member so as to place the cleaning head against a surface of a window;
    activating a brush of the cleaning head to agitate against the surface of the window;
    moving the extension member so as to move the brush from a brush start position over the surface of the window along a brush path;
    moving the extension member so as to move the cleaning head back to the start position, and moving the cleaning head so as to place a wiper blade of the cleaning head against the surface of the window at a wiper blade start position; and
    moving the extension member so as to move the wiper blade from the wiper blade start position over the surface of the window along the wiper blade path while moving the cleaning head relative so as to maintain the wiper blade at a desired orientation relative to the wiper blade path.

2. The method of claim 1, wherein the desired orientation of the wiper blade is generally perpendicular to the wiper blade path.

3. The method of claim 1, wherein a second extension member of the extension member articulates relative to a first extension member.

4. The method of claim 3, additionally comprising rotating the first extension member about its axis so as to press the cleaning head against the window.

5. The method of claim 1, wherein a second extension member telescopes relative to a first extension member so as to adjust an overall length of the positioning system.

6. The method of claim 5, wherein the base is configured to rotate about an axis generally perpendicular to an axis of the first extension member.

7. The method of claim 1, wherein at least one of a first extension member and a second extension member comprises telescoping portions, and moving the telescoping portions to adjust a length of the corresponding one of the first extension member and second extension member.

8. The method of claim 1 additionally comprising an elongated track, and comprising moving the base linearly along the track while moving a first extension member relative to a second extension member.

9. The method of claim 8, wherein the track remains within the storage cavity when the first extension member, second extension member, and cleaning head are deployed out of the storage cavity.

10. The method of claim 9, wherein opposing ends of the track are mounted on structural members of the automobile.

11. The method of claim 8, wherein the track extends along substantially an entire width of the window.

12. The method of claim 8, wherein the track extends only about halfway or less of a width of the window.

13. The method of claim 1, wherein the storage cavity is enclosed within a casing defined by opposing end walls, a top wall, a bottom wall, a back wall and a cover, and wherein opposing ends of a track are mounted to the opposing end walls, and further wherein the casing is removably attached to the automobile.

14. The method of claim 1, additionally comprising moving a first extension member, a second extension member, the base and cleaning head relative to one another so as to return the cleaning device to be fully contained within the storage cavity, and closing a cover.

15. The method of claim 14, wherein the storage cavity is defined below a hood of the automobile, and the cover sits flush with the hood when the cover is closed.

16. The method of claim 15, wherein a cover hinge is disposed on a side of the cover opposite a windshield, and wherein opening the cover comprises rotating the cover about the cover hinge no more than about 75 degrees.

17. The method of claim 1, wherein the window is a windshield of the automobile, and comprising a camera within the automobile capturing an image of the windshield showing debris on the windshield, displaying the image on a touch-screen display within a cabin of the automobile, a computer mapping locations on the touch-screen display to locations on the windshield of the automobile, receiving a selected location input via the touch-screen display and correlating the selected location input to a selected windshield location.

* * * * *